(12) United States Patent
Berger et al.

(10) Patent No.: US 8,315,237 B2
(45) Date of Patent: Nov. 20, 2012

(54) MANAGING AND MONITORING EMERGENCY SERVICES SECTOR RESOURCES

(75) Inventors: Thomas R Berger, Cumming, GA (US); Joseph E. Denny, Atlanta, GA (US); David S. Robins, Buffalo Grove, IL (US); Stephen A. Wallace, Roswell, GA (US); Raymond T. Gurgone, Woodstock, IL (US); LaMonte Peter Koop, Alpharetta, GA (US); Edward Allen Payne, Lawrenceville, GA (US); Robert W. Twitchell, Cumming, GA (US); Rodney A. Hilton, Elgin, IL (US); Randy Edwards, Snellville, GA (US)

(73) Assignee: Google Inc., Mountain View, CA (US)

( * ) Notice: Subject to any disclaimer, the term of this patent is extended or adjusted under 35 U.S.C. 154(b) by 501 days.

(21) Appl. No.: 12/607,040

(22) Filed: Oct. 27, 2009

(65) Prior Publication Data

US 2010/0150122 A1  Jun. 17, 2010

Related U.S. Application Data

(60) Provisional application No. 61/140,887, filed on Dec. 25, 2008, provisional application No. 61/109,500, filed on Oct. 29, 2008, provisional application No. 61/109,505, filed on Oct. 30, 2008, provisional application No. 61/109,502, filed on Oct. 29, 2008, provisional application No. 61/140,880, filed on Dec. 25, 2008, provisional application No. 61/140,881, filed on Dec. 25, 2008, provisional application No. 61/140,882, filed on Dec. 25, 2008, provisional application No. 61/140,883, filed on Dec. 25, 2008, provisional application No. 61/141,021, filed on Dec. 29, 2008, provisional application No. 61/147,917, filed on Jan. 28, 2009, provisional application No. 61/147,839, filed on Jan. 28, 2009, provisional application No. 61/150,298, filed on Feb. 5, 2009, provisional application No. 61/151,185, filed on Feb. 9, 2009, provisional application No. 61/155,887, filed on Feb. 26, 2009, provisional application No. 61/172,655, filed on Apr. 24, 2009, provisional application No. 61/254,126, filed on Oct. 22, 2009.

(51) Int. Cl.
*H04W 3/00* (2006.01)
*H04B 7/00* (2006.01)

(52) U.S. Cl. ..... 370/338; 370/400; 455/41.2; 455/522.1

(58) Field of Classification Search .......... 370/230–408; 455/41.2, 414, 552.1; 709/220–252
See application file for complete search history.

(56) References Cited

U.S. PATENT DOCUMENTS 6,072,784 A    6/2000   Agrawal
(Continued)

FOREIGN PATENT DOCUMENTS

KR   20070005515   10/2005
WO   2010096127 A1   8/2010

OTHER PUBLICATIONS

Information Disclosure Statement (IDS) Letter Regarding Common Patent Application(s), dated Feb. 18, 2011.

(Continued)

*Primary Examiner* — Afsar M. Qureshi
(74) *Attorney, Agent, or Firm* — Tillman Wright, PLLC; Chad D. Tillman; Jeremy C. Doerre

(57) ABSTRACT

A system includes one or more wireless islands, one or more incident management applications, and one or more message management and routing (MMR) systems. Each MMR systems is configured to act as an intermediary for communication between one of the wireless islands and one or more of the incident management applications. One of the wireless islands includes a radio network. The radio network includes a plurality of remote sensor nodes (RSNs), and a gateway controller. An RSN of the plurality of RSNs is worn by ESS personnel, the gateway controller is mounted to an ESS vehicle, and the RSN is configured to wirelessly communicate with the gateway controller.

20 Claims, 39 Drawing Sheets

U.S. PATENT DOCUMENTS

| | | | |
|---|---|---|---|
| 6,700,533 | B1 | 3/2004 | Werb |
| 6,972,682 | B2 | 12/2005 | Lareau et al. |
| 6,975,614 | B2 | 12/2005 | Kennedy |
| 7,171,476 | B2 | 1/2007 | Maeda et al. |
| 7,348,875 | B2 | 3/2008 | Hughes |
| 7,830,852 | B2 * | 11/2010 | Twitchell, Jr. ............... 370/338 |
| 8,055,286 | B1 * | 11/2011 | Reeves et al. ............... 455/466 |
| 2008/0234878 | A1 | 9/2008 | Joao |
| 2008/0253327 | A1 | 10/2008 | Kohvakka et al. |
| 2008/0255947 | A1 * | 10/2008 | Friedman ...................... 705/14 |
| 2010/0144383 | A1 | 6/2010 | Berger et al. |

OTHER PUBLICATIONS

Stojmenovic et al., Design Guidelines for Routing Protocols in Ad Hoc and Sensor Networks with a Realistic Physical Layer, Communications Magazine, IEEE, vol. 43, Issue 3, Mar. 2005, pp. 101-106.

Information Disclosure Statement (IDS) Letter Regarding Common Patent Application(s), dated Mar. 30, 2011.

"International Search Report" and "Written Opinion of the International Search Authority" (Korean Intellectual Property Office) in Terahop Networks, Inc. et al, International Patent Application Serial No. PCT/US2009/062655, dated Jun. 14, 2010, 9 pages.

Wen, C-Y, Hsiao, Y-C, Decentralized Anchor-Free Localization for Wireless Ad-Hoc Sensor Networks, 2008 IEEE International Conference of Systems, Man and Cybernetics (SMC 2008), pp. 2777-2784, 9 pages.

Information Disclosure Statement Letter dated Nov. 30, 2011.

Information Disclosure Statement Letter dated Dec. 2, 2011.

* cited by examiner

| Nodes | No. of Hops per Node | No. of Nodes | Total No. of Node Hops (Retransmissions) |
|---|---|---|---|
| 211, 213, 215 | 8 | 3 | 24 |
| 217, 219, 221 | 6 | 3 | 18 |
| 223, 225, 227 | 4 | 3 | 12 |
| 229, 231, 233 | 2 | 3 | 6 |
| 235, 237, 239 | 0 | 3 | 0 |
|  |  |  | 60 |

Table 1

*FIG. 16*

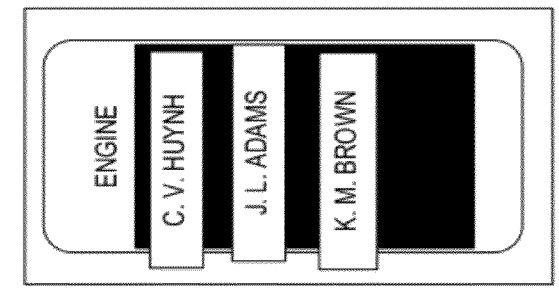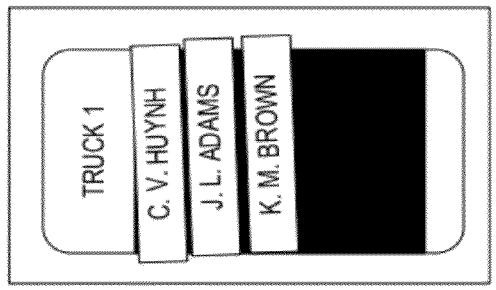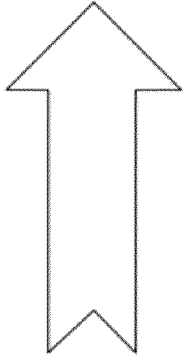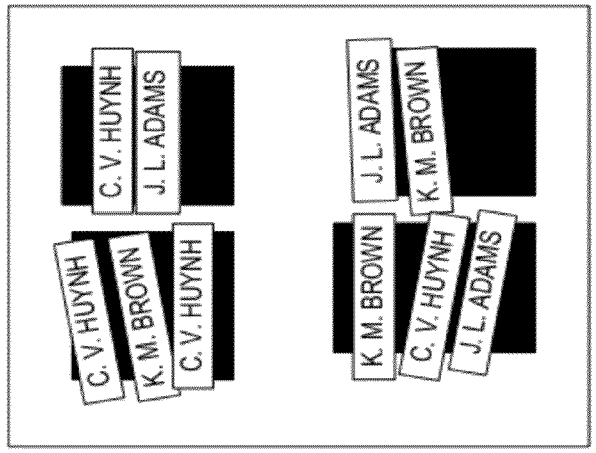
FIG. 32 *Prior Art*

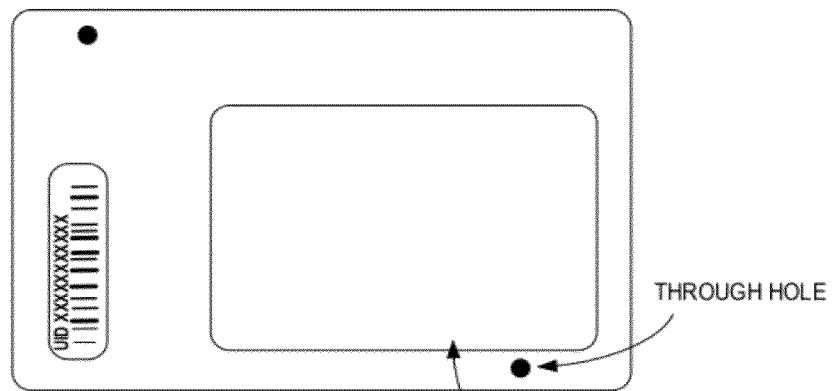
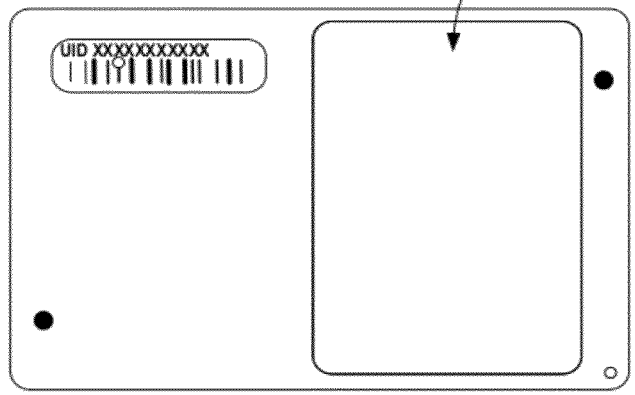
FIG. 36A

MANAGING AND MONITORING EMERGENCY SERVICES SECTOR RESOURCES

CROSS-REFERENCE TO RELATED APPLICATIONS

The present application is a U.S. nonprovisional patent application of, and claims priority under 35 U.S.C. §119(e) to each of:

(a) U.S. Provisional Patent Application No. 61/140,887, filed Dec. 25, 2008, titled "UPDATING NODE PRESENCE BASED ON COMMUNICATION PATHWAY";

(b) U.S. Provisional Patent Application No. 61/109,500, filed Oct. 29, 2008, titled SYSTEMS AND APPARATUS FOR MANAGING AND MONITORING EMERGENCY SERVICES SECTOR RESOURCES";

(c) U.S. Provisional Patent Application No. 61/109,505, filed Oct. 30, 2008, titled "SYSTEMS AND APPARATUS FOR MANAGING AND MONITORING EMERGENCY SERVICES SECTOR RESOURCES";

(d) U.S. Provisional Patent Application No. 61/109,502, filed Oct. 29, 2008, titled "SYSTEMS AND APPARATUS FOR MANAGING AND MONITORING EMERGENCY SERVICES SECTOR RESOURCES";

(e) U.S. Provisional Patent Application No. 61/140,880, filed Dec. 25, 2008, titled "MERGING AND UNMERGING WIRELESS AD HOC NETWORKS";

(f) U.S. Provisional Patent Application No. 61/140,881, filed Dec. 25, 2008, titled "AUTOMATED IDENTIFICATION OF RADIO CHANNELS FOR INTEROPERABILITY CONNECTIONS";

(g) U.S. Provisional Patent Application No. 61/140,882, filed Dec. 25, 2008, titled "CUSTOMER CONTROL OF DEVICE OPERATION IN A SHARED NETWORK ENVIRONMENT";

(h) U.S. Provisional Patent Application No. 61/140,883, filed Dec. 25, 2008, titled "INPUT/OUTPUT ENHANCEMENTS FOR COMPUTER AIDED DISPATCH AND AUTOMATED CALL-OUT SYSTEMS";

(i) U.S. Provisional Patent Application No. 61/141,021, filed Dec. 29, 2008, titled "METHODS, SYSTEMS, AND APPARATUS FOR PROVIDING NETWORK SERVICES";

(j) U.S. Provisional Patent Application No. 61/147,917, filed Jan. 28, 2009, titled "ASCERTAINING PRESENCE IN CLASS-BASED NETWORKS";

(k) U.S. Provisional Patent Application No. 61/147,839, filed Jan. 28, 2009, titled "NETWORK BEACONING";

(l) U.S. Provisional Patent Application No. 61/150,298, filed Feb. 5, 2009, titled "CONJOINED CLASS-BASES NETWORKING";

(m) U.S. Provisional Patent Application No. 61/151,185, filed Feb. 9, 2009, titled "SYSTEMS AND APPARATUS FOR MANAGING AND MONITORING EMERGENCY SERVICES SECTOR RESOURCES";

(n) U.S. Provisional Patent Application No. 61/155,887, filed Feb. 26, 2009, titled "ADAPTIVE BEACONING";

(o) U.S. Provisional Patent Application No. 61/172,655, filed Apr. 24, 2009, titled "LOCALIZATION USING HOP-PATH INFORMATION"; and (p) U.S. Provisional Patent Application No. 61/254,126, filed Oct. 22, 2009, titled "PRE-ASSIGNMENT OF RESOURCES".

The present application hereby incorporates herein by reference the entire disclosure of each of these above-noted provisional patent applications.

For ease of reference, disclosure of selected ones of these provisional applications is included in Appendices A-N attached hereto, as detailed hereinbelow. Each of these appendices, i.e., each of Appendices A-N, is hereby incorporated herein by reference.

Appendix A: 61/140,887;
Appendix B: 61/109,500, 61/109,502, and 61/109,505;
Appendix C: 61/140,880;
Appendix D: 61/140,881;
Appendix E: 61/147,917;
Appendix F: 61/140,882;
Appendix G: 61/140,883;
Appendix H: 61/141,021;
Appendix I: 61/147,839;
Appendix J: 61/150,298;
Appendix K: 61/151,185;
Appendix L: 61/155,887;
Appendix M: 61/172,655; and
Appendix N: 61/254,126.

Additionally, the present application hereby incorporates herein by reference each of the following identified U.S. patent applications—as well as any publications thereof and any patents issuing therefrom; the following identified U.S. patent application publications; and the following identified U.S. patents: Ser. Nos. 12/468,047; 12/367,544 (US 2009-0135000 A1); Ser. No. 12/367,543 (US 2009-0161642 A1); Ser. No. 12/367,542 (US 2009-0181623 A1); Ser. No. 12/353,197 (US 2009-0129306 A1); Ser. No. 12/352,992 (US 2009-0122737 A1); Ser. No. 12/343,865 (US 2009-0104902 A1); Ser. No. 12/343,822 (US 2009-0103462 A1); Ser. No. 12/271,850 (US 2009-0092082 A1); Ser. No. 12/140,253 (US 2008-0303897 A1); Ser. No. 11/930,797 (US 2008-0151850 A1); Ser. No. 11/930,793 (US 2008-0112378 A1); Ser. No. 11/930,788 (US 2008-0165749 A1); Ser. No. 11/930,785 (US 2008-0143484 A1); Ser. No. 11/930,782 (US 2008-0212544 A1); Ser. No. 11/930,779 (US 2008-0129458 A1); Ser. No. 11/930,777 (US 2008-0111692 A1); Ser. No. 11/930,770 (US 2008-0144554 A1); Ser. No. 11/930,761 (US 2008-0112377 A1); Ser. No. 11/930,753 (US 2008-0142592 A1) now U.S. Pat. No. 7,535,339; Ser. No. 11/930,749 (US 2008-0130536 A1) now U.S. Pat. No. 7,538,658; Ser. No. 11/930,740 (US 2008-0150723 A1) now U.S. Pat. No. 7,538,657; Ser. No. 11/930,736 (US 2008-0143483 A1) now U.S. Pat. No. 7,538,656; Ser. No. 11/847,309 (US 2007-0291724 A1); Ser. No. 11/847,295 (US 2007-0291690 A1); Ser. No. 11/832,998 (US 2007-0273503 A1) now U.S. Pat. No. 7,378,959; Ser. No. 11/832,991 (US 2007-0268134 A1) now U.S. Pat. No. 7,378,958; Ser. No. 11/832,979 (US 2007-0268126 A1) now U.S. Pat. No. 7,378,957; Ser. No. 11/610,427 (US 2007-0159999 A1); Ser. No. 11/618,931 (US 2007-0155327 A1); Ser. No. 11/555,173 (US 2007-0099629 A1); Ser. No. 11/555,164 (US 2007-0099628 A1); Ser. No. 11/465,466 (US 2007-0043807 A1); Ser. No. 11/465,796 (US 2007-0041333 A1); Ser. No. 11/460,976 (US 2008-0315596 A1); Ser. No. 11/428,536 (US 2007-0002793 A1); Ser. No. 11/428,535 (US 2007-0002792 A1); Ser. No. 11/425,047 (US 2007-0069885 A1) now U.S. Pat. No. 7,554,442; Ser. No. 11/425,040 (US 2006-0287008 A1) now U.S. Pat. No. 7,539,520; Ser. No. 11/424,850 (US 2007-0004331 A1); Ser. No. 11/424,849 (US 2007-0004330 A1) now U.S. Pat. No. 7,574,168; Ser. No. 11/424,847 (US 2007-0001898 A1) now U.S. Pat. No. 7,583,769; Ser. No. 11/424,845 (US 2006-0287822 A1) now U.S. Pat. No. 7,574,300; Ser. No. 11/423,127 (US 2006-0289204 A1) now U.S. Pat. No. 7,563,991; Ser. No. 11/422,306 (US 2006-0282217 A1)

now U.S. Pat. No. 7,542,849; Ser. No. 11/422,304 (US 2006-0276963 A1) now U.S. Pat. No. 7,526,381; Ser. No. 11/422,321 (US 2006-0276161 A1); Ser. No. 11/422,329 (US 2006-0274698 A1) now U.S. Pat. No. 7,529,547; Ser. No. 11/306,765 (US 2008-0136624 A1) now U.S. Pat. No. 7,394,361; Ser. No. 11/306,764 (US 2006-0237490 A1) now U.S. Pat. No. 7,391,321; Ser. No. 11/193,300 (US 2007-0024066 A1) now U.S. Pat. No. 7,438,334; Ser. No. 11/161,550 (US 2007-0002808 A1) now U.S. Pat. No. 7,430,437; Ser. No. 11/161,545 (US 2006-0018274 A1) now U.S. Pat. No. 7,221,668; Ser. No. 11/161,542 (US 2006-0023679 A1) now U.S. Pat. No. 7,522,568; Ser. No. 11/161,540 (US 2007-0004431 A1) now U.S. Pat. No. 7,200,132; Ser. No. 11/161,539 (US 2006-0023678 A1) now U.S. Pat. No. 7,209,468; Ser. No. 10/987,964 (US 2005-0093703 A1) now U.S. Pat. No. 7,155,264; Ser. No. 10/987,884 (US 2005-0093702 A1) now U.S. Pat. No. 7,133,704; Ser. No. 10/604,032 (US 2004-0082296 A1) now U.S. Pat. No. 6,934,540; Ser. No. 10/514,336 (US 2005-0215280 A1) now U.S. Pat. No. 7,209,771; and Ser. No. 09/681,282 (US 2002-0119770 A1) now U.S. Pat. No. 6,745,027.

Each of the foregoing patent application publications and patents is hereby incorporated herein by reference for purposes of disclosure of common designation (CD) technology (such as, e.g., class-based network (CBN) technology); wake-up (WU) technology; and networks that utilize such technologies (such as those of TeraHop Networks, Inc. of Alpharetta, Ga.), and systems employing such technologies including, inter alia: (1) implementations in the first responder context; (2) implementations in container tracking and monitoring context; and (3) implementations in equipment tracking and monitoring, especially rental construction equipment and FEMA equipment. It is intended that the CD/CBN and WU technologies, and related features, improvements, and enhancements, as disclosed in these incorporated references may be utilized in combination with various embodiments and implementations of the present invention.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND TO THE PRESENT INVENTION

Traditional asset tracking systems commercially available and commonly used typically utilize either radio frequency identification (hereinafter, "RFID") tags or global positioning system (hereinafter, "GPS") components for tracking items.

Generally, systems utilizing RFID tags require movement of tagged assets to within a few feet of a fixed reader or movement of the reader to within a few feet of the tagged assets. Further, confusion often results when several tagged assets are in close proximity. Moreover, it will be appreciated that systems utilizing RFID tags are limited by poor scalability, poor wireless security, RF noise and interference, lack of real-time alerting, poor ability to adjust to changes in number and configuration of tagged assets, poor sensor integration capability, and high infrastructure requirements.

Systems utilizing GPS generally are no more ideal, as GPS requires line-of-sight reception from multiple satellites, which limits system utility with assets that are located indoors or in other obscured sites. Indeed, it will be appreciated that systems utilizing GPS are limited by its high consumption of battery power, high device costs, high operating costs, and need for a separate data communications link to report asset position and/or to report sensor data.

It will still further be appreciated that despite recent advances in ad hoc networking in point-to-point communications as applied to asset tracking, the tracking of large numbers (i.e., thousands) of movable/moving assets via the monitoring of sensors attached thereto still posed significant challenges prior to the CBN and WU technologies of the incorporated patents and published patent applications.

In this respect, ad hoc wireless networks generally support point-to-point (i.e., node-to-node) communications without central control. Because nodes in wireless ad hoc networks are generally unconstrained by wires, communications is possible with nodes attached to mobile assets. Moreover, such communications are possible even as the assets and/or nodes move or are moved to new locations and even when the nodes change configurations. Consequently, wireless ad hoc networks allow for both quick network deployment and adjustment to the dynamic comings, goings, and re-positioning of the assets and/or the nodes.

Wireless ad hoc networks tend to be relatively inexpensive, fault-tolerant, and flexible. However, commonly used random-access protocols and the design and/or selection of radios to support such networks are often not well coordinated, with the result frequently being a sub-optimized network topology and constrained applications. Additionally, such networks typically organize on the basis of either physical proximity of the nodes or received signal strength. All of these factors introduce added latency, reduced throughput, and increased (and avoidable) transmissions and interference. As more nodes enter the network, these impairments are aggravated, and with each added transmission, battery power of the mobile nodes is consumed.

The use of spread spectrum techniques, either Frequency Hopping Spread Spectrum (hereinafter, "FHSS") or Direct Sequence Spread Spectrum (hereinafter, "DSSS"), mitigates some of these impairments.

A node employing FHSS repeatedly changes frequencies during transmissions (i.e., from one sub-channel to another) per an interference-avoiding algorithm that is utilized by all nodes of the same network. However, although FHSS can be very effective in minimizing interference (or deliberate jamming), all nodes must have the same algorithm, which has the effect of excluding whole categories of potential network users in commercial applications.

A node employing DSSS operates similarly but transmits on multiple frequencies according to the nature of the data to be sent, rather than explicitly avoiding interference. DSSS has the effect of minimizing interference, but has the disadvantage of needing the transmitting power of all nodes to be approximately equal, or else signal-blocking can result.

The CBN and WU technologies of the incorporated patents and published patent applications tend to address these noted drawbacks to ad hoc wireless networks, and are described in further detail below, as one or more preferred embodiments of the present invention utilize such technologies.

SUMMARY OF THE INVENTION

The present invention generally relates to networks, apparatus, methods, and systems for monitoring and managing resources, and facilitating such monitoring and management.

The present invention includes many aspects and features. Moreover, while many aspects and features relate to, and are described in, the context of monitoring and managing emergency services sector resources, the present invention is not limited to use only in this context, as will become apparent from the following summaries and detailed descriptions of aspects, features, and one or more embodiments and implementations of the present invention.

An aspect of the present invention relates to a system which includes a plurality of wireless islands, a computer application, and a message management and routing (MMR) system. The MMR system is configured to act as an intermediary for communication between one of the wireless islands and the computer application.

In a feature of this aspect of the invention, one of the plurality of wireless islands comprises a radio network.

In a feature of this aspect of the invention, the radio network comprises a plurality of remote sensor nodes (RSNs) that may be utilized to manage and locate resources (or assets) to which they are attached. Moreover, each RSN preferably includes one or more internal and external sensors. Using such sensors, for example, biometrics of a person or animal associated with an RSN can be monitored and/or the local environment of an RSN can be monitored for pathogens, gases, and/or radiation. Other possible sensors and uses thereof are disclosed, for example, in the incorporated references.

In a feature of this aspect of the invention, the radio network further comprises a gateway controller.

In a feature of this aspect of the invention, some RSNs of the plurality of RSNs each is configured to be worn on one's person.

In a feature of this aspect of the invention, some RSNs of the plurality of RSNs are configured to be attached to a vehicle.

In a feature of this aspect of the invention, some RSNs of the plurality of RSNs are configured to be transported by a vehicle.

In a feature of this aspect of the invention, an RSN of the plurality of RSNs is worn by a firefighter.

In a feature of this aspect of the invention, an RSN of the plurality of RSNs is attached to a police vehicle.

In a feature of this aspect of the invention, an RSN of the plurality of RSNs is attached to equipment used by emergency services sector (ESS) personnel.

In a feature of this aspect of the invention, the gateway controller is attached to a fire engine or fire truck.

In a feature of this aspect of the invention, the gateway controller is attached to a paramedic engine or rescue unit.

In a feature of this aspect of the invention, the gateway controller is attached to a police precinct building.

In a feature of this aspect of the invention, the gateway controller is attached to a fire station building.

In a feature of this aspect of the invention, an RSN of the plurality of RSNs is worn by ESS personnel, the gateway controller is mounted to an ESS vehicle, and the RSN is configured to wirelessly communicate with the gateway controller.

Another aspect of the present invention relates to a radio network. The radio network includes a plurality of remote sensor nodes (RSNs), each RSN having stored therein a unique identifier (UID); a gateway server corresponding to an Area ID; and one or more gateway routers; wherein, each of the plurality of RSNs is in wireless communication with the gateway router via one or more gateway servers.

In a feature of this aspect of the invention, RSNs of the plurality of RSNs are configured to hop messages from other RSNs.

In a feature of this aspect of the invention, the messages include an Area ID.

In a feature of this aspect of the invention, each RSN is configured to communicate periodic check-in messages to the gateway server.

In a feature of this aspect of the invention, the radio network utilizes class based networking.

In a feature of this aspect of the invention, each RSN includes a reduced complexity radio, and wherein an RCR wake-up message is transmitted before establishing node-to-node communication links.

In a feature of this aspect, a user records organizational and task assignments for resources or assets such that system behavior relative to the condition, status, and presence of the assets varies.

Another aspect of the present invention relates to a method of ascertaining the presence of an intermediate node in a network comprising a plurality of nodes and a gateway. The method includes configuring a check-in timer of each node to transmit a check-in message to the gateway at a certain time interval; communicating, by a periphery node, a check-in message inbound to the gateway via hops at a plurality of intermediate nodes; appending to the check-in message as it is hopped, at each intermediate node of the hops, the UID of that respective intermediate node, thereby creating a record of the path of the check-in message; receiving, at the gateway, the check-in message; sending, using the path of the check-in message, and acknowledgment to the periphery node; and resetting, at each intermediate node, a check-in timer upon hopping of the acknowledgment to that intermediate node.

Another aspect of the present invention relates to a method of ascertaining the presence of a node in a radio network.

Another aspect of the present invention relates to a method of ascertaining presence of an asset with which an RSN is associated in a radio network.

Another aspect of the present invention relates to a method of network beaconing.

Another aspect of the present invention relates to a method for detecting the presence of ESS resources. The method includes attaching an RSN to an asset; attaching a gateway controller to a mobile vehicle; dispatching, to an incident, the mobile vehicle; dispatching, to an incident, the asset; and forming, at the incident, a wireless network between the RSN and the gateway controller.

In a feature of this aspect of the invention, the method further includes communicating, by the gateway controller, an indication of the presence of the RSN at the incident to a computer application.

In a feature of this aspect of the invention, the method further includes communicating, by the gateway controller via WiFi, information associated with the RSN to a computer application.

An aspect of the present invention relates to a method for ascertaining the presence of a person or object via an RSN associated therewith. Features of this aspect pertain to network beacons; formation of the network; management of the network; and network adjustments and changes.

In another feature of this aspect, an improved method of formation and management of (wireless) ad-hoc networks is utilized, wherein several known protocols and methods are uniquely combined.

In another feature of this aspect, node presence status is updated by using incidental hop-routing data, wherein nodes that are in a hopping path make their presence known by appending their UIDs to the routing table of a hopped message, thereby making their presence known, rather than by requiring each node to update presence by sending a check-in message on some expected schedule.

In another feature of this aspect, a method is utilized for minimizing RF pollution (the total number of transmissions) and battery conservation while maximizing network range, including using network nodes to repeat a network beacon in a semi-random way wherein networks announce their availability with a beacon, which invites nodes to join, thereby extending the range of the network's beacon by having nodes repeat the beacon, and thereby minimizing the number of nodes involved to achieve maximum range. Variations of this aspect are applicable to implementations in the first responder context, implementations in the container tracking and monitoring context, implementations in the equipment tracking and monitoring context, especially that of construction and rental equipment.

Another aspect of the present invention relates to a method for merging a plurality of wireless ad-hoc networks into a single network, and un-merging (separating) a plurality of wireless ad-hoc networks out of a merged, single network. Features of this aspect include accommodating fixed and mobile gateways; each merging network sensing, via a gateway, the other networks and recognizing that the others are of their own class; automatically notifying a user application of the other networks; offering a user, via user application, the option of merging; controlling, via user application, whether networks are merged; and nodes following their respective gateways with regard to the merging. Variations of this aspect are particularly applicable to implementations in the first responder context, but are also applicable to implementations in the container tracking and monitoring context and implementations in the equipment tracking and monitoring context, especially that of construction and rental equipment.

Another aspect of the present invention relates to a method for a plurality of independent (wireless) gateways to subordinate their operation to a single gateway of that plurality of gateways. Features of this aspect include establishing one gateway, in a merging of networks, as a master gateway of the merged network; and controlling, via user application, which gateway becomes master. Variations of this aspect are particularly applicable to implementations in the first responder context, but are also applicable to implementations in the container tracking and monitoring context and implementations in the equipment tracking and monitoring context, especially that of construction and rental equipment.

Another aspect of the present invention relates to RSNs that are provided with autonomous behavior in implementations in the first responder context, implementations in the container tracking and monitoring context, implementations in the equipment tracking and monitoring context, especially that of construction and rental equipment.

Another aspect of the present invention relates to a method of partitioning a single physical (wireless) network into a plurality of logical networks that share a common infrastructure. Variations of this aspect are applicable to implementations in the first responder context, implementations in the container tracking and monitoring context, implementations in the equipment tracking and monitoring context, especially that of construction and rental equipment.

Another aspect of the present invention relates to a method for facilitating hopping when there is no continuous in-class path between a node and gateway by using both hard and soft (preferential) class-based networking, wherein hard class-based networking includes requiring all the nodes in the hopping path to have at least one class in common with the originating node in order for a message to get from an originating node to a gateway, and wherein soft (preferential) class-based networking includes requiring class commonality/continuity only for each hop, thereby greatly increasing the probability that messages of class-orphan nodes can get their messages through. Variations of this aspect are applicable to implementations in the first responder context, implementations in the container tracking and monitoring context, implementations in the equipment tracking and monitoring context, especially that of construction and rental equipment.

Another aspect of the present invention relates to the use of mobile gateways that form networks both while in motion and after becoming stationary. In features of this aspect, the mobile gateways are carried on trucks, cars, boats, planes, trains, containers, construction equipment, and rental equipment. In other features of this aspect, no network is formed unless a gateway is present; a network forms immediately when nodes come within in-range; and until nodes become in-range, nodes make no transmissions and are stealthy. Variations of this aspect are applicable to implementations in the first responder context, implementations in the container tracking and monitoring context, implementations in the equipment tracking and monitoring context, especially that of construction and rental equipment.

Other aspects of the present invention relate to the physical arrangements of the elements of the RSNs and the gateways. Features of these aspects include the aesthetic appearance and physical features of the devices. Variations of these aspects are applicable to implementations in the first responder context, implementations in the container tracking and monitoring context, implementations in the equipment tracking and monitoring context, especially that of construction and rental equipment.

Another aspect of the present invention relates to a system for monitoring and managing accountability of objects that may change location and/or organization. Features of this aspect include: basic network formation; merging nodes and networks; managing the subordination of nodes and networks; user application control of which nodes join a network; the use of commands from a user application to cause nodes to change behavior in response to sensor inputs; mobility of gateways; totality of ad-hoc formation and configuration; accommodation of intermittent connectivity; and network beaconing. Variations of this aspect are particularly applicable to implementations in the first responder context, but are also applicable to implementations in the container tracking and monitoring context and implementations in the equipment tracking and monitoring context, especially that of construction and rental equipment.

Another aspect of the present invention relates to a method for error correction using neighboring nodes, wherein if a target node fails to receive a data message or code download in its correct entirety, use is made of correct data/code residing in neighboring nodes as sources for correcting the data/code sent to target node, thereby avoiding the need to have to go back to the source of the data message or code for a resending. Variations of this aspect are applicable to implementations in the first responder context, implementations in the container tracking and monitoring context, implementations in the equipment tracking and monitoring context, especially that of construction and rental equipment.

Another aspect of the present invention relates to an improved method of formation and management of (wireless) ad-hoc networks, wherein several known protocols and methods are uniquely combined. Variations of this aspect are applicable to implementations in the first responder context, implementations in the container tracking and monitoring context, implementations in the equipment tracking and monitoring context, especially that of construction and rental equipment.

Another aspect of the present invention relates to a method for updating node presence status by using incidental hop-routing data, wherein nodes that are in a hopping path make their presence known by appending their UIDs to the routing table of a hopped message, making their presence known each time, rather than requiring each node to update presence by sending a check-in message on some expected schedule. Variations of this aspect are applicable to implementations in the first responder context, implementations in the container tracking and monitoring context, implementations in the equipment tracking and monitoring context, especially that of construction and rental equipment.

Another aspect of the present invention relates to a method for tracking parcels using systems, methods, and apparatuses disclosed and referenced herein.

Another aspect of the present invention relates to a method of changing a class "on-the-fly" for class-based routing in ad-hoc networks. In features of this aspect, such changes are carried out according to commands from a user application that cause nodes to change their classes (i.e., the set of classes to which they respond), or are carried out in order to cope with varying network conditions. Variations of this aspect are applicable to implementations in the first responder context, implementations in the container tracking and monitoring context, implementations in the equipment tracking and monitoring context, especially that of construction and rental equipment.

Another aspect of the present invention relates to a battery conservation device, wherein a battery's life is extended through use of power-supply circuit that decreases average current drawn by a device in order to extend the device's battery life. In a feature of this aspect, the device uses a "flywheel" concept. Variations of this aspect are applicable to implementations in the first responder context, implementations in the container tracking and monitoring context, implementations in the equipment tracking and monitoring context, especially that of construction and rental equipment.

Another aspect of the present invention relates to a method of accommodating large numbers of simultaneous attempts for network access by dynamic "pacing" of network operation, wherein if large numbers of nodes attempt to access a network simultaneously, the method applies timers and random back-offs to minimize congestion. Variations of this aspect are applicable to implementations in the first responder context, implementations in the container tracking and monitoring context, implementations in the equipment tracking and monitoring context, especially that of construction and rental equipment.

Another aspect of the present invention relates to a method for minimizing RF pollution (the total number of transmissions) and battery conservation by controlling transmissions based on known behavior of target receivers, wherein in a network that uses duty-cycle to conserve battery power and that uses timers to coordinate transmissions to coincide with receivers being on, nodes can note the specific behavior of neighboring radios and adjust the timing and duration of their transmissions accordingly. Variations of this aspect are applicable to implementations in the first responder context, implementations in the container tracking and monitoring context, implementations in the equipment tracking and monitoring context, especially that of construction and rental equipment.

Another aspect of the present invention relates to a method for minimizing RF pollution (the total number of transmissions) and battery conservation while maximizing network range, including using network nodes to repeat a network beacon in a semi-random way wherein networks announce their availability with a beacon, which invites nodes to join, thereby extending the range of the network's beacon by having nodes repeat the beacon, and thereby minimizing the number of nodes involved to achieve maximum range. Variations of this aspect are applicable to implementations in the first responder context, implementations in the container tracking and monitoring context, implementations in the equipment tracking and monitoring context, especially that of construction and rental equipment.

Another aspect of the present invention relates to a method for optimizing message retries sent from an application based on number of hops, wherein because the amount of time needed to get a message from a user application to a target node may be affected by the number of hops needed to reach that node, the number/frequency of message retries (in the event of failure) are dynamically adjusted to the number of hops, thereby avoiding wasted messages. Variations of this aspect are applicable to implementations in the first responder context, implementations in the container tracking and monitoring context, implementations in the equipment tracking and monitoring context, especially that of construction and rental equipment.

Another aspect of the present invention relates to a wireless two-way RF data communication device that forms a node of a data communications network, the device comprising: a memory having stored therein a unique identifier (UID) of the wireless two-way RF data communication device that uniquely identifies the wireless two-way RF data communication device within the data communications network; a receiver configured to receive radio frequency transmissions; a transmitter configured to make radio frequency transmissions; and electronic components arranged and configured, such that the wireless two-way RF data communication device communicates with other nodes of the data communications network in communicating messages from originating nodes to destination nodes, such that each message that is communicated by the wireless two-way RF data communication device either as an originating node or an intermediate node includes the UID of the wireless two-way RF data communication device, such that the wireless two-way RF data communication device communicates a presence message to a presence server at routine intervals based on a chronometric component of the two-way RF data communication device; and such that the measurement of the time until the next check-in message is to be sent by the wireless two-way RF data communication device is reset upon, communicating, as an intermediate node, a check-in message originating at another node of the data communications network, and receiving, for delivery to the originating node of the check-in message, an acknowledgement of receipt by the presence server for such check-in message.

Another aspect of the present invention relates to a data communications network, comprising: a plurality of wireless two-way radio frequency (RF) data communication devices, each wireless two-way RF data communication device forming a node of the data communications network and each wireless two-way RF data communication device including a memory having stored therein an unique identifier (UID) of the wireless two-way RF data communication device; wherein each wireless two-way RF data communication device comprises, a receiver configured to receive radio frequency transmissions, a transmitter configured to make radio frequency transmissions, and electronic components arranged and configured such that the wireless two-way RF data communication device communicates with other nodes of the data communications network in communicating messages from originating nodes to destination nodes, such that each message that is communicated by the wireless two-way RF data communication device, either as an originating node or an intermediate node, includes the UID of the wireless two-way RF data communication device, whereby a pathway by which each message is communicated in the data communications network is included with the message as the message is communicated in the data communications network, such that the wireless two-way RF data communication device communicates a presence message to a presence server at routine intervals based on a chronometer, and such that the measurement of the time until the next check-in message is to be sent by the wireless two-way RF data communication device is reset upon, communicating, as an intermediate node, a check-in message originating at another node of the data communications network, and receiving, for deliver to the originating node of the check-in message, an acknowledgement of receipt by the presence server for such check-in message.

Another aspect of the present invention relates to, in a data network comprising a plurality of wireless two-way radio frequency (RF) data communication devices, each wireless two-way RF data communication device forming a node of the data communications network, a method of tracking a pathway by which a message is communicated within a data communications network comprising the steps of: maintaining a unique identification (UID) of each of the plurality of wireless two-way RF data communication devices that form a node of the data communications network; and for each wireless two-way RF data communication device that communicates a message in the data communications network, including with the message the UID of the wireless two-way RF data communication device such that the pathway by which the message is sent from an originating node to a destination node is communicated to the destination node upon delivery of the message to the destination node, and wherein each wireless two-way RF data communication device performs the steps of, communicating a message from a first node of the data communications network to a gateway device along a pathway, the pathway including the wireless data communication device as an intermediary node of the pathway, including with the message the pathway by which the message is communicated in the wireless data communication device, storing, in a computer readable medium at the gateway device, information representing the pathway, updating, at the gateway device, presence information of the wireless data communication device, communicating an acknowledgment of the message to the first node along the reverse pathway, and upon communicating the acknowledgement of the message by the wireless data communication device, resetting a timer used by the wireless data communication device to trigger the sending of a presence indication of the wireless data communication device to the gateway device.

Another aspect of the present invention relates to a method of maintaining presence information associated with a wireless data communication device of a data communications network, comprising the steps of: communicating a message from a first node of the data communications network to a gateway device along a pathway, the pathway including the wireless data communication device as an intermediary node of the pathway; including with the message the pathway by which the message is communicated in the wireless data communication device; storing, in a computer readable medium at the gateway device, information representing the pathway; updating, at the gateway device, presence information of the wireless data communication device; communicating an acknowledgment of the message to the first node along the reverse pathway; and upon communicating the acknowledgement of the message by the wireless data communication device, resetting a timer used by the wireless data communication device to trigger the sending of a presence indication of the wireless data communication device to the gateway device.

Another aspect of the present invention relates to a method of indicating presence by a wireless data communication device that forms a node in a data communications network, comprising the steps of: receiving, at the wireless data communication device, a message originating at a first node and addressed to a gateway device; storing, in a computer readable medium of the wireless data communication device, information associated with the message; communicating, by the wireless data communication device, for delivery to gateway device, the message to another node of the data communications network; receiving, at the wireless data communication device, an acknowledgment of the message by the gateway device; resetting a timer at the wireless data communication device; and communicating, by the wireless data communication device, for delivery to the first node, the acknowledgment of the message by the gateway device; wherein the wireless data communication device is configured to communicate a message to the gateway device indicating the presence of the wireless data communication device as a node in the data communications network at predetermined intervals based on the timer.

Another aspect of the present invention relates to a wireless two-way RF data communication device. The wireless two-way RF data communication device includes a memory having stored therein common designations of the wireless two-way RF data communication device; a receiver configured to receive radio frequency transmissions; a transmitter configured to make radio frequency transmissions; and electronic components. The electronic components are arranged and configured such that the wireless two-way RF data communication device receives and processes communications as a function of at least one of the common designations of the wireless two-way RF data communication device being in the communication, and such that each message that is received in a communication associated with a particular common designation of the RF data communication device, and for which the wireless two-way RF data communication device is not the destination recipient but, instead, is an intermediate recipient, is communicated, to another wireless two-way RF data communication device that has the same particular common designation, if such a wireless two-way RF data communication device is available, and if such a wireless two-way RF data communication device is unavailable, to another wireless two-way RF data communication device that has a common designation that is the same as a common designation stored in the memory, if such a wireless two-way RF data communication device is available.

In a feature of this aspect of the invention, the two-way RF data communication device is a wireless transceiver that includes microprocessor capabilities.

In a feature of this aspect of the invention, the two-way RF data communication device is a remote sensor node (RSN).

In a feature of this aspect of the invention, the two-way RF data communication device is a wireless reader tag (WRT).

In a feature of this aspect of the invention, the two-way RF data communication device serves as a wireless tag (WT).

In a feature of this aspect of the invention, the common designations stored in the memory are class designations for use in class-based networks.

In a feature of this aspect of the invention, the electronic components are arranged and configured such that the wireless two-way RF data communication device receives and processes only communications that include at least one of the common designations of the wireless two-way RF data communication device.

In a feature of this aspect of the invention, the electronic components are arranged and configured such that the communications provided are performed only for predetermined common designations and not for all common designations.

In a feature of this aspect of the invention, the electronic components are arranged and configured such that the wireless two-way RF data communication device selectively operates between at least a first state, in which the communications provided are enabled, and in a second state, in which the communications provided are disabled.

Another aspect of the present invention relates to a data communications network. The data communications network includes a plurality of wireless two-way radio frequency (RF) data communication devices, each wireless two-way RF data communication device forming a node of the data communications network and each wireless two-way RF data communication device including a memory having stored therein a common designation; wherein at least one of the wireless two-way RF data communication devices further includes a second common designation stored in the memory thereof and comprises a receiver configured to receive radio frequency transmissions, a transmitter configured to make radio frequency transmissions, and electronic components arranged and configured such that the wireless two-way RF data communication device receives and processes communications as a function of at least one of the common designations of the wireless two-way RF data communication device being in the communication, and such that each message that is received in a communication associated with a particular common designation of the RF data communication device, and for which the wireless two-way RF data communication device is not the destination recipient but, instead, is an intermediate recipient, is communicated to another wireless two-way RF data communication device that has the same particular common designation, if such a wireless two-way RF data communication device is available, and if such a wireless two-way RF data communication device is unavailable, to another wireless two-way RF data communication device that has a common designation that is the same as a common designation stored in the memory, if such a wireless two-way RF data communication device is available.

In a feature of this aspect of the invention, the first and second common designations stored in the memory of the at least one of the wireless two-way RF data communication devices are class designations for use in class-based networking.

In a feature of this aspect of the invention, the electronic components of the at least one of the wireless two-way RF data communication devices are arranged and configured such that the communications provided are performed only for predetermined common designations and not for all common designations.

In a feature of this aspect of the invention, the electronic components of the at least one of the wireless two-way RF data communication devices are arranged and configured such that the wireless two-way RF data communication device selectively operates between at least a first state, in which the communications provided are enabled, and in a second state, in which the communications provided are disabled.

In a feature of this aspect of the invention, each node of the data communications network comprises a wireless radio-frequency data communication device having a transmitter and a receiver that collectively receive and transmit information wirelessly.

In a feature of this aspect of the invention, each wireless two-way RF data communication device comprises a standards-based data packet radio component that includes both said receiver and said transmitter of the respective wireless two-way RF data communication device.

In a feature of this aspect of the invention, the information is wirelessly communicated in data packets in the data communications network.

In a feature of this aspect of the invention, a plurality of the wireless two-way RF data communication devices are respectively attached to assets for monitoring and tracking of the asset.

In a feature of this aspect of the invention, a plurality of the wireless two-way RF data communication devices are permanently affixed to a structure for monitoring and/or tracking assets that come within a proximity thereto.

In a feature of this aspect of the invention, a plurality of the wireless two-way RF data communication devices each comprises a wireless transceiver that includes microprocessor capabilities.

Another aspect of the present invention relates to, in a data network comprising a plurality of wireless two-way radio frequency (RF) data communication devices, each wireless two-way RF data communication device forming a node of the data communications network, a method of communicating a message from an originating node to a destination node by way of intermediate nodes. The method includes the steps of maintaining multiple class designations in memory of a particular one of the wireless two-way radio frequency (RF) data communication devices forming a node of the network; and for each message that is received by the particular wireless two-way radio frequency (RF) data communication device in a communication associated with a common designation of the particular wireless two-way radio frequency (RF) data communication device, and for which the particular wireless two-way RF data communication device is an intermediate node with respect to the message, forwarding the message to another node of the network that has the same particular common designation associated with the message, if such another node is available, and if such another node is unavailable, to another node that has a common designation that is the same as a common designation stored in the memory of the particular wireless two-way radio frequency (RF) data communication device, if such a node is available.

In a feature of this aspect of the invention, the particular wireless two-way radio frequency (RF) data communication device receives and processes communications as a function of at least one of the common designations of the particular wireless two-way RF data communication device being in the communication.

In a feature of this aspect of the invention, the first and second common designations stored in the memory of the particular wireless two-way RF data communication device are class designations for use in class-based networking, the particular wireless two-way RF data communication device conjoining at least two logically distinct class-based networks.

In a feature of this aspect of the invention, said step of forwarding the message to a node that has the same common designation if such another node is unavailable is performed only for predetermined common designations and not for all common designations.

In a feature of this aspect of the invention, the method further includes switching between at least two states of operation by the particular wireless two-way RF data communication device, wherein said step of forwarding the message to a node that has the same common designation if such another node is unavailable is not performed in the second state.

In a feature of this aspect of the invention, the particular wireless two-way RF data communication device switches between the first and second state in response to a command that is received by the particular wireless two-way RF data communication device in a wireless communication.

In a feature of this aspect of the invention, the particular wireless two-way RF data communication device switches between the first and second state in response to a sensed condition.

In a feature of this aspect of the invention, the particular wireless two-way RF data communication device switches between the first and second state at predetermined times.

Another aspect of the present invention relates to a data communication network comprising at least two logically distinct class-based networks conjoined by at least one common node that has membership in each of the respective classes of the two logically distinct class-based networks.

Another aspect of the present invention relates to a pre-assignment system. The pre-assignment system includes pre-assignment software configured to allow a user to pre-assign resources; a pre-assignment database (PADB) configured to store pre-assignments of resources; and an incident management system (IMS), the incident management system comprising IMS software loaded on a mobile device, one or more remote sensor nodes, each RSN being attached to a resource, and one or more mobile gateway systems (MGSs).

Another aspect of the present invention relates to a system for monitoring assets.

Another aspect of the present invention relates to a system comprising means for monitoring assets.

Another aspect of the present invention relates to a system for tracking assets.

Another aspect of the present invention relates to a means for tracking assets.

Another aspect of the present invention relates to a system for assigning assets.

Another aspect of the present invention relates to a means for assigning assets.

Another aspect of the present invention relates to apparatus used for monitoring assets.

Another aspect of the present invention relates to apparatus used for tracking assets.

Another aspect of the present invention relates to apparatus used for assigning assets.

Another aspect of the present invention relates to a method for monitoring assets.

Another aspect of the present invention relates to a method comprising steps for monitoring assets.

Another aspect of the present invention relates to a method for tracking assets.

Another aspect of the present invention relates to a method comprising steps for tracking assets.

Another aspect of the present invention relates to a method for assigning assets.

Another aspect of the present invention relates to a method comprising steps for assigning assets.

Another aspect of the present invention relates to a system for merging.

Another aspect of the present invention relates to means for merging.

Another aspect of the present invention relates to apparatus for merging.

Another aspect of the present invention relates to a method for merging.

Another aspect of the present invention relates to a method comprising steps for merging.

Another aspect of the present invention relates to a method of automatically identifying radio channels for interoperability.

Another aspect of the present invention relates to a method comprising steps for automatically identifying radio channels for interoperability.

Another aspect of the present invention relates to means for automatically identifying radio channels for interoperability.

Another aspect of the present invention relates to a system for automatically identifying radio channels for interoperability.

Another aspect of the present invention relates to apparatus for automatically identifying radio channels for interoperability.

Another aspect of the present invention relates to a method of controlling device operations.

Another aspect of the present invention relates to a system for controlling device operations.

Another aspect of the present invention relates to apparatus for controlling device operations.

Another aspect of the present invention relates to a method for input/output enhancement for computer aided dispatch and automated call-systems.

Another aspect of the present invention relates to a method comprising steps for input/output enhancement for computer aided dispatch and automated call-systems.

Another aspect of the present invention relates to a system for input/output enhancement for computer aided dispatch and automated call-systems.

Another aspect of the present invention relates to apparatus for input/output enhancement for computer aided dispatch and automated call-systems.

Another aspect of the present invention relates to a method for sharing network architecture.

Another aspect of the present invention relates to a system for sharing network architecture.

Another aspect of the present invention relates to apparatus for sharing network architecture.

Another aspect of the present invention relates to a method of providing network services.

Another aspect of the present invention relates to a system for providing network services.

Another aspect of the present invention relates to apparatus for providing network services.

Another aspect of the present invention relates to a method for determining presence.

Another aspect of the present invention relates to a system for determining presence.

Another aspect of the present invention relates to apparatus for determining presence.

Another aspect of the present invention relates to a method for determining presence of objects.

Another aspect of the present invention relates to a system for determining presence of objects.

Another aspect of the present invention relates to apparatus for determining presence of objects.

Another aspect of the present invention relates to a method of network beaconing.

Another aspect of the present invention relates to a method comprising steps for network beaconing.

Another aspect of the present invention relates to means for beaconing.

Another aspect of the present invention relates to apparatus for beaconing.

Another aspect of the present invention relates to apparatus for network beaconing.

Another aspect of the present invention relates to a system for beaconing.

Another aspect of the present invention relates to a system for network beaconing.

Another aspect of the present invention relates to a manager-controller.

Another aspect of the present invention relates to a node configured for beaconing.

Another aspect of the present invention relates to a conjoined class-based network.

Another aspect of the present invention relates to a method for conjoined class-based networking.

Another aspect of the present invention relates to a method of merging a plurality of wireless islands.

Another aspect of the present invention relates to a method of merging a plurality of radio networks.

Another aspect of the present invention relates to a method of merging a plurality of MMR systems.

Another aspect of the present invention relates to a method of merging a plurality of gateway controllers.

Another aspect of the present invention relates to an MMR system.

Another aspect of the present invention relates to a computer application for use by a customer. Moreover "customer" as used herein refers to an entity which has contracted with a managing entity (e.g., Terahop Networks, Inc. of Alpharetta, Ga.) for services related to resource monitoring, resource management, or both. Thus, a customer application is an application that is used by the customer to facilitate such resource monitoring and/or management, and similarly, a customer device is a device used by a customer to facilitate such resource monitoring and/or management.

Another aspect of the present invention relates to a customer device.

Another aspect of the present invention relates to a radio network.

Another aspect of the present invention relates to a wireless network island.

Another aspect of the present invention relates to a breadcrumb.

Another aspect of the present invention relates to a method of detecting the presence of RSNs attached to assets at an incident.

Another aspect of the present invention relates to a localized MMR system.

Another aspect of the present invention relates to incident management software.

Another aspect of the present invention relates to an RSNs having sensors.

Another aspect of the present invention relates to a breadcrumb.

Another aspect of the present invention relates to a mote.

Another aspect of the present invention relates to a method of adaptive beaconing.

Another aspect of the present invention relates to a method comprising steps for adaptive beaconing.

Another aspect of the present invention relates to means for adaptive beaconing.

Another aspect of the present invention relates to apparatus for adaptive beaconing.

Another aspect of the present invention relates to a system for adaptive beaconing.

Another aspect of the present invention relates to software configured for adaptive beaconing.

Another aspect of the present invention relates to a remote sensor node configured to originate a distress-alert.

Another aspect of the present invention relates to an apparatus configured to originate a distress-alert.

Another aspect of the present invention relates to a method of utilizing hop-path information.

Another aspect of the present invention relates to a method of utilizing GPS information.

Another aspect of the present invention relates to a system utilizing hop-path information.

Another aspect of the present invention relates to a method of utilizing hop-path information to determine a likely closest node to another node.

Another aspect of the present invention relates to an apparatus for utilizing hop-path information.

Another aspect of the present invention relates to a method of localizing the position of a first responder in distress.

Another aspect of the present invention relates to a method of providing assistance to a first responder in distress.

It should be understood that it is explicitly contemplated that systems, networks, and apparatus of the present invention may employ and utilize, and do employ and utilize, each and any of the inventive aspects and features of the incorporated references including, by way of example, and not limitation:

the inventive aspects and features of incorporated U.S. patent application publication titled "Class Switched Networks for Tracking Articles";

the inventive aspects and features of incorporated U.S. patent application publication titled "Systems and Methods Having LPRF Device Wake Up Using Wireless Tag";

the inventive aspects and features of incorporated U.S. patent application publication titled "Forming Communication Cluster of Wireless Ad Hoc Network Based on Common Designation";

the inventive aspects and features of incorporated U.S. patent application publication titled "Forming Ad Hoc RSI Networks Among Transceivers Sharing Common Designation";

the inventive aspects and features of incorporated U.S. patent application publication titled "Communications Within Population of Wireless Transceivers Based On Common Designation";

the inventive aspects and features of incorporated U.S. patent application publication titled "Transmitting Sensor-Acquired Data Using Step-Power Filtering";

the inventive aspects and features of incorporated U.S. patent application publication titled "Network Formation in Asset-Tracking System Based on Asset Class";

the inventive aspects and features of incorporated U.S. patent application publication titled "LPRF Device Wake Up Using Wireless Tag";

the inventive aspects and features of incorporated U.S. patent application publication titled "Propagating Ad Hoc Wireless Networks Based on Common Designation and Routine";

the inventive aspects and features of incorporated U.S. patent application publication titled "Remote Sensor Interface (RSI) Stepped Wake-Up Sequence";

the inventive aspects and features of incorporated U.S. patent application publication titled "All Weather Housing Assembly for Electronic Components";

the inventive aspects and features of incorporated U.S. patent application publication titled "Operating GPS Receivers in GPS-Adverse Environment";

the inventive aspects and features of incorporated U.S. patent application publication titled "Remote Sensor Interface (RSI) Having Power Conservative Transceiver for Transmitting and Receiving Wakeup Signals";

the inventive aspects and features of incorporated U.S. patent application publication titled "Event-Driven Mobile HAZMAT Monitoring";

the inventive aspects and features of incorporated U.S. patent application publication titled "Communicating via Nondeterministic and Deterministic Network Routing";

the inventive aspects and features of incorporated U.S. patent application publication titled "Maintaining Information Facilitating Deterministic Network Routing";

the inventive aspects and features of incorporated U.S. patent application publication titled "Determining Relative Elevation Using GPS and Ranging";

the inventive aspects and features of incorporated U.S. patent application publication titled "Using GPS and Ranging to Determine Relative Elevation of an Asset";

the inventive aspects and features of incorporated U.S. patent application publication titled "Determining Presence of Radio Frequency Communication Device"; and the inventive aspects and features of incorporated U.S. patent application publications titled "Communications and Systems Utilizing Common Designation Networking".

Thus, for instance, it is within the scope of the disclosed invention that first responder implementations in accordance with at least some preferred embodiments of the invention utilize one or more aspects and features set forth and identified in the incorporated U.S. patent application publication titled "Communicating via Nondeterministic and Deterministic Network Routing". Indeed, utilization of this technology in the first responder context enables significant advances and benefits in such context when extended in accordance with the present invention. In particular, by including node (i.e., RSN) pathways in inbound messages to a gateway controller or server, as set forth in the incorporated U.S. patent application publication titled "Communicating via Nondeterministic and Deterministic Network Routing", the gateway controller or server can derive therefrom knowledge of the presence of the nodes by which the message was delivered. Sending back along the deterministic pathway an ACK then may signify to each intermediate node passing the message that the gateway controller or server has identified the presence of such node. Such node then may "reset" its protocol for responding to, for instance, a Presence Broadcast (as defined and used in the incorporated U.S. patent application publication titled "Determining Presence of Radio Frequency Communication Device"); or such node may reset a timer by which the node is configured to send a presence message to the gateway controller or server at predetermined time intervals. It is believed that, by leveraging the hopping capability of the RSNs in this manner, the number of responses to Present Broadcasts and the number of messages sent to indicate presence of an RSN, can be significantly reduced. The same advantages and benefits, to a greater or lesser extent, are similarly believed to be achieved in other implementations, too, including container monitoring and tracking security as well as construction equipment monitoring and tracking.

In addition to any mentioned aspects and features of the present invention, it should be noted that the present invention further encompasses the various possible combinations and subcombinations of such aspects and features.

BRIEF DESCRIPTION OF THE DRAWINGS

One or more preferred embodiments of the present invention now will be described in detail with reference to the accompanying drawings, wherein the same elements are referred to with the same reference numerals, and wherein:

FIG. 16 illustrates that a check-in message originating at node 219 requires three hops to get from node 219 to the gateway 241 in the exemplary network 210 of FIG. 15.

FIG. 32 illustrates the use of hook and loop fasteners to make assignments in a conventional methodology in accordance with a preferred embodiment of the present invention.

FIGS. 36A-B illustrate exemplary RSNs in accordance with a preferred embodiment of the present invention.

DETAILED DESCRIPTION

Figure 1:
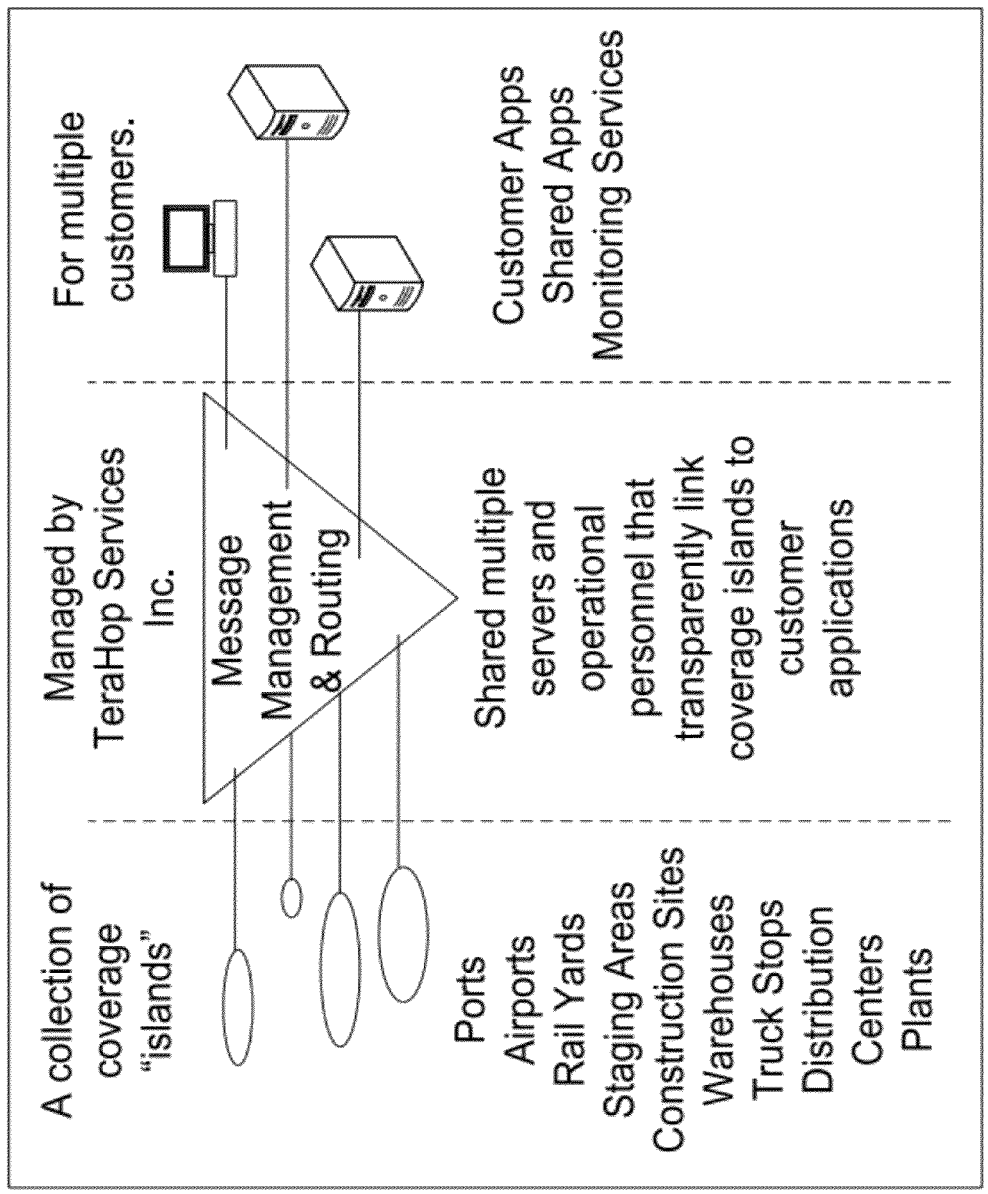
FIG. 1 illustrates a system in accordance with one or more preferred embodiments provided by a managing entity (e.g., a commercial service provider) having a plurality of discrete wireless islands linked through common message handling components and capable of presenting common access and views to multiple customers of the managing entity.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Additionally, a "radio network" in accordance with one or more preferred embodiments disclosed herein preferably comprises a gateway server, one or more gateways (sometimes termed gateway routers), and a plurality of RSNs. Each RSN preferably includes CBN and WU technologies as previously mentioned. Each gateway is preferably connected to the gateway server, which comprises software and a computing device on which that software runs. A gateway that is connected to a gateway server is described as "captured", while a gateway that is not connected to a gateway server is described as "free". Similarly, an RSN that is connected to a radio network is described as "captured", while an RSN that is not connected to a radio network is described as "free".

When an RSN is captured by a radio network, the RSN can be characterized as a "node" of the radio network and can function as both an end point as well as a routing device for messages passed through the network. Further, each gateway may include one or more "gateway RSNs" or "top level RSNs", each of which functions as a communication interface with the gateway for other RSNs. Thus, in a radio network, each gateway, just like each RSN, can be characterized as a "node" of a radio network, depending on the context of use.

A gateway and gateway server together collectively comprise a "gateway controller" (GC). Such a gateway controller can switch between functioning solely as a gateway, and functioning as a gateway controller. A gateway and gateway server that are integrated together can be characterized as an "integrated" gateway controller, while a gateway and gateway server that are physically separate, and preferably connected by a high-capacity, high-reliability data link, can be characterized as a "logical" gateway controller.

A preliminary review of CBN and WU technologies preferably utilized in one or more preferred radio networks of the present invention will now be provided. Such descriptions of CBN and WU technologies should be understood to be only generalizations and are provided for setting a contextual background in technologies that preferably are used with embodiments and implementations of the current invention, but are not required in every such embodiment. Accordingly, such generalizations should not be interpreted as applying literally to every possible embodiment or implementation of such background technologies.

Preliminary Review

Class-Based Networking (CBN) Technology

In accordance with CBN technology, each node in a class-based radio network has at least one common designation—comprising a class designation—assigned to it. Wireless ad hoc hierarchical radio networks form using transceivers of these nodes. Preferably, the transceiver is a standards-based radio, and the node includes a second low-power radio (the RCR) for wake-up (discussed below) and a controller. The controller operates per class-based networking protocols and per self-configuration protocols that are optimized for class-based networking. This combination enables autonomous reconfiguration and behavioral changes of the node in response to changes in the node's location, the presence of other nodes, changes in a battery level of the node, environmental changes, or other changes.

Figure 2:
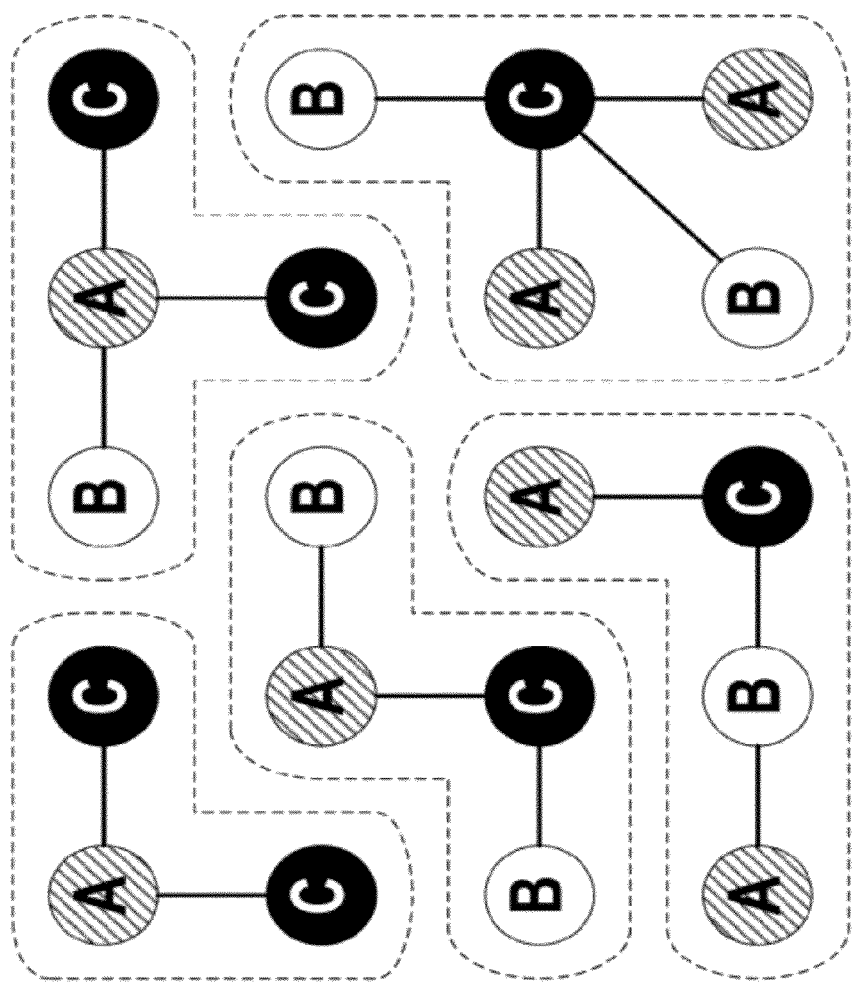
FIG. 2 illustrates point to multi-point networking where connectivity is determined by proximity in a conventional ad hoc network.

In contrast to CBN networking, and as described above, older, more traditional ad hoc networks generally form based on physical proximity of the nodes and/or an effective radio range of the nodes (which usually turns on physical proximity). Only those nodes that are in radio range of one another (which typically means that they are physically close to one another) can communicate with each other and form a network. FIG. 2 illustrates such networking where connectivity is determined by proximity. In FIG. 2, nodes are shown as including class, but the networks have been formed in accordance with the more traditional methodology. It will therefore be appreciated that nodes enclosed within each delineated dotted line in FIG. 2 are connected and comprise a network.

Figure 3:
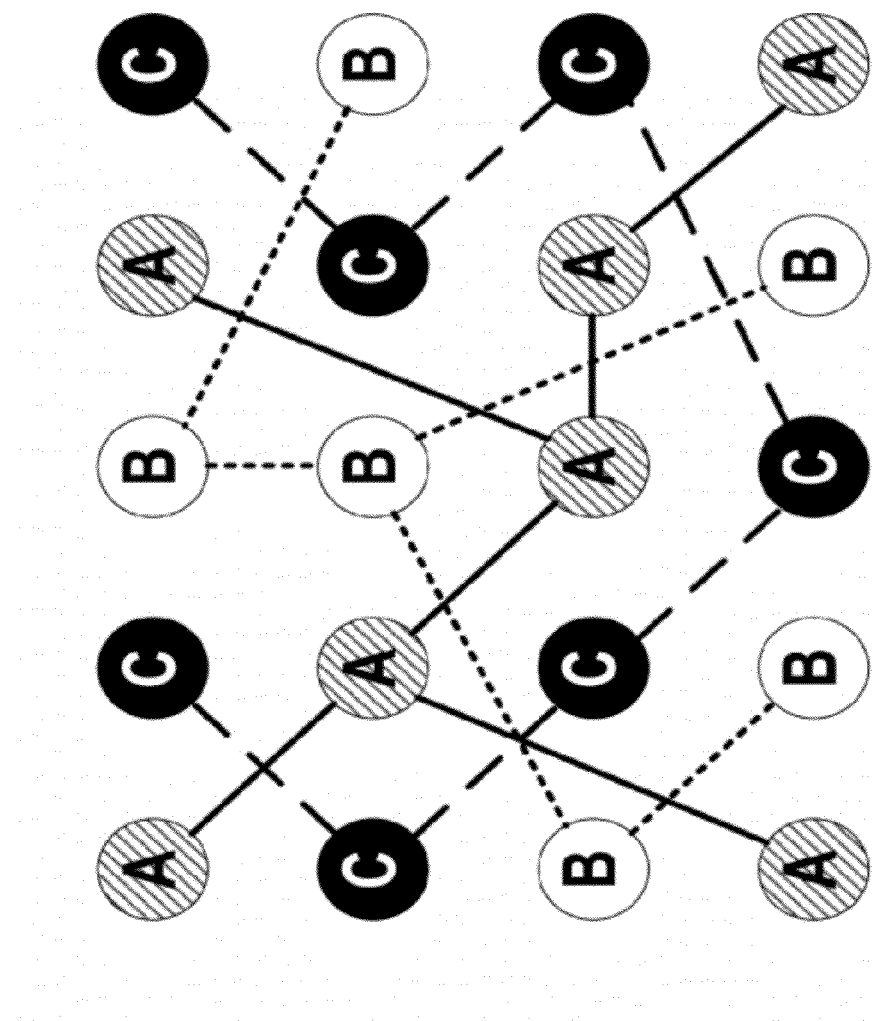
FIG. 3 illustrates the same array of nodes depicted in FIG. 2, only networked using CBN technology in accordance with the CBN technology of the incorporated patents and published patent applications.

In comparison, FIG. 3 shows the same nodes where the networks have formed based on the common class designations of the nodes. Thus, as shown in FIG. 3, nodes sharing a class in common (e.g., having membership in Class "A"s) communicate and form a network among themselves and are logically distinct and separated from the other non-A nodes (i.e., transmissions within the class A network do not cause any power consumption by the other nodes because the other nodes of class B and C do not receive and process or hop messages of class A. Of course, the nodes still must be within radio range of each other, or otherwise be able to communicate through hopping, in order to form such networks, but other nodes that may be in close proximity but are not of the same class are excluded from the class-based networks. The class designation of each node in FIGS. 2-3 is indicated by the letters "A", "B", and "C". A class may be a customer, an agency, a type of asset, etc., and nodes may have membership in multiple classes even though FIGS. 2-3 illustrate nodes each of single class for simplicity.

Within various implementations, RSNs and Gateways can be configured to allow only devices of certain classes to participate in certain networks, and RSNs and Gateways can be configured into several classes, any of which can be invoked at any time to admit or to restrict participation. Consequently, RSNs associated with assets of various owners or of various types can be monitored independently of all others that may be at a given locations, yet all share the same network infrastructure. That is, networks can be logically partitioned and segregated, and that partitioning can be used to enable or exclude hopping by certain RSNs.

It will be appreciated that use of the CBN technology contributes to reduction in battery consumption by minimizing RSN participation in networks that are of no value to the owners/custodians of the assets with which the RSNs are associated. CBN technology further contributes to reduction in RF noise/interference by reducing total transmissions that otherwise would be made in conventional ad hoc network configurations, such as in mesh networking. Importantly, however, CBN technology does enable an entity such as a governmental authority (e.g., FEMA or the Department of Homeland Security) to address any or all radios at a given location using an appropriate "super" class designation.

Preliminary Review

Wake-Up (WU) Technology

Although transmissions from a wireless node consume battery power, it is the node's receiver that usually limits battery life. Traditionally, a node's receiver has always been on, at least in a standby state, so that transmissions from other nodes can be received at any time. Since this receiver is usually similar in complexity and capability to the transmitter from which data is received, the receiver drains significant current from the node's battery. Even when this receiver is cycled on and off, thus reducing its average current drain, battery life is still limited to days or weeks without re-charging.

Receiver current consumption can be dramatically improved by using a low-power transceiver to turn on a high-power complex transceiver in accordance with the WU technology of the incorporated patent publications and patents. The complex transceiver of a node is a high-power standard-based radio, which is used for transferring files. The simple transceiver (or just simple receiver in some instances) is a wake-up radio, which is used to establish a message path to other RSNs and to a Gateway. When there are no sensor inputs nor any messages to be relayed, an RSN is essentially dormant. Only the wake-up radio is energized, listening for messages that pertain to it. When it hears such a message, the wake-up radio turns on other systems of that RSN such that a message is sent to a Gateway, either directly or through other RSNs via hopping. Each RSN that may be in the message path in turn wakes up, relays the message, then returns to its dormant state. Using such WU technology, the complex transceiver is turned on generally only when needed to transfer data, like when hopping a message.

Figure 4:
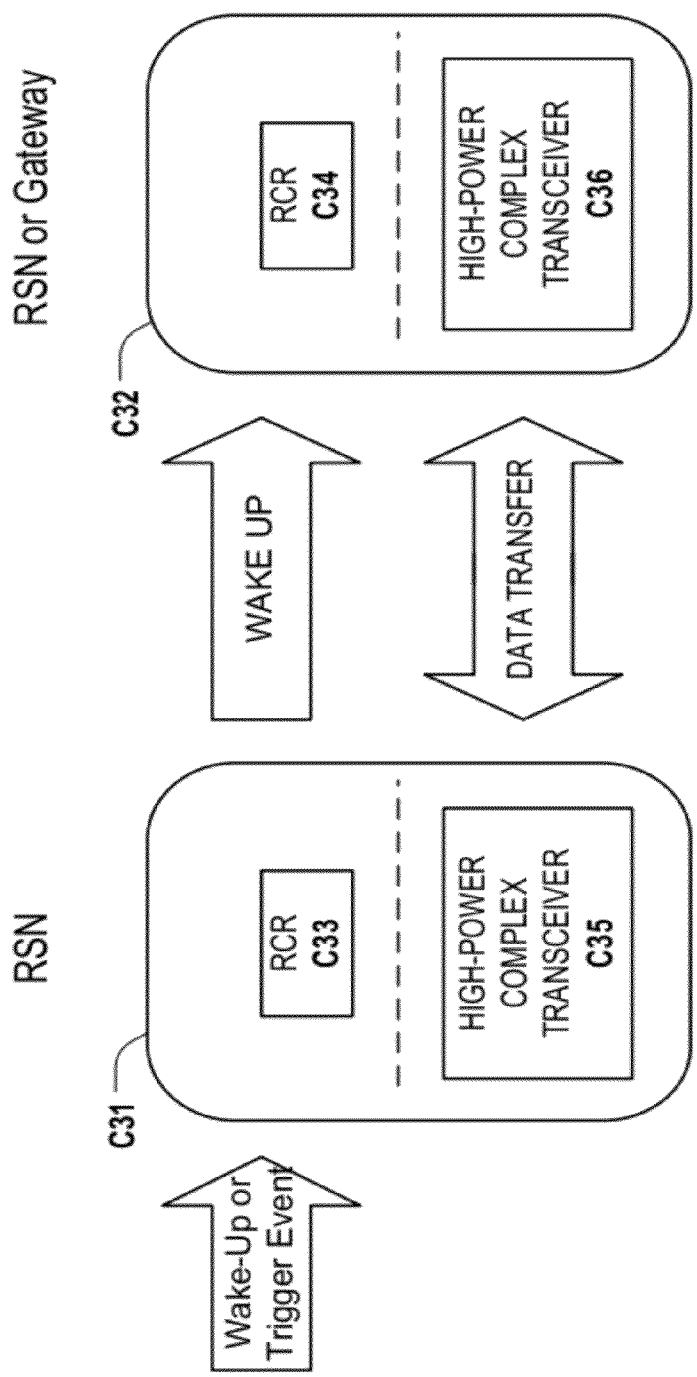
FIG. 4 is a block diagram illustrating a wake-up process in accordance with the WU technology of the incorporated patents and published patent applications.

FIG. 4 illustrates the preferred WU methodology wherein a first RSN C31 forming a node in a class-based network communicates with a second RSN C32 forming a node in the class-based network. First in this process, a wake-up transceiver comprising a reduced complexity radio or "RCR" C33 of the first node C31 signals a wake-up transceiver comprising a reduced complexity radio or "RCR" C34 of the second node C32. The RCR C34 of the second node C32 then wakes-up the complex transceiver C36 of the second node C32, and data communication commences between the complex transceiver C35 of the first node and the complex transceiver C36 of the second node C32.

It should further be noted that the RCR C33 of the first node C31 may have received a wake-up signal, upon which the complex transceiver C35 of the first node C31 was awaken. Alternatively, the controller of the node may have awoken the complex transceiver C35 for communication, or a trigger event may have occurred as determined by an associated sensor of the node C31.

After the data communication is complete, the complex transceivers C35,C36 of the nodes C31,C32 shut down.

Despite the simplicity of RCRs, selectivity in wake-up is achieved using CBN technology. Furthermore, because the amount of data exchanged by RCRs is tiny, it is believed that sensitivity of the RCRs is not a practical issue in at least some implementations.

It further will be appreciated from the incorporated references that, in alternative variations of the foregoing, a simple wake-up receiver may be used in place of the RCR, and that the complex transceiver may be used to wake-up another RSN or Gateway using the complex transceiver. In this regard, the wake-up transceiver may be a passive transceiver similar to a passive RFID tag that is configured to awaken the complex transceiver upon receipt of an appropriate class-based wake-up signal, whereupon the simple receiver provides an electronic signal waking up the complex transceiver rather than "chirping" back to the incoming signal. The wake-up process further may be stepped in accordance with the stepped wake-up processes of the incorporated patent publications and patents.

In any case, as a result of the WU technology, RSNs have exceptionally long battery life (over two years in typical applications), yet RSNs can communicate at high power when needed, thereby enabling long range communications or providing complex communications with high data throughput, when demanded. Further, since RSNs make no transmissions unless they have relevant message traffic, networks of RSNs generally are stealthy and presence of the RSNs may go unnoticed for long periods of time, making it difficult to detect or spoof such networks.

Figure 5:
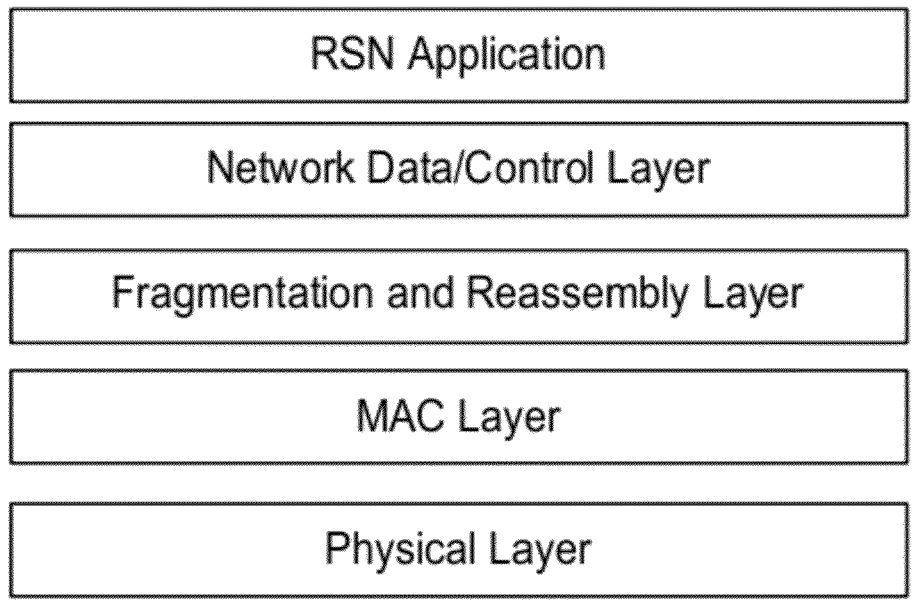
FIG. 5 illustrates layers of an architectural model of computer networking in accordance with a preferred communication system of the present invention.

With further regard to network communications using WU technology and the layers of the architectural model of computer networking shown in FIG. 5, communication between nodes along a path, i.e., communication associated with a node's routing functionality, is provided by the MAC layer or the network layer, while communication between the end points is provided by the application layer.

Overview of Some Various Preferred Implementations

The long battery life and long range of RSNs, provided by the utilization of CBN and WU technologies, makes true monitoring and tracking of mobile and/or movable assets practical and commercially viable. This practicality and viability opens up many inventive implementations having commercial benefits, the desires for which have long been felt, but the means for which have heretofore been unobtainable. A brief overview of three such implementations is now set forth.

Various Preferred Implementations

First Responder Implementation

In a first-responder context, RSNs are worn by first responders, such as firefighters, and gateway controllers are mounted to trucks and engines. As firefighters get into a truck to respond to a fire, a gateway controller on that truck automatically notes the presence of those on board via their RSNs.

On scene, a gateway controller on an incident commander's vehicle automatically notes the arrival of the truck, and the truck's gateway controller communicates to the incident commander's gateway controller the identities of those present in the truck and other related data. The incident commander's gateway controller then communicates this data associated with the arrival to an application on the incident commander's laptop. This information (and information pertaining to other trucks) is displayed on the incident commander's laptop. A cellular link from the incident commander's gateway controller to dispatch conveys GPS data of the incident and the identity of all units present, preferably for graphical display.

As the incident progresses, the incident commander makes assignments using his laptop. Based on these assignments, commands are sent to the RSNs at the scene, such as, for example, to effect classes changes and corresponding behavior of the RSNs. These changes could include having an RSN detect the absence of motion, thereby allowing the RSN to function as an alarm indicating that a firefighter is in distress, thus supplementing traditional personal alert safety system (PASS) devices. As trucks and firefighters depart (either at the conclusion of the incident or otherwise), the incident commander's laptop automatically informs the incident commander that these departing trucks and firefighters are no longer present, thus supplementing other accountability measures.

Once firefighters and trucks have arrived back at their stations, gateway controllers located at each station automatically report their return to dispatch and upload incident records to an archive for later analysis.

The long battery life facilitated by wake-up transceivers and class-based networking obviates the need to recharge (and to remember to recharge) an RSN, or even to have to remember to turn it on. The RSN is always on, and can even be worn when off-duty. Class designations on RSNs and gateways can also help keep different services (fire, police, EMS) and different jurisdictions from becoming confused.

The RSNs' long range afforded by their high-power data radios and the capabilities of autonomous network configuration facilitate good coverage at the incident scene, as firefighters move around, including in buildings. Further, due to the area-coverage capability of the radio network, the presence of firefighters and their vehicles can be known without the incident commander ever laying eyes on them. Special tag readers and "passports" are similarly not required.

Various Preferred Implementations

Shipping Container Implementation

In a shipping container context, an RSN is integrated with a security bolt, which is applied as a security seal through the container door hasp. Gateway controllers are located at origin and destination sites, and at various intermediate locations along a shipping route (e.g., ports, truck stops, weigh stations).

At the shipper's location, sealing of the door is automatically reported to a gateway controller at the shipping dock and, via a user application, associated with a shipment number. After leaving the shipper's location, a lack of presence would automatically be reported.

Arrival of the RSN at a port would automatically be detected and reported by gateways at the port. Even from inside a stack of containers, messages from an RSN could reach a gateway, and vice-versa, due to the high-powered data radios and the hopping that is facilitated by autonomous network configuration, which is enabled by class-based networking. If a container is moved when it should not be (indicating theft), or if a container is jarred enough to damage its contents, the event is reported immediately and automatically. Similarly, an RSN preferably reports dangerous fluctuations in a container's temperature or the presence of dangerous vapors, if connected to appropriate external sensors.

Aboard ship, the presence of the container is known to a gateway controller on the ship, which reports via satellite link. Similarly, sensor inputs are known. The location of the container is also known, from the GPS capability of the shipboard gateway controller.

Once the container reaches its destination, or at any location subsequent to the original sealing, every opening or closing of the seal is recorded. If the opening or closing occurs at a location covered by a radio network, the event is reported immediately. If the opening or closing occurs at a non-covered location, the event is stored and reported immediately upon encountering a radio network.

In such an application, class-based networking provides more than enough battery life to complete multiple door-to-door transoceanic shipments. It also enables different shippers or different shipping companies to share a radio network infrastructure at ports and other shared locations without interfering with each other's traffic, while still allowing for hopping of others' messages when needed.

For example, XYZ Shipping may configure its RSNs to communicate, under normal circumstances, with only other XYZ Shipping RSNs, but to assist hopping for RSNs of other companies when needed. Under those ordinary circumstances, wake-up and data traffic from other companies' RSNs would be ignored by XYZ Shipping's RSNs. However, if ABC Shipping has a container deep in a stack, and its RSN needs a hop-assist to reach a gateway controller, the RSNs of XYZ Shipping could make the assist. Preferably, the ABC Shipping RSN automatically makes a request for an assist after failing to reach a gateway controller using only its own class of RSNs. In this manner, class-based networking accommodates thousands of containers at a single location.

The area-coverage capability of the radio network means, for example, that an entire port facility may be covered. Consequently, the presence of an RSN (and thus its associated container) can be known at any time (via a query), and special detection lanes or choke points are not needed.

Various Preferred Implementations

Construction Equipment Implementation

In a construction equipment context, an RSN is attached to a backhoe, dozer, crane, or other piece of equipment. In this application, gateway controllers are located at equipment rental yards and construction sites. A rental company then uses presence data generated by the RSN network to know in real-time which of multiple yards specific equipment is located that is needed to meet customer needs. Preferably, improper movement data triggers a theft alarm. Such a theft alarm could be associated with gates and perimeter fencing.

At a renter's construction site, a gateway receives engine-hours data from RSNs associated with equipment at that site and reports back to the rental company. The rental company uses the data to determine whether the renter is exceeding his contract and/or whether the equipment is being abused. Preferably, for sites that do not have a gateway controller, the rental company uses a truck-mounted gateway controller to periodically visit all such sites to collect data from the RSNs at each such site. The data is collected quickly and automatically, and is immediately uploaded via cellular link to the rental company's headquarters.

A construction company can similarly use the system to keep track of and monitor its own equipment, both in storage yards and on construction sites. For construction sites that have both rental and owned equipment, classes are set such that a rental company can "see" its equipment via the site's gateway, but see nothing of the equipment owned by the construction company.

Detailed Description of Some Various Preferred Embodiments in the First Responder Implementation It will be appreciated that systems and apparatus relating to the management of assets are described herein. Functionality of implementations of such a system in accordance with some preferred embodiments of the present invention is now described below. More specifically, a preferred implementation relating to Emergency Services Sector (ESS) assets or resources (e.g., engines and personnel) is now described in detail, although it will be appreciated that such detailed description could equally apply and have utility in any of a number of others contexts as well.

To begin, the system minimally comprises RSNs (which are attached to or carried by the resources to be monitored), user devices, user software applications (preferably running on the user devices) and a network infrastructure. The network infrastructure includes gateways, servers, and data communications apparatus that link gateways, servers, and user devices together. User devices include, for example, PDAs, laptop computers, databases, other computers, and data-display devices.

FIG. 1 illustrates a system in accordance with one or more preferred embodiments provided by a managing entity having a plurality of discrete wireless islands linked through common message handling components and capable of presenting common access and views to multiple customers. Specifically, in FIG. 1 the illustrated system is divided into three logical segments. The left logical segment comprises the plurality of discrete wireless islands. The term "island" is used to emphasize that each is separate and distinct logically, even if one or more islands physically overlap in coverage. These islands may include both radio networks of RSNs as well as complementary networks, and the radio networks, and possibly one or more other complementary networks, preferably utilize the aforementioned CBN and WU technologies. The right logical segment comprises customer connectivity elements, including customer applications, as well as network management and configuration servers.

Preferably, the RSNs attached to assets communicate information regarding those assets to one or more customer applications. The final logical segment, the middle logical segment, comprises a message management and routing (MMR) system, which preferably facilitates this communication. The MMR system thus preferably serves as an intermediary for communication between radio and complementary networks on the one hand, and customer applications on the other. MMR systems are described in one more sections in further detail below.

Preferably, each RSN includes a wide variety of capabilities, including one or more sensors. A preferred RSN enjoying a wide range of capabilities is next described, but it will be appreciated that RSNs may only enjoy some of this functionality and RSNs in a radio network may not share all of the same capabilities.

An RSN preferably is capable of detecting motion, vibration, shock, or any combination thereof; and an RSN preferably is capable of sensing whether motion, vibration, or shock exceeds certain pre-set conditions. The RSN further may be capable, for example, of determining whether a magnetic reed switch changes state; reading one or more RFID devices within its proximity; or both.

Additionally, the RSN preferably is capable of detecting the radio presence of network infrastructure and deciding whether to communicate with that infrastructure as part of that network. Similarly, the RSN preferably is capable of detecting the radio presence of other RSNs and deciding whether to communicate with them as part of a radio network.

The RSN is capable of storing/recording (buffering) data related to what it detects and communicating this data to user applications via other RSNs and network infrastructure, when/if encountered.

The RSN is capable of appending date/time stamps to all recorded events that it has detected and appending a date/time stamp to all communications.

The RSN includes a suite of sensors and is capable of changing its behavior per sensed conditions and/or per detected events. Its behavior changes with respect to what events it reports and the manner in which it interacts with other RSNs and with network infrastructure, including check-in frequency (i.e., how often it tells the network, "I'm here."), sensor thresholds & conditions, message hopping behavior, class, and decisions whether to engage certain sensors.

The changes are triggered by commands that originate from a user application or from the network infrastructure, or else are autonomous. For example, the changes can be triggered by a combination of the date and time, a type-signature signal from a network infrastructure, a location of an infrastructure, a location of the RSN, a status of the RSN, a functional mode that the RSN may be in at the time, sensor inputs, and battery level. When the RSN changes its behavior (whether autonomously or because it is commanded to), its new behavior is selected from multiple behavioral profiles stored within the RSN.

Returning to the communications themselves, RSN communications preferably employ Class-based networking (CBN), hopping, and wake-up radio. Preferably, every RSN is assigned a unique ID number. This ID number is utilized by the network infrastructure and the user application to identify the resources an RSN is attached to or associated with, thus allowing messages to or from each RSN to be properly routed.

In use, an RSN is preferably worn or carried by personnel resources (perhaps using a clip, pouch, or pocket) or attached (temporarily or permanently) to other resources or assets of interest. Each RSN is associated with an resource or asset (it will be appreciated that this sets up a 1:1 correspondence) in a user software application, which communicates with the RSN via network infrastructure. An identification of, and descriptive data related to, the associated resource or asset are stored within each RSN and preferably are also stored in a remote database. A user application subsequently reads this data when a given RSN is in communication with network infrastructure.

The RSNs and network infrastructure interact in a manner that can be used to inform users of the presence of a particular RSN (and thus the particular resource or asset to which it is attached) at a specific location defined by the network infrastructure at that location. Users can further be informed of when the RSN arrived at that location, when an RSN was last heard from at that location. Users can even be informed that the RSN failed to check in at that location (for example, by a comparison of a lack of an actual check-in vs. an expected check-in). Users can additionally be informed of descriptive information about the resource or asset and sensor data or a status sensed by the RSN.

Preferably, each RSN has an identifying barcode on its exterior to allow a user with a properly configured PDA to identify an RSN he wishes to interrogate or address by its unique ID number.

The combination of CBN and unique IDs enables sharing of network infrastructure among any number of users or entities. This facilitates usage at public facilities (e.g., hospitals) and sharing of costs, while preserving data privacy. In a first-responder application, this capability facilitates mutual-aid scenarios among multiple agencies while excluding those who have no business at the scene of an incident.

RSNs communicate with network infrastructure (and with other RSNs) only when they have data to forward, either from their own sensors or when forwarding data from other RSNs, or when queried by the network.

That RSNs communicate only when needed for passing data enhances security (reduces risk of discovery & of deliberate interference), diminishes RF pollution, and conserves battery power.

A (hopping) path chosen to forward data is determined at the moment of need, based on what worked in the past, revised by what is learned during the current attempt. (Continual network-formation messaging is not used, and the spread of hopping attempts throughout the network is limited.)

Preferably, RSNs are powered by an internal power source (batteries), have antennas that are fully enclosed, and have an internal clock. This clock is automatically updated/synchronized when it encounters network infrastructure.

RSNs communicate with external/separate sensors, either by electro-mechanical connection directly to the RSN (e.g., a "sled") or wirelessly. External sensors can be mounted anywhere, so long as they can communicate with an RSN. Data from these external sensors is treated the same as data from an RSN's internal sensors.

The system includes network infrastructure called Gateways (GWs), which also employ CBN, hopping, and wake-up technology. These GWs include means to communicate wirelessly with RSNs, wirelessly with local user devices (e.g., PDAs), wirelessly with other GWs (to form expanded local networks), and wirelessly with other networks (means include GSM/3G, CDMA, Land Mobile Radio, and satellite). GWs also include GPS and wired Ethernet capability. GWs may be permanently fixed, temporarily fixed, or mobile.

Network infrastructure of the system also includes the MMR system, which assures that messages to/from user applications and databases and the RSNs in which they have an interest, get to/from (only) the correct RSNs and vice-versa.

Infrastructure can be mobile. Networks form when infrastructure (on a vehicle) arrives at a location where RSNs are already located, or vice-versa, or both may be mobile or fixed. Network formation is spontaneous, provided participants have at least one Class in common The system includes a user application that collects data about RSNs and their associated assets via the network infrastructure and displays those data in a manner that enables a user to receive automatic notification of arrival, presence, and status/condition (e.g., distress) of an asset. The same application also records organizational or task assignments of the asset.

In at least some preferred embodiments, RSN sensors are configured to indicate stress of the asset (e.g., an unconscious person). For some assets (e.g., firefighters), a lack of motion is a sensed condition. For others (e.g., law enforcement), a mechanical shock (slap) of the RSN is a sensed condition. In a preferred embodiment, these sensors are configured to become active only when the assets have been assigned to dangerous tasks, e.g., to go inside a burning building. The user application is used to record the assignment of an asset, which then causes a command to be sent to the associated RSN to engage the appropriate configuration profile for that asset. This causes a no-motion sensing capability to tune on, to await the no-motion condition.

In at least some preferred embodiments, a system is configured to cause RSNs connected to the network to send quasi-periodical check-in messages, to indicate to the network that the RSN is still present (in the RF-vicinity of a gateway). The network knows when to expect such messages. If a defined number of these messages are not received within a defined period, than the infrastructure sends a message to the user application that the associated asset is unaccounted for. In some preferred embodiments, a timer used to determine when to send these messages can be reset as a result of various communication activities of the RSN. When an RSN passes a communication from another RSN along (i.e., a message is being hopped with the RSN is in a communication path between another RSN and a gateway), information is also passed along with the message that allows the gateway controller or server to know that the RSN was involved in the communication as an intermediate node. Then, when an acknowledge is passed back along the same path, the RSN knows that the gateway controller or server is cognizant of its continued presence. Thus, by passing a communication on along a path that eventually leads to the gateway that the RSN is supposed to periodically check in with, the RSN has essentially informed the gateway that it is still present. Consequently, the RSN can reset its check-in timer, as there is no need to send a check-in message when the gateway is already aware that the RSN is still there. This methodology helps to reduce radio activity while still allowing for monitoring of RSN presence.

The system preferably employs merging/breathing of the network and user application such that when mobile infrastructure encounters other infrastructure (mobile, fixed, or temporary) of the same Class, the two networks merge to operate as a single network. This includes the merging of data, and the merging of instances of the user application such that a single instance of the application controls all. Later, the merging can be dissolved.

In the preferred first-responder implementation, the identity of arriving assets is automatically populated into a user asset-management application, enabling a user to see the ID of arriving assets and act on it (i.e., make an assignment) immediately. This ID data comprises the data stored within the RSN and reported when the RSN connects to the network. Preferably, the user application also displays changes in asset state or condition (e.g., distress), as reported by associated RSNs. The user asset-management application also preferably serves to deny or allow an asset to be included in the record-keeping and asset-management activities facilitated by the user asset-management application (i.e., participate in an incident). The user application can force a given RSN to disconnect from the local network. The preferred implementation also includes a user application that, in a first-responder application, is used to display to a large audience the numbers of and assignments of assets and keep those numbers and assignments updated as they change, as a user manipulates the asset-management application on a separate user device.

Detailed Description

Radio Network Communication

As noted hereinabove, a radio network preferably comprises a gateway server, one or more gateways (or gateway routers), and a plurality of RSNs. In a radio network, communication from one end point to another end point, such as from an originating RSN to a gateway, or from a gateway to a destination RSN, is hopped along intermediate nodes. Generally, communication between nodes along a path, i.e., communication associated with a node's routing functionality, is provided by the MAC layer or the network layer, while communication between the end points is provided by the application layer.

As noted hereinabove, each RSN preferably includes WU technology, including a reduced complexity radio (RCR). An RCR of each RSN provides low power consumption, reasonably low network bandwidth utilization, and flexible ad-hoc message routing, but is not intended for large payloads or streaming data. In accordance with one or more preferred embodiments of the present invention, and in the preferred first-responder implementation, the RCR protocol is broken down into two distinct sub-protocols representing two distinct layers, i.e., the MAC layer and the network layer. Further, the network layer is subdivided into a reassembly and fragmentation (FAR) layer, and a data control layer. FIG. 5 illustrates these layers.

Detailed Description

Radio Network Communication—MAC Layer

Figure 6:
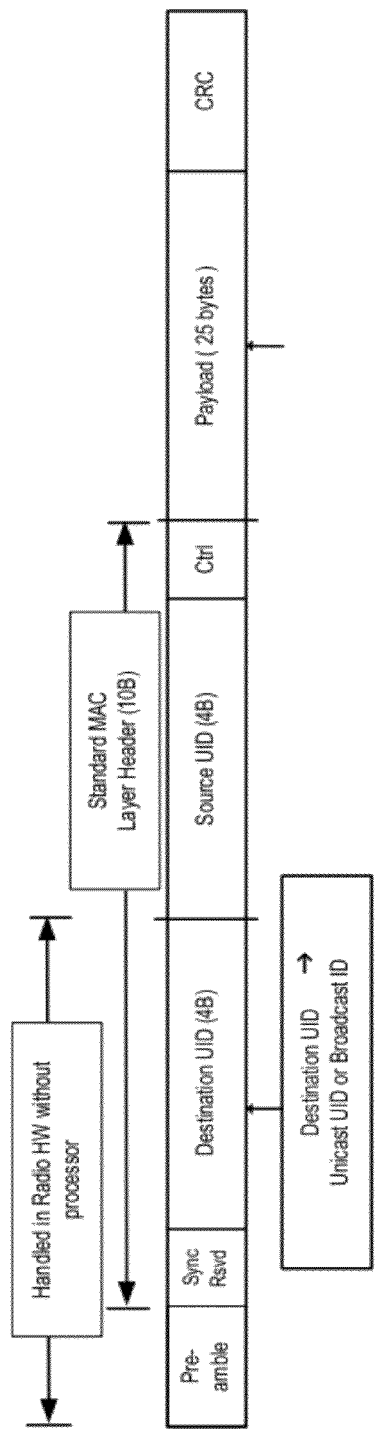
FIG. 6 illustrates a payload-carrying frame in accordance with a preferred embodiment of the present invention.
Figure 7:
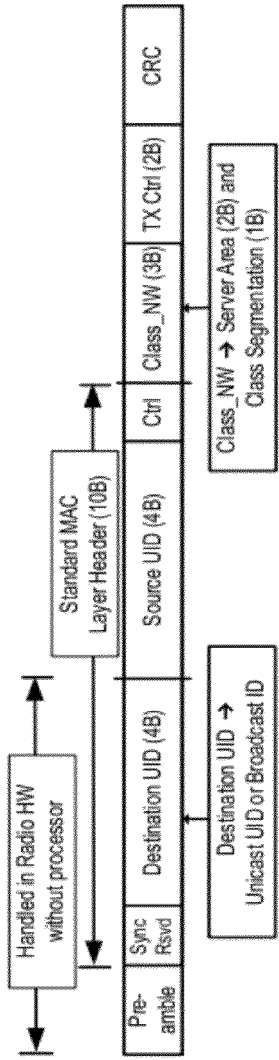
FIG. 7 illustrates an RCR Wakeup/Attention frame in accordance with a preferred embodiment of the present invention.

All node to node communications are implemented via node transactions at the MAC layer. A node initiates a transaction by transmitting a series of wakeup/attention (WU_ATTN) frames in repeated succession. The number of transmissions in the series is selected to ensure that the receiving device will "see" one of these frames within the total transmission sequence. These WU_ATTN frames differ from normal payload carrying frames. More specifically, they are differentiated by a different TYPE field within a frame control (CTRL) byte. FIG. 6 illustrates a normal payload carrying frame and FIG. 7 illustrates a WU_ATTN frame. (Notably, WU_ATTN frames may not be required prior to communication with a gateway, as described hereinbelow.)

Each node is associated with a unique identifier (UID). Upon receiving a WU_ATTN frame, a node verifies that the frame contains either its UID, or a general broadcast address, which may comprise, for example, all 1s. As can be seen in FIG. 7, a destination UID corresponding to either a unicast destination node, or a general broadcast address, is located within the first five bytes. Due to this location, the processor will not have to wake up unless the message is directed to its UID or is a broadcast/all call message.

The node additionally verifies that the WU_ATTN frame includes a proper Area ID. As described more fully hereinbelow, an Area ID corresponds to a particular gateway server. If an Area ID contained in the WU_ATTN frame differs from an Area ID stored at the node upon joining the network as described hereinbelow, then the node will not respond to the WU_ATTN frame.

Similarly, the node verifies that the frame contains an allowable network class identifier (notably, in alternative implementations, rather than a network class identifier, a common designation may be used). If a network class identifier of the frame does not correspond to a network class identifier stored at the node, the node will not respond to the WU_ATTN frame. This network class identifier may comprise all or part of a Class ID (as described hereinbelow), or may comprise a wholly different network class identifier. A node may contain multiple network class identifiers, for example, a node may be configured to contain up to six network class identifiers.

The node further verifies appropriate sequencing. The CTRL byte includes frame sequence information, as well as including an indication of whether a message is an acknowledgment (ACK) and an indication of whether an acknowledgment is required. A frame sequence of all ones denotes the special WU_ATTN frame.

Further, the receiving node will not respond to any WU_ATTN frame if it is in the free state, unless the WU_ATTN frame is part of the process of becoming joined to, or "captured" by, a network.

Assuming successful reception by a receiving node of a WU_ATTN frame which corresponds to the receiving node's UID and verifies as allowed based on the sequencing, Area ID, and Class ID of the frame, the receiving node will then wait until the transmitting node completes its entire sequence of WU_ATTN frames. This time to wait is calculated using a counter contained in TX count information of the TX CTRL field of the WU_ATTN frame. After waiting for an amount of time calculated based on this counter, the receiving node will acknowledge a successful wakeup to the transmitting node and change its receive channel to the data channel specified in TX data channel information of the TX CTRL field of the WU_ATTN frame. A disallowed transmission may be negatively acknowledged utilizing the same sequence, with a reason code set within an acknowledgment frame. A transmitting node that receives such a negative acknowledgment ceases its attempts to continue the transaction.

After switching to a specified channel for an allowed transaction, a transmitting node transmits a plurality of data packets on the specified channel. This plurality of data packets collectively form a sequenced and potentially fragmented datagram. If all data packets are received at the receiving node and the full datagram is reassembled in its entirety, then the receiving node will acknowledge to the transmitting node that the transaction is complete. If one or more data packets are corrupted or otherwise in error, the receiving node will provide a negative acknowledgment to the transmitting node, and the transmitting node will repeat the transmission up to a maximum of three times.

Notably, the above sequence describes unicast node transactions, i.e., transmissions to a receiving node that specifies the UID of that receiving node. Broadcast transactions, i.e., transmissions that specify a general broadcast address, follow a similar sequence except in that no acknowledgments of any type are provided by a receiving node.

Detailed Description

Network Communication—Network Layer

Figure 8:
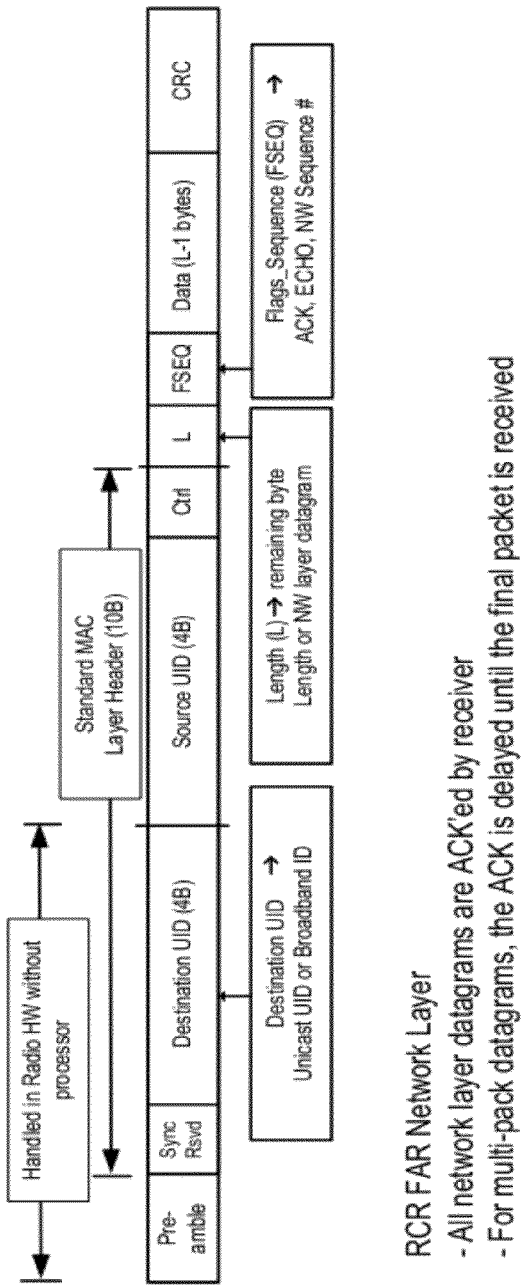
FIG. 8 and FIG. 9 illustrate exemplary messaging with respect to layers of FIG. 5.
Figure 9:
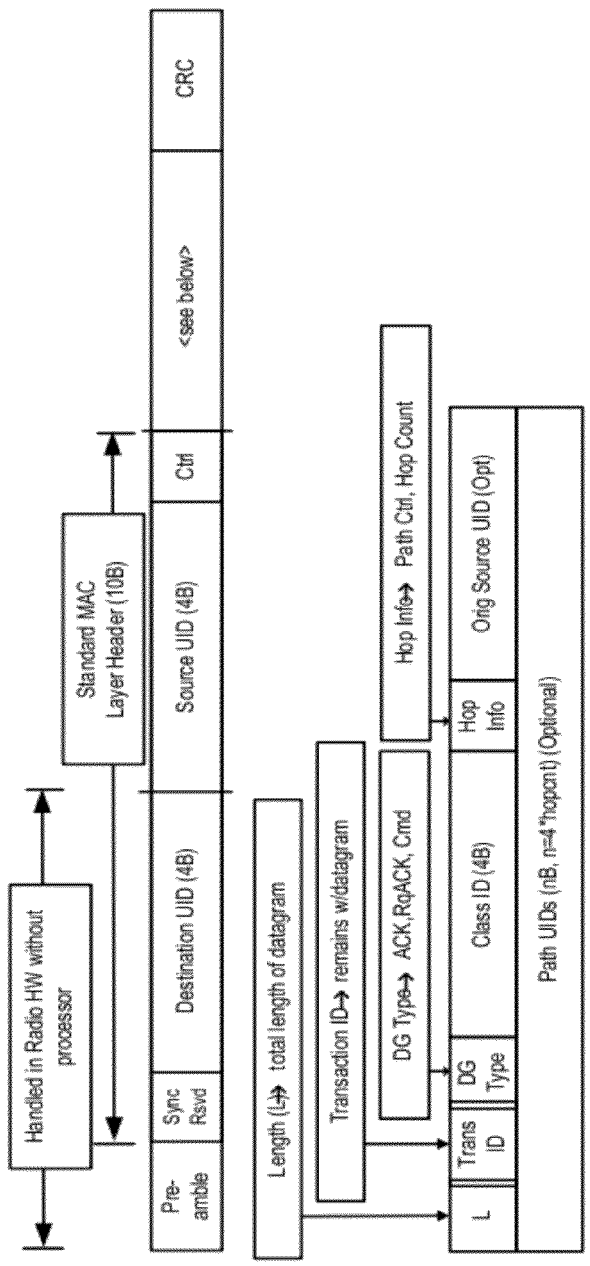

With both broadcast and unicast transactions, a successfully received transaction will be forwarded up to the network layer of the protocol stack for further processing. The network layer resides on top of the MAC layer and includes the FAR layer and the data control layer. FIGS. 8 and 9 illustrate exemplary messaging at each of these layers.

Communication routing within the network is characterized as asymmetrical. This is because routing of data from an RSN inbound to a gateway, i.e., inbound data, is handled differently than routing of data outbound from a gateway to an RSN, i.e., outbound data. Both inbound and outbound routing will now be described.

Detailed Description

Radio Network Communication—Network Layer—Inbound Routing

Inbound data routing utilizes a next hop approach, i.e., each node is unaware of an entire path needed to deliver a datagram to a gateway, and is instead only aware of specific nodes which are potential "next hops", i.e., potential next destinations for an inbound datagram.

Each captured node of the network contains a next hop table with three entries corresponding to three potential next hop nodes. Each entry includes an address, i.e., the UID of that next hop node, a hop count, representing a number of hops required to reach the gateway node using that next hop node, and a qualifier. The qualifier is a number from zero to one hundred which indicates a next hop node's preferability as determined by several factors, with higher numbers indicating less desirability. Whenever a first node communicates with another node in the course of routing data, acknowledgments of that data contain indicators of a general traffic load of that other node. The first node uses this information, as well as transmission failure counts and, when available, signal strength indications to generate the qualifier value corresponding to other nodes. A qualifier corresponding to a particular node is updated each time communication occurs with that particular node. The qualifier corresponding to each node can be used to "qualify" and order nodes for use in routing.

When selecting a next hop node to forward a datagram to, both efficiency, i.e., hop counts of potential next hop nodes, and a probability of success, i.e., the chance that a transmission will fail to reach its destination, are taken into account. Inbound datagrams contain a current hop count which starts at zero and is incremented with each node traversed, i.e., with each hop. A node preferably utilizes this current hop count in conjunction with the hop count corresponding to each potential next hop node in its next hop table to select a next hop node such that the datagram will not exceed a maximum system hop count.

A node acquires its next hops, i.e., populates its next hop table, either when it first joins a network by listening for broadcast traffic, or by requesting that available nodes around it signal their status as potential next hops. A node makes such a request by broadcasting a NEXTHOP_REQUEST datagram. When a node receives such a request, it utilizes a random back-off timer, and then responds in kind to signal that it is a potential next hop. Use of the random back-off timer helps ensure that responses from a plurality of nodes are spread out, rather than being received all at once, thus likely allowing more to propagate through.

A node issues a NEXTHOP_REQUEST when there are no valid next hop entries in its next hop table. A next hop entry corresponding to another node is invalidated when an attempt to communicate with the other node fails, or if the hop count of the entry indicates that routing communications through the other node would cause the soon-to-be-requesting node to have a hop count greater than the maximum system hop count.

A node also issues a NEXTHOP_REQUEST when two next hop entries in its next hop table are invalid or empty, and the qualifier associated with each entry is a high value. In this case, a NEXTHOP_REQUEST is sent to attempt to find new next hop nodes with better qualifiers. Notably, however, such a request is only sent when network traffic is at a minimum and is only sent at a very low rate. An exponential back-off timer is utilized to prevent a node with poor next hop qualifiers from continually and rapidly sending out NEXTHOP_REQUESTs.

A NEXTHOP_REQUEST broadcast by a requesting node includes a hop count of the requesting node. In order to minimize possible path loop issues and maintain network efficiency, any node which receives the NEXTHOP_REQUEST does not respond to the request if its hop count is greater than the hop count of the requesting node. Additionally, upon receiving responses to its NEXTHOP_REQUEST, the requesting node validates the hop count of each responding node against its own perceived hop count. Similarly, no node will respond to a NEXTHOP_REQUEST if its hop count is greater than or equal to the maximum system hop count, and no requesting node will validate a response from a node whose hop count is greater than or equal to the maximum system hop count.

It will frequently be the case that a requesting node does not have any valid entries in its next hop table, and thus essentially has no hop count. A requesting node which does not have any valid entries in its next hop table sets its hop count to negative one (−1) to indicate that all nodes receiving its NEXTHOP_REQUEST should respond, and validates a response from any node whose hop count is less than the maximum system hop count.

If a node broadcasts a NEXTHOP_REQUEST and receives no replies, the node retries this request three times, utilizing an exponential back-off timer between each retry. If, following the third retry, the node has still not received a reply and no next hop has been acquired, the node will transition to a free state, i.e., consider itself removed from the network. (It is noteworthy that each of these three retries may be retried utilizing a different network class identifier, which may comprise a different Class ID. Further, each of these retries may be retried utilizing soft-preferential class based networking.)

On the other hand, any node which does acquire a new next hop, either via a NEXTHOP_REQUEST or from listening to network traffic, sends a NEXTHOP_UPDATE datagram containing the current entries in its next hop table to the gateway for forwarding to a gateway server. NEXTHOP_UPDATE is the only network layer datagram which requires a gateway response. After beginning a transaction by sending a NEXTHOP_UPDATE, a node queues the transaction as pending awaiting acknowledgment by the gateway. The node uses its current known hop count to determine a time frame, such as 3 seconds per hop, within which an acknowledgment response should be received. If no acknowledgment is received during this time frame and the current information in its next hop table is still valid, the node retries sending the NEXTHOP_UPDATE. If, during this process, the node determines that information (i.e., one or more entries) in its next hop table is not valid, then it updates this information, possibly using NEXTHOP_REQUEST as described hereinabove. The node continues to retry sending a NEXTHOP_UPDATE datagram until either an acknowledgment is received or the node determines that it is no longer part of the network and is in a free state.

When a node receives an inbound datagram from another node, assuming the node includes one or more valid next hop entries in its next hop table, the node will forward the datagram to a selected most desirable next hop in its next hop table, the selection being guided by various factors as described hereinabove. Before forwarding the datagram, however, the forwarding node inserts its own UID. As a datagram travels along a path and traverses a plurality of nodes, each node insert its own UID, thus generating path information for the path the datagram has taken.

After selection by a forwarding node of a next node to hop to from its next hop table, transmission of the datagram to that next node may fail. In this event, the forwarding node selects a different next node to hop to from its next hop table. If transmission to each potential next hop node in its next hop table fails, the forwarding node broadcasts a NEXTHOP_REQUEST to attempt to obtain valid next hop entries. During this time, the datagram to be routed is kept queued and ready for transmission. Thus, even if a transmission fails, if the forwarding node is able to acquire a valid next hop, then the datagram continues on a path to the destination gateway.

If, on the other hand, the attempt to acquire a valid next hop is unsuccessful, the forwarding node generates a FAILED_ROUTE datagram, which is a copy of the original datagram to be forwarded with its type set to a FAILED_ROUTE enumerator. The forwarding node utilizes the path information within the original datagram to forward the FAILED_ROUTE datagram back to the originating node of the original datagram. This message may or may not propagate back to the originating node. Nodes receiving a FAILED_ROUTE datagram along a path back to the originating node can retry forwarding the message along a different path to the destination gateway by selecting a different next hop node from their next hop table if routing conditions permit, e.g., if the next hop table includes other valid entries. FAILED_ROUTE datagrams utilize outbound routing mechanisms as described hereinbelow.

A FAILED_ROUTE datagram will also be generated if the hop count corresponding to each potential next hop in a next hop table of a forwarding node is such that the maximum system hop count would be exceeded utilizing any of the potential next hops. This case is potentially a common occurrence. To more rapidly propagate hop count changes, all network datagram node to node acknowledgments contain the current hop count of the receiving node.

Detailed Description

Radio Network Communication—Network Layer—Outbound Routing

In contrast to inbound routing, outbound routing utilizes a simple "known route" approach. As described hereinabove, path information is appended to a datagram as it travels inbound towards a gateway. This inbound path information is used to generate an outbound full path and store the UID of each node along this full path within a network header. An outbound datagram can thus be identified by the use of a FULL_PATH option within a network header, and a final destination which is not a known gateway. When a node receives an outbound datagram, the node removes its own UID from the full path and then forwards the datagram to the node corresponding to the next UID in the full path. If this forwarding fails, the node retries three times, unless a negative acknowledgment is received that informs the forwarding node that the datagram cannot be received.

If each of these three retries is also unsuccessful, the forwarding node converts the datagram to a broadcast message that is set, with DG_ECHO, to cause nodes receiving the broadcast to repeat the broadcast. If such a broadcast datagram is received by the final destination node, the final destination node updates the path information of the gateway/gateway server. If the datagram is destined for the application layer, then this update can be accomplished via a reply generated by an application at the node. If, however, the datagram is not destined for the application layer, this update can be accomplished via a NEXTHOP_UPDATE.

Detailed Description

Radio Network Communication—Application Layer

Network communication is completed at the application layer. Where the MAC and network layers can be characterized as providing node to node communication and path discovery, the application layer can be characterized as providing end to end communication.

With the notable exception of NEXTHOP_UPDATE, network layer communication does not typically include end to end acknowledgment capability. This is essentially because it is not required at a base level. The utilization of FAILED_ROUTE network datagrams provides meaningful levels of reverse communication in the event of a routing breakdown.

However, most application layer communication will desire acknowledgment that communication with a final destination occurred successfully. Therefore the application layer utilizes a protocol of its own which provides end to end acknowledgment capability. As the network layers view data sent from an overlying application as simply raw data, this application protocol is thus fully encapsulated and acted upon by the application alone.

Preferably, an application within an RSN is ultimately be in control of the networking layers, regardless of the fact that these layers can act autonomously in terms of routing network datagrams and seeking out networks and routing paths. Thus, since this application is ultimately responsible for network system activities such as registration and authentication, the application can shut down the network layers in the event that such activities are unsuccessful.

Detailed Description

Radio Network Formation

Figure 10:
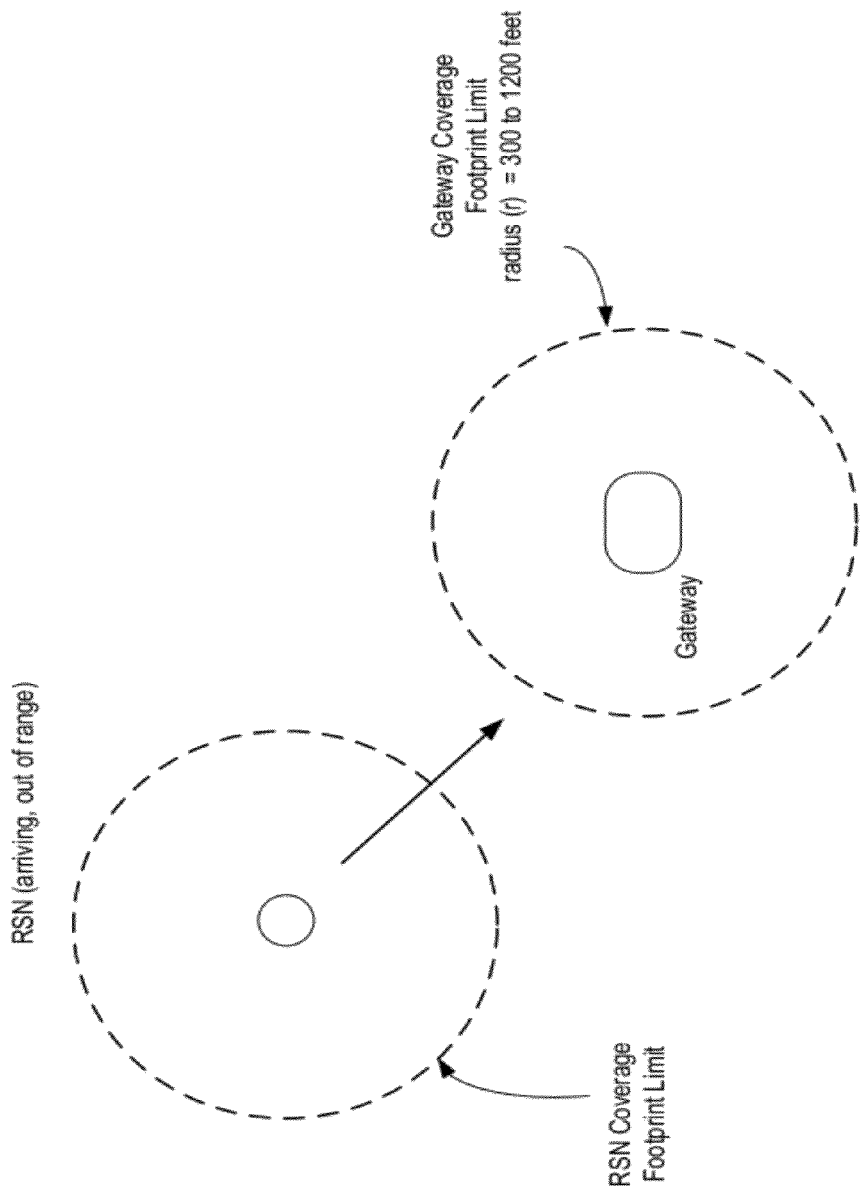
FIG. 10 illustrates an exemplary radio network which comprises a gateway and an RSN, i.e., a node, in accordance with a preferred embodiment of the present invention.

In accordance with one or more preferred embodiments of the present invention, and in the preferred first-responder implementation, radio network formation between a captured gateway and an RSN, i.e., a node, is now described with reference to the exemplary radio network illustrated in FIG. 10. This exemplary radio network comprises a gateway and an RSN, i.e., a node. The gateway has a coverage area indicated by the dotted circle surrounding it. Preferably, this coverage area has a radius of 300 to 1200 feet. As illustrated in FIG. 10, an RSN is currently out of range, but is moving towards the gateway's coverage area such that it may soon be in range, and thus be able to connect to the gateway.

It is a characteristic of the system that RSNs arrive and depart from coverage areas at any time, in any order, and even randomly change position relatively within a coverage area. A free RSN that becomes aware of a radio network attempts, if appropriate, to connect wirelessly to that radio network.

Detailed Description

Radio Network Formation—Beaconing

In order to make a free RSN aware of a nearby radio network, a process known as beaconing is used. More specifically, a beacon is a radio signal that is periodically broadcast by a node, e.g., a gateway, that contains identification information (as well as a check-in period, as described hereinbelow). The beacon effectively announces the presence of a gateway and identifies it. The identification information includes an address of a node that broadcast the beacon, an Area ID corresponding to a gateway server the node that broadcast the beacon is associated with, and a network class identifier. This network class identifier may comprise all or part of a Class ID (as described hereinbelow), or may comprise a wholly different network class identifier.

When a free RSN receives such a beacon, the network class identifier contained in the beacon is compared to one or more network class identifiers contained in the RSN, at the MAC layer of the RSN. If the network class identifier of the beacon matches any network class identifier contained in the RSN, information contained in the beacon is passed to the network layer of the RSN, which informs the application layer of the RSN of a detected radio network as well as information associated therewith, including the Area ID and node address. The RSN, at the application level, decides whether or not to activate the network layer of the RSN, i.e., attempt to join the radio network and transition the RSN to a captured state. If the RSN decides to join the radio network, the network layer will utilize the node address as a next hop and transmit a communication (which preferably contains a network class identifier of the RSN, and if the RSN contains multiple network class identifiers then preferably includes a primary network class identifier, e.g., a primary Class ID, as described hereinbelow), to the node, for communication to the gateway server corresponding to the Area ID, to attempt to register with the gateway server. Upon attempting to register, the RSN enters a tentative capture state. During this tentative capture state, the tentatively captured RSN can communicate over the radio network, but no other RSN can hop messages through the tentatively captured RSN.

Registration is dependent upon the application layer, as described more fully hereinbelow, and the RSN remains in the tentative capture state until an affirmative acknowledgment of registration is received, at which time the node transitions to being fully captured by the radio network. Each RSN stores the Area ID of the gateway server it is currently associated with. Notably, a negative acknowledgment (NACK) could be received instead, thus indicating that the RSN is not allowed to join the network. Each RSN stores a list of Area IDs that it is not allowed to attach to. If a node receives a negative acknowledgment upon an attempt to join a radio network corresponding to a particular Area ID, it places that Area ID within this list of Area IDs that it is not allowed to attach to. Notably, it is possible for registration to be dependent upon a human decision utilizing a customer application, and it is possible for an RSN to move directly into a full captured state if desired.

Figure 11:
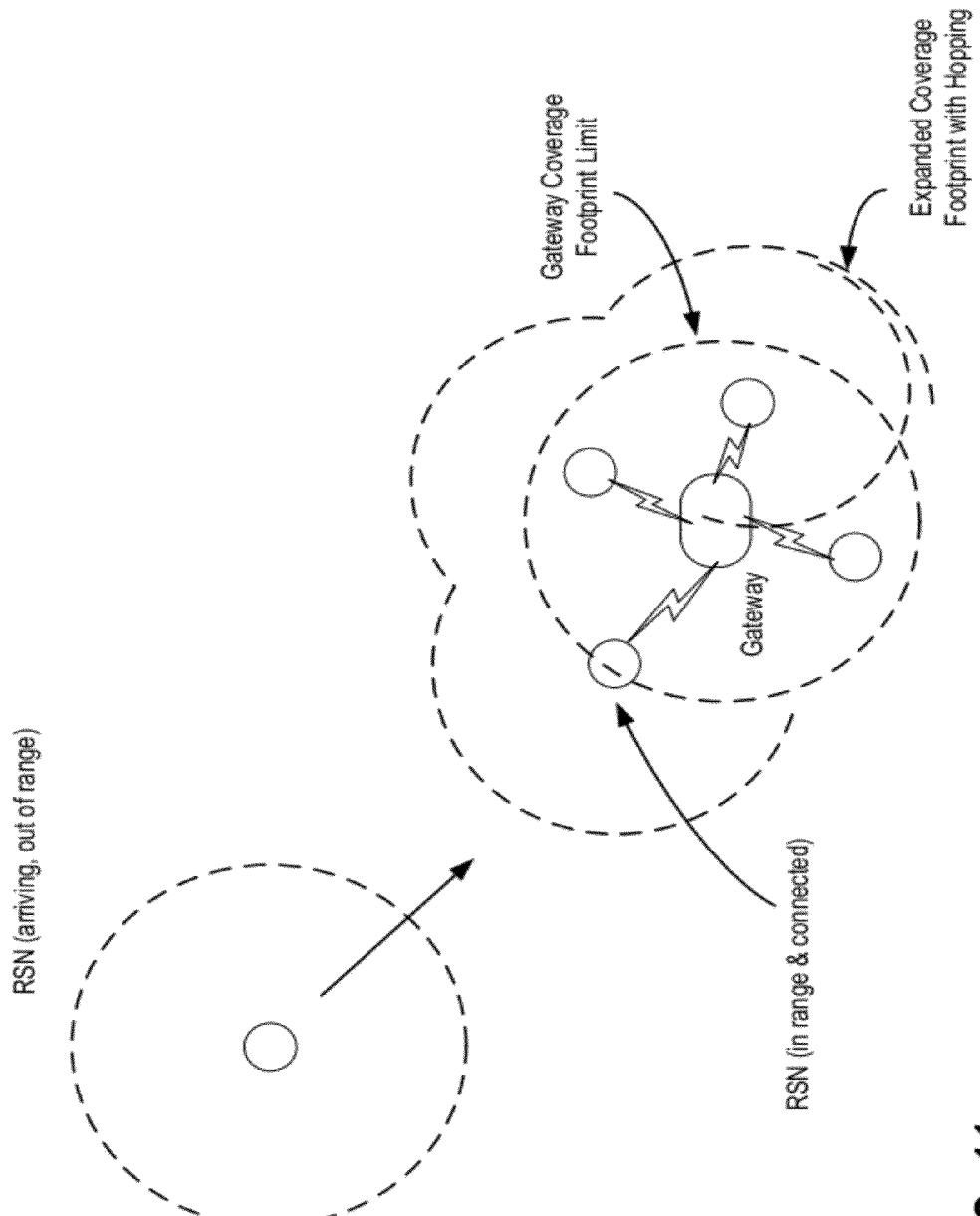
FIG. 11 illustrates a radio network comprising a gateway and four RSNs with an expanded coverage area, in accordance with a preferred embodiment of the present invention.
Figure 12:
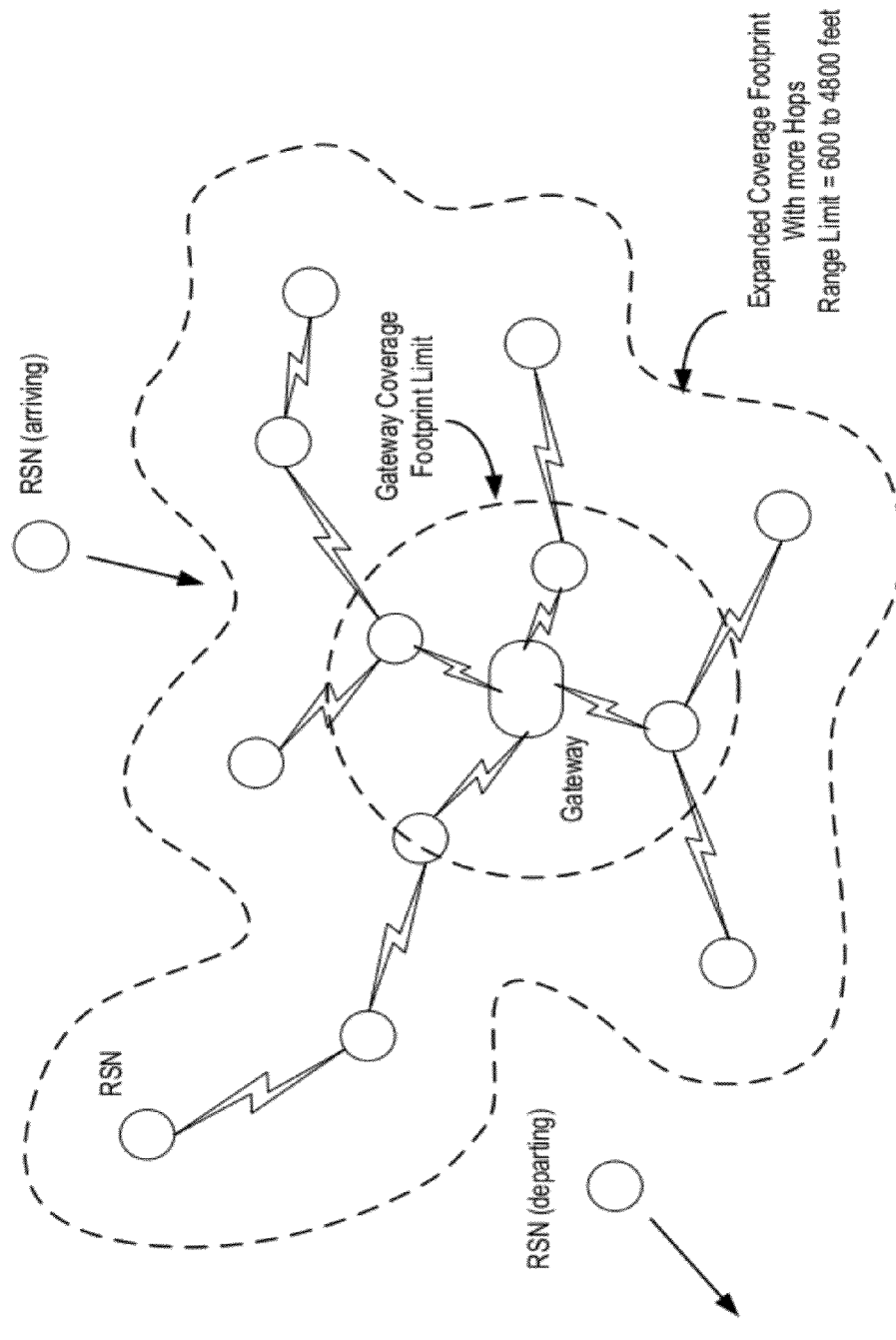
FIG. 12 illustrates an expanded footprint of a gateway resulting from RSN hopping in accordance with a preferred embodiment of the present invention.

Once in a captured state, an RSN ignores messages associated with other gateway servers, i.e., messages including other Area IDs (as described hereinabove and described more fully hereinbelow). After being captured by a radio network, an RSN serves to expand the coverage area of the radio network. This is because RSNs are configured to retransmit, or pass, messages from other RSNs, as described more fully hereinbelow, such that the coverage area of the radio network is greater than just the coverage area of the gateway itself. FIG. 11 illustrates a radio network comprising a gateway and four RSNs with an expanded coverage area. The coverage area is expanded to include a coverage area of each of the four RSNs. This is because a message can be hopped through any of the four RSNs on its way to the gateway. FIG. 12 illustrates a larger radio network comprising a gateway and twelve RSNs. In such a radio network, messages from RSNs farther away from the gateway are hopped through intermediary RSNs on their way to the gateway.

Simply expanding the coverage area of the radio network, however, does not necessarily expand the range at which RSNs become aware of the radio network if beacons are only received by RSNs within range of the gateway. Thus, it is advantageous to expand the area in which beacons of a radio network can be "heard". An expanded area of beaconing increases the probability that RSNs will hear a beacon and join the radio network, as well as the probability that they will do so sooner and farther away than they would otherwise.

In order to effect this expansion of the beaconing area, RSNs connected to a gateway via the radio network are used to "repeat", i.e., retransmit, the gateway's beacon. In conventional systems, this is sometimes accomplished by requiring every node in a network to broadcast a beacon during a beacon interval, or alternatively by synchronizing the entire network.

In a radio network, however, the following methodology, described in the context of a radio network which includes a captured gateway and a plurality of RSNs, is preferably used.

Beacons are transmitted by the gateway at regular intervals, i.e., a beacon interval "Tb". When an RSN receives a beacon, the RSN selects a random variable between (Tb–X) and (Tb), where 0<X<Tb. The value of X is selected for each radio network and is tweaked appropriately for the radio network. If a time corresponding to the randomly selected variable passes before another beacon is received, then that RSN broadcasts its own beacon and resets its timer to the maximum value, i.e., Tb, such that it will not broadcast another beacon at least for a period corresponding to this maximum value. However, each RSN keeps track of an amount of time since it has broadcast a beacon of its own, and if this amount of time exceeds a "must beacon" interval, and the RSN still sees beacons of a lesser hop count, then the RSN will broadcast a beacon regardless of whether it has recently received a beacon. This allows distant RSNs to remain a part of a radio network even if statistics have worked out such that the RSN has a significantly reduced beacon rate. If an RSN does not receive a beacon after M*Tb, where M is an integer and M*Tb is greater than the "must beacon" interval, then the RSN decides that it has lost connection with the radio network and takes appropriate action to find it, or else goes free.

Figure 13:
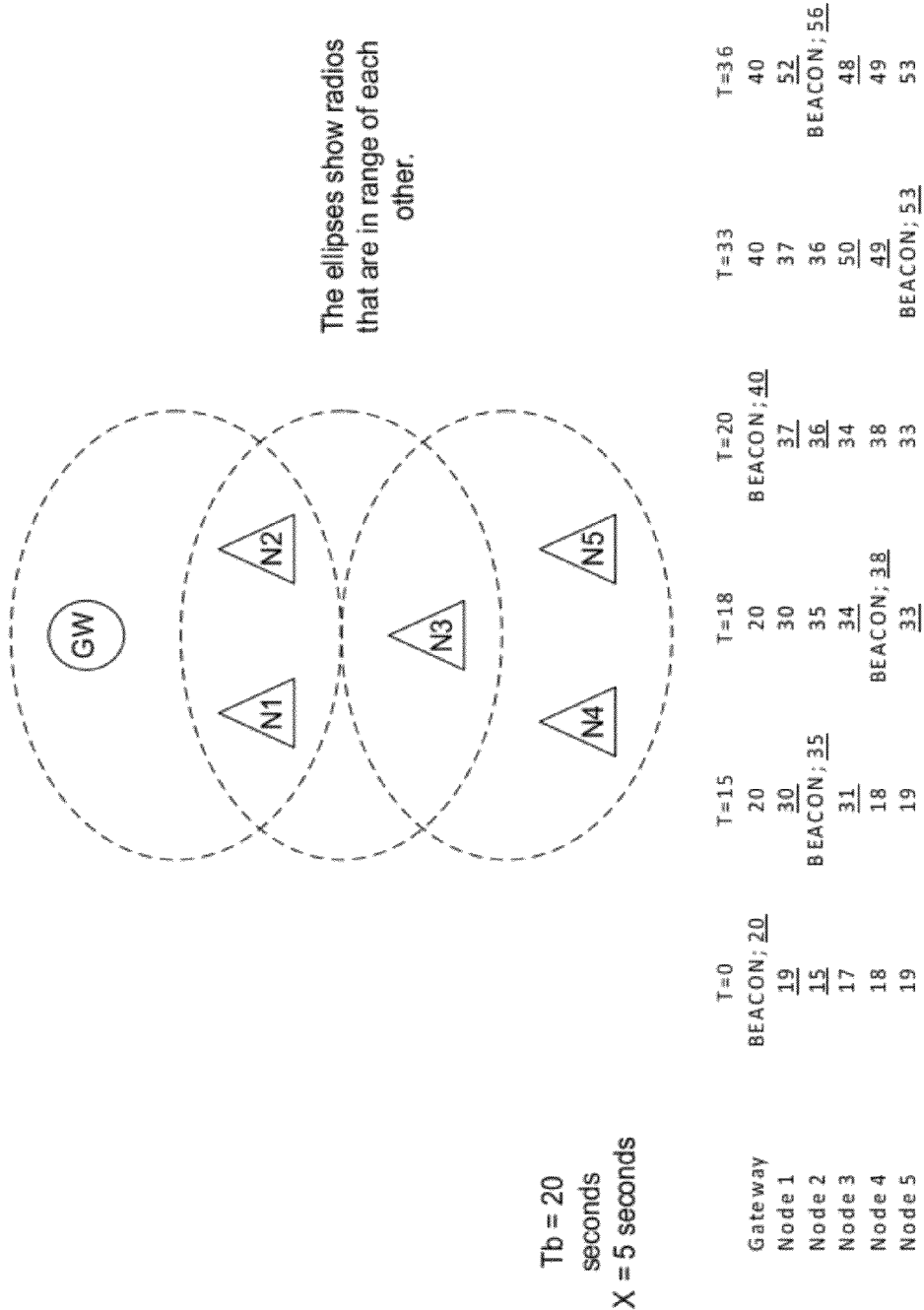
FIG. 13 illustrates a radio network comprising a captured gateway and five RSNs in accordance with a preferred embodiment of the present invention.

FIG. 13 illustrates a radio network comprising a captured gateway and five RSNs. The radio network is configured such that Tb=20 seconds and X=5 seconds. Thus, when an RSN receives a beacon, it randomly selects a value between (Tb–X), i.e., (20–5), or 15, and Tb, i.e., 20. This selected value between 15 and 20 is then set as a countdown timer for determining when to broadcast a beacon. The table of FIG. 13 (144-9A) provides an example of beaconing in the radio network of FIG. 13. More specifically, each column of the table represents a specific time value, from T=0 to time T=36. The first row of the table is associated with the gateway of the radio network, and each subsequent row is associated with an RSN of the radio network. Each field corresponding to a row and column represents a next beacon time value of the gateway/RSN associated with that row at the time represented by that column. Each next beacon time value indicates the time at which that particular RSN/gateway is next configured to beacon based on a countdown timer of that RSN/gateway. Notably, this next beacon time value represents the time T at which each RSN's respective timer will expire, rather than indicating the amount of time left until the timer expires. Further, although countdown timers are preferably utilized, it will be appreciated that alternative timing methodologies may be utilized in various, alternative implementations. Further, in the table, broadcasting of a beacon, by a particular gateway/RSN, is indicated by "BEACON", and resetting of a countdown timer, at a particular time T by a gateway/RSN, is indicated by an underlining of the next beacon time value of the field corresponding to that RSN/gateway and that time value T.

As can be seen in the table, at time T=0, the gateway broadcasts a beacon. This beacon is received by RSNs 1 and 2, each of which sets its timer to a random interval between Tb–X (in this example, 20–15, i.e., 5 seconds) and Tb (in this example, 20 seconds). Here, RSN 1 sets its timer to expire in 19 seconds, i.e., at time T=19, and RSN 2 sets its timer to expire in 15 seconds, i.e., at time T=15. It will be appreciated that both of these values fall between 15 and 20, as specified. Note that RSNs 3, 4, and 5 do not receive the beacon broadcast by the gateway, and thus do not reset their timers. After broadcasting this beacon, the gateway resets its timer to 20 seconds such that it will broadcast another beacon at time T=20.

At time T=15, RSN 2's timer expires, thus causing RSN 2 to broadcast a beacon. This beacon is received by RSNs 1 and 3. In response, RSNs 1 and 3 each reset their timers to a random period between 15 and 20 seconds. RSN 1 resets its timer t1 to expire in 15 seconds, i.e., at time T=30, and RSN 3 resets its timer to expire in 16 seconds, i.e., at time T=31. RSNs 4 and 5, being out of broadcast range of RSN 2, do not receive the beacon broadcast by RSN 2 and thus do not reset their timers. RSN 2, after broadcasting the beacon, resets its timer to the maximum period, i.e., Tb, or 20, such that its timer will expire at time T=35.

At time T=18, RSN 4's timer expires, thus causing RSN 4 to broadcast a beacon. This beacon is received by RSNs 3 and 5, which, in response, each reset their timer to a random period between 15 and 20 seconds. RSN 3 resets its timer to expire at time T=34, and RSN 5 resets its timer to expire at time T=33. RSNs 1 and 2 are out of broadcast range of RSN 4, and thus do not reset their timers. RSN 4, after broadcasting the beacon, resets its timer to expire at time T=38.

At time T=20, the gateway broadcasts a beacon, which is received by RSNs 1 and 2, causing each of them to reset their timer to a random period between 15 and 20 seconds. RSN 1 resets its timer to expire at time T=37, and RSN 2 resets its timer to expire at time T=36. RSNs 3, 4, and 5, being out of broadcast range, do not receive the beacon broadcast by the gateway and thus do not reset their timers. After broadcasting this beacon, the gateway resets its timer to expire at time T=40.

At time T=33, RSN 5's timer expires, thus causing RSN 5 to broadcast a beacon. This beacon is received by RSNs 3 and 4, which, in response, each reset their timer to a random period between 15 and 20 seconds. RSN 3 resets its timer to expire at time T=50, and RSN 4 resets its timer to expire at time T=49. RSNs 1 and 2 are out of broadcast range of RSN 5, and thus do not reset their timers. RSN 5, after broadcasting the beacon, resets its timer to expire at time T=53.

At time T=36, RSN 2's timer expires, thus causing RSN 2 to broadcast a beacon. This beacon is received by RSNs 1 and 3, which, in response, each reset their timer to a random period between 15 and 20 seconds. RSN 1 resets its timer to expire at time T=52, and RSN 3 resets its timer to expire at time T=48. Notably, RSN 3 actually resets its timer to expire sooner than it was previously set to expire. RSNs 4 and 5 are out of broadcast range of RSN 2, and thus do not reset their timers. RSN 2, after broadcasting the beacon, resets its timer to expire at time T=56.

It will be appreciated that this method allows for an organized use of a channel when many RSNs are gathered together. Further, it helps to extend the range of a radio network when RSNs are much farther apart, while minimizing the amount of power required to maintain the network. In accordance with the above-described methodology, RSNs will beacon less often on average than under a conventional pattern of beaconing every Tb. Notably, this method can be utilized with non-radio networks as well, and in fact can be utilized with both synchronous and asynchronous networks, although works best with an asynchronous network.

Figure 13A:
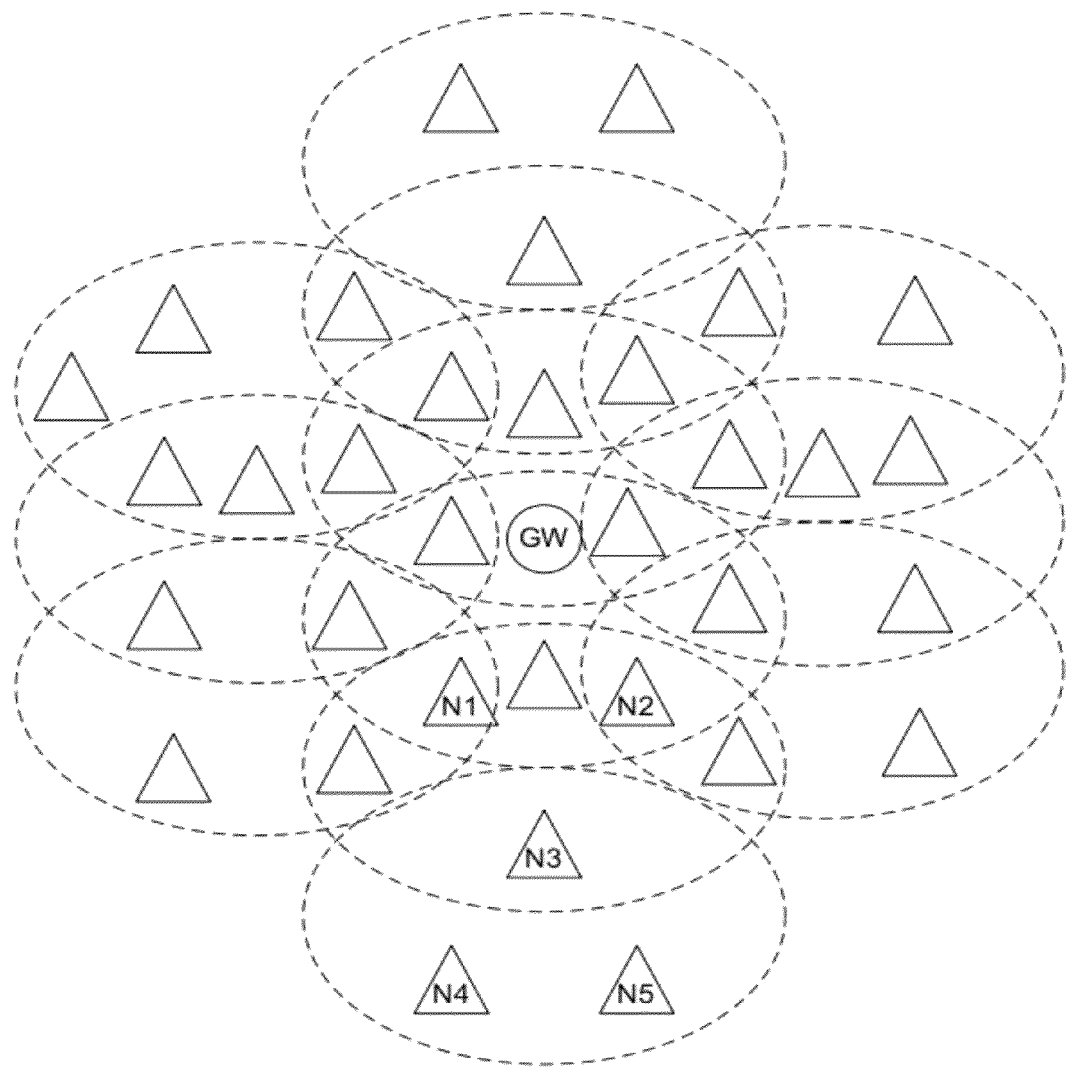
FIG. 13A illustrates the addition of a plurality of RSNs to the network of FIG. 13.

This implementation, however, assumes that the beacon interval, i.e., Tb, stays constant. If additional RSNs, however, move into the coverage area of the network, and join the network, then continuing to beacon at the beacon interval of twenty seconds could potentially increase the level of network congestion. FIG. 13A illustrates the addition of a plurality of RSNs to the network of FIG. 13. Preferably, in anticipation of, or in response to, increased congestion, the beacon interval Tb is adjusted upwards to attempt to reduce network congestion. For example, the beacon interval Tb could be set to 60 seconds, rather than 20 seconds.

In a preferred implementation, the gateway senses a level of network congestion, or alternatively a lack thereof, and autonomously adjusts its beacon interval to a value appropriate to the sensed level of congestion. This beacon interval is preferably propagated to RSNs of the network, such that each node will itself beacon in accordance with this updated interval.

Further, if the gateway is aware of attributes or values associated with RSNs of the network, such as, for example, types of assets that the RSNs are attached to, then the gateway can take this information into account when selecting an appropriate beacon interval.

Alternatively, in at least some preferred embodiments, RSNs themselves autonomously update their own beacon intervals, based upon a sensed level of network congestion, or lack thereof, as well as other information as described with respect to gateways. In at least some embodiments, this updated beacon interval can be propagated throughout the network as well, and, in at least one embodiment, other RSNs, and/or gateways, can elect whether to adjust their own beacon intervals.

In addition to that disclosed herein, further disclosure regarding beaconing is set forth in Appendix I, incorporated herein by reference. Disclosure regarding "adaptive beaconing" is set forth in Appendix L, incorporated herein by reference.

Detailed Description

Radio Network Gateways

In accordance with one or more preferred embodiments of the present invention, and in the preferred first-responder implementation, a gateway is responsible for maintaining connectivity with a gateway server in order to remain operational. A free gateway, i.e., one that is not connected to a gateway server, is not operational and will not broadcast a beacon, and will refuse communications of any kind from RSNs. When free, a gateway continuously attempts to connect to its known gateway server.

Notably, multiple gateways can be connected to a single gateway server, and in fact multiple gateways can exist in close physical proximity to each other, all being connected back to a single gateway server. (Moreover, multiple gateways in close physical proximity could also be connected to different gateway servers, in which case each would be associated with a distinct Area ID, and thus belong to a distinct coverage island, as described more fully hereinbelow. In some situations, two such islands could in fact merge together, as described more fully further hereinbelow.)

As described above, each gateway preferably includes a gateway RSN, although does not necessarily have to. Each gateway RSN is functionally equivalent to a standard RSN with a few exceptions. A receiver of each gateway RSN is always active, and therefore a repeated WU_ATTN frame is not required prior to data transmission. This can be changed, however, i.e., nodes can select and indicate whether they maintain a receiver that is always active.

Additionally, gateway RSNs do not perform any application layer protocol parsing. Rather, gateway RSNs pass application layer datagrams, as well as all non-acknowledgment network datagrams to a gateway processing element. It will be understood, as described hereinabove, that the gateway provides auto-acknowledgment capability that a datagram reached the gateway. Notably, this acknowledgment is provided irrespective of the gateway's ability to communicate with a gateway server.

The processing element of a gateway provides a very limited set of processing functions, generally comprising two way protocol conversion between a node network and a gateway server. Inbound datagrams are converted to an XML style format for transmission to the gateway server, and outbound XML formatted datagrams are converted to appropriate node-network level datagrams for communication via the gateway RSN.

When captured, a gateway is preferably in continuous communication with its gateway server, thus ensuring normal node communications. However, a gateway also allows for intermittent communication with a gateway server and does not immediately become free upon losing connectivity with its gateway server. Instead, a timeout period is utilized. During the timeout period, a gateway stores communications received from nodes that are intended for the gateway server.

If communication with the gateway server is re-established, the gateway forwards these stored communications on to the gateway server. If, however, communication with the gateway server is not re-established, the gateway transitions to a free state and shuts down network operations. In this even, the gateway broadcasts an application level message across the node network indicating that the gateway is offline. Each node receiving this broadcast enters its own free state, and must then attempt to join a new network. Although some nodes may not receive this broadcast, routing mechanisms described hereinabove will cause all nodes to eventually transition to their free state and attempt to join a new network.

Detailed Description

Radio Network Gateway Servers

In accordance with one or more preferred embodiments of the present invention, and in the preferred first-responder implementation, a gateway server's primary role is to provide network resolution, although the gateway server further provides all system application interfaces to external client applications. As noted hereinabove, a gateway server is associated with an Area ID. Preferably, each gateway server is assigned a unique Area ID by the managing entity.

As alluded to hereinabove, a gateway server maintains a database of known network members, e.g., nodes, a status of each, and known outbound path information for each, including the gateway each node is communicating through. This database is maintained in several ways.

First, as described hereinabove, path information of each inbound message, including a UID associated with each node traversed by the inbound message, is appended to that inbound message and is thus available to the gateway server. Additionally, as also described hereinabove, information is provided to the gateway server via NEXTHOP_UPDATE messages.

Utilizing this database, the gateway server is likely able to maintain a variety of possible return paths to each node. Outbound traffic which does not successfully make its way to a destination node can be retried utilizing a different path. Typically, an unsuccessful attempt is retried three times utilizing alternate paths. If each of these retries is unsuccessful, the gateway server can direct the message to be sent as a cascaded broadcast, which is sent to all nodes via all known, connected gateways. It will be appreciated that such a cascaded broadcast is network intensive and is avoided unless it is determined to be essential.

When all retries and communication mechanisms outbound to a node have been tried unsuccessfully, the node, rather than being immediately removed from the gateway server's database, is notated therein as being inactive. If communication is re-established with the node before a system-determined timeout period, which can be specified by a user, then the node is considered active once again. If, on the other hand, the time-out period expires before communication with the node is re-established, the node is removed from the database.

Transmission of an outbound messages to an inactive node is attempted one time, and then the message is either queued or discarded, and an appropriate indication is provided to any connected client application. A message is only queued for delivery to an inactive node if the message is marked as persistent. A mechanism allowing a client application to specify that a message is persistent will be enforced.

Detailed Description

Radio Network Presence

In accordance with one or more preferred embodiments of the present invention, and in the preferred first-responder implementation, the regular determination of the presence of a node within a network, such as by use of a check-in message, is desirable in order that the location of the node at an incident may be confirmed and monitored on an ongoing basis. To accomplish this, each node is configured to communicate a check-in message to its gateway at predefined intervals of time. This predefined interval of time, or check-in period, is communicated to each node via beacon, as noted hereinabove. Thus, "presence information" on each node can be gathered. The gateway communicates this presence information to the gateway server, which can then communicate it to one or more client applications.

Figure 14:
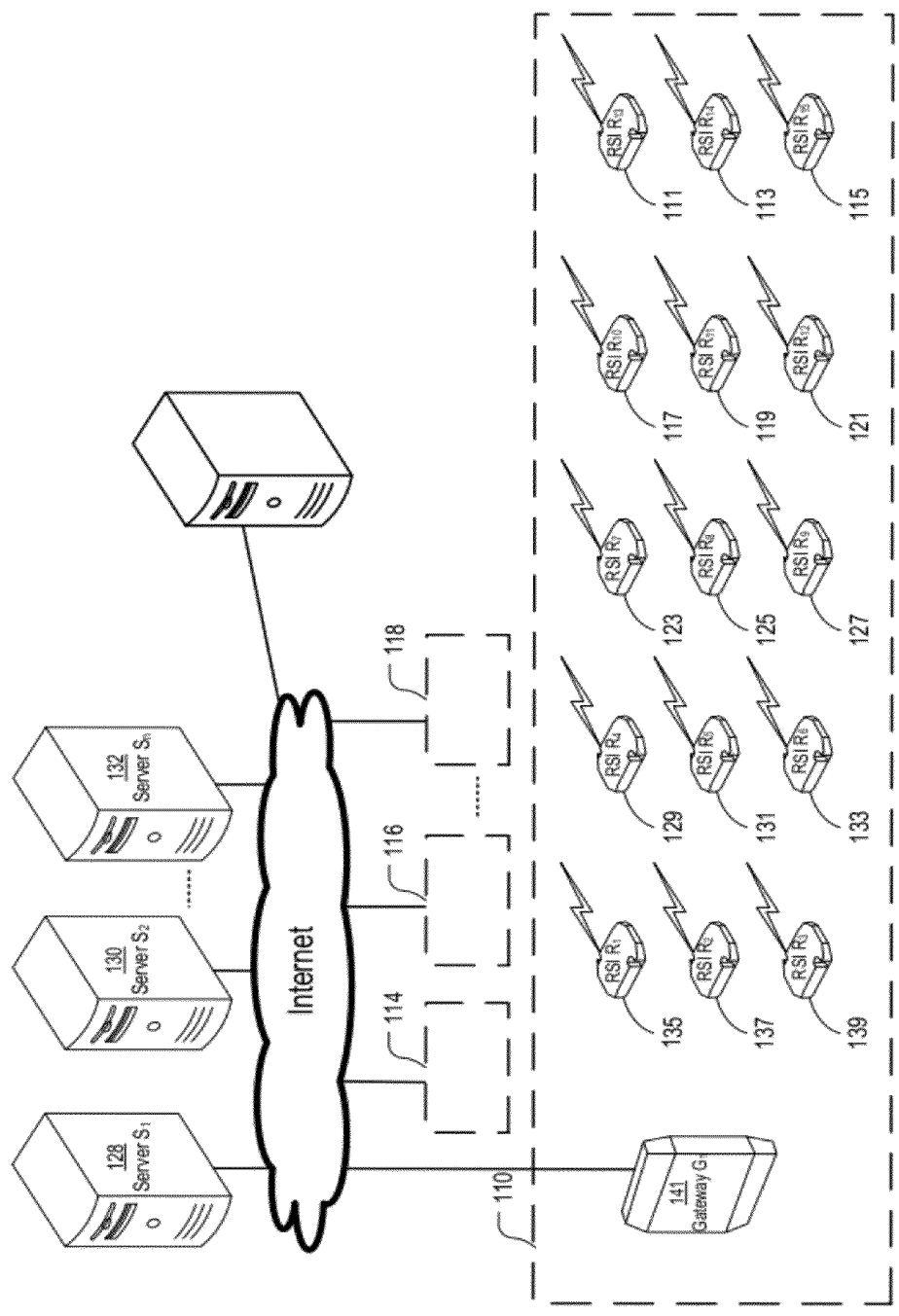
FIG. 14 illustrates a data communications network 110 having multiple user servers 128,130,132 and client applications as well as multiple locations, each having a presence server in accordance with a preferred embodiment of the present invention.

A client application which keeps track of presence information of a plurality of nodes can be characterized as a presence server. A client application may serve as a presence server for all nodes of a network, or alternatively for a subset thereof. The gateway server also may function as a presence server for one or more of the nodes. FIG. 14 illustrates a data communications network 110 having multiple user servers 128,130,132 and client applications as well as multiple locations, each having a presence server. For example, a plurality of nodes associated with shipments for Wal-Mart may be tracked, and the presence information thereof maintained, by a first presence server, while a plurality of nodes associated with shipments for Target may be tracked, and the presence information thereof maintained, by a second, different presence server, even though presence information (e.g., check-in messages) for both pluralities of nodes are communicated over the Internet by way of the gateway server.

Figure 15:
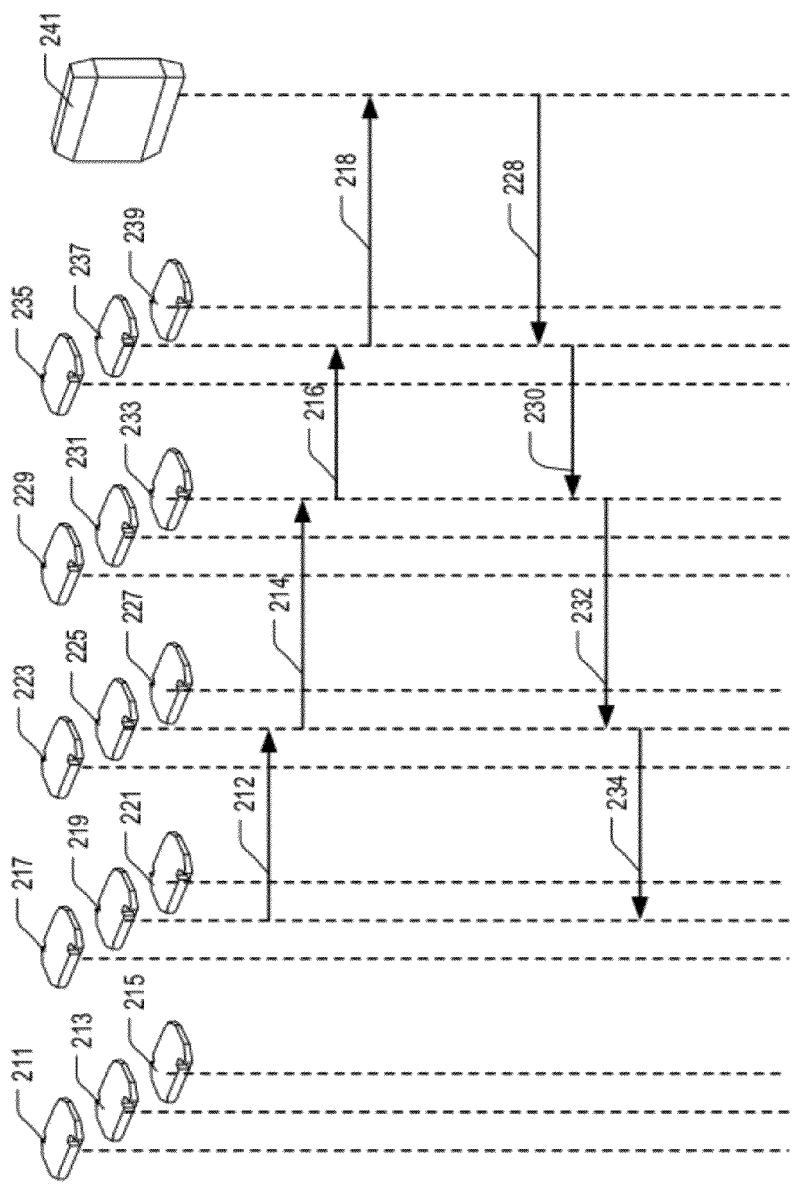
FIG. 15 illustrates an exemplary network 210 including fifteen nodes 211-239 in accordance with a preferred embodiment of the present invention.

FIG. 15 illustrates an exemplary network 210 including fifteen nodes 211-239 (odd). In FIG. 15, a check-in message originating at node 219 requires three hops to get from node 219 to the gateway 241. The path for the three hops is from node 225 to node 233 via hop 214; from node 233 to node 237 via hop 216; from node 237 to gateway 241 via hop 218. (Note that the initial transmission 212 by node 219 to node 225 is not considered or deemed a "hop" herein because it is the initial transmission, but this is a semantic difference.)

After the message has been communicated to the gateway 241, the gateway 241 returns an acknowledgment (hereinafter, "ACK") of the check-in message to the initiating node 219. The pathway by which the ACK is communicated is the reverse of the pathway by which the check-in message is communicated, and includes transmission 228 with hops 230, 232, and 234.

In total, communication of a check-in message from node 219 to the gateway 241 requires four total node transmissions (the initial transmission and three hops), and communication of an acknowledgment from the gateway 241 to the node 219 requires three node transmissions (each a hop) with the initial transmission being by the gateway 241.

It will be appreciated from the above description and FIG. 15 that nodes 211,213,215 each require four hops in communicating a check-in message to gateway 241; nodes 217,219, 221 each require three hops in communicating a check-in message to gateway 241; nodes 223,225,227 each require two hops in communicating a check-in message to gateway 241; nodes 229,231,233 each require one hop in communicating a check-in message to gateway 241. Nodes 235,237,239 do not require any hops in communicating a check-in message to gateway 241 as each directly communicates with the gateway 241.

The respective number of node transmissions for each of these sets of nodes is set forth in the table of FIG. 16. For example, nodes 211,213,215 each require eight hops or node retransmissions to communicate a check-in message and receive an acknowledgment back. Multiplying these eight required transmissions by the number of nodes, i.e., three, results in a total of twenty-four required node retransmissions for check-in messages from nodes 211,213,215 per check-in interval, e.g., every fifteen minutes.

It will be appreciated that having a large number of nodes with a pathway to the gateway router 241 including a large number of hops greatly increases the total number of node retransmissions required for check-in messages. As can be seen in the table of FIG. 16, the total number of node retransmissions required for a check-in message and corresponding acknowledgment for each of the fifteen nodes of network 210 is sixty.

This number can be reduced, however, by taking advantage of path information stored in inbound communications. Specifically, each communication of a check-in message preferably includes the UID of each node along the path the check-in message has actually been communicated along, as described hereinabove.

When the gateway 241 receives the check-in message from node 219, the gateway 241 identifies from the pathway the nodes along which the message has hopped, i.e., through intermediate nodes 225, 233, 237. In particular, the gateway 241 analyzes the message to determine the UID of each node along the pathway. Then, rather than only considering the check-in message of node 219, the gateway 241 further utilizes the UIDs of nodes along the path to determine the presence of these additional nodes. The presence information for each of these nodes consequently is updated.

Importantly, and as outlined hereinabove, the ACK that is sent to node 219 is sent along the reverse pathway by which the check-in message was sent to the gateway 241. This insures that each intermediate node receives and retransmits the ACK for delivery to node 219. In doing so, each intermediate node thereby receives its own acknowledgement that its presence, as indicated by the pathway information, has been acknowledged by the gateway 241.

In this respect, each intermediate node 225, 233, 237 remembers that it passed (hopped) an inbound check-in message from the initiating node 219 and, when it passes (hops) the ACK back to the initiating node 219, the intermediate node 225, 233, and 237 uses the ACK as a positive indication that the inbound check-in message was delivered. Based on this, each of the intermediate nodes 225, 233, and 237 causes its check-in timer to be reset to zero as if the respective node had sent a check-in message itself and received back an ACK. As such, none of the intermediate nodes will send its own check-in message until its respective time interval for doing so (starting at the time of retransmitting the ACK for delivery to node 219) has passed.

This methodology is utilized by a node not just when hopping check-in messages, but when hopping any inbound message. Thus, the intermediate nodes 225,233,237 benefit from hopping inbound messages, as each resets its chronometer (clock or timer) for counting down its check-in interval, none need to send a check-in message as quickly as it otherwise would have done if there had been no message hopping. As an example, the outside nodes 211,213,215 may send check-in messages every 15 minutes, with each of all of the other nodes serving as intermediate nodes for the outside nodes 211,213,215, whereby check-in messages for such intermediate nodes would not be required to be sent. In this scenario, only twenty-four retransmissions or hops thus are required, instead of 60 hops as set forth in the table of FIG. 16 (a sixty-percent reduction!).

Additional disclosure regarding determining presence is set forth in Appendices A and E, each incorporated herein by reference.

Detailed Description

Discrete Radio Networks

In accordance with one or more preferred embodiments of the present invention, and in the preferred first-responder implementation, a radio network is typically defined by a single gateway controller, i.e., a gateway server and a captured gateway, which can be characterized as establishing an "island" of coverage. It will be understood that a gateway controller can utilize additional gateways, i.e., gateway routers, as nodes to effectively extend a coverage area of the radio network, and it will further be understood that RSNs which connect to the radio network can also function as nodes that extend the coverage area of the radio network. The entire radio network is associated with the Area ID of the gateway server of the gateway controller.

Figure 17:
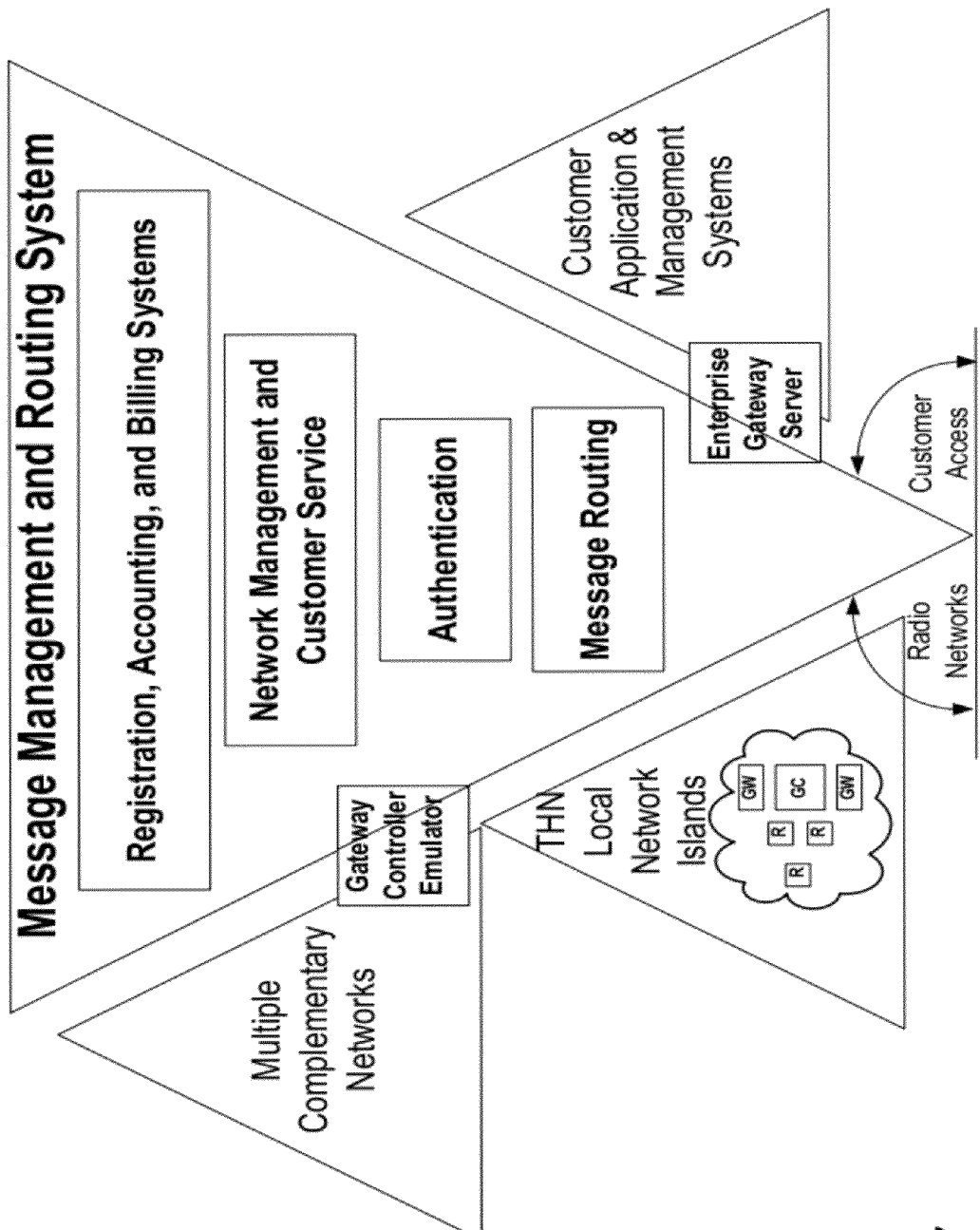
FIG. 17 illustrates a system comprising multiple radio networks, wherein each radio network includes a gateway controller, and further includes one or more gateways and RSNs, in accordance with a preferred embodiment of the present invention.

Thus, in a system comprising multiple radio networks, each radio network includes a gateway controller, and further includes one or more gateways and RSNs, as illustrated in FIG. 17. Each of these radio networks is discrete in that each is controlled by a single gateway controller, which communicates with the MMR system through an application program interface (API).

Because each gateway and RSN of a radio network is associated with the Area ID corresponding to the gateway server of the gateway controller of that radio network, although radio networks may overlap in physical area, they will still remain distinct, as nodes of each radio network will be associated with different Area IDs, and thus will not respond to communications utilizing a different Area ID. (Notably, however, radio networks may sometimes merge, as described hereinbelow.)

Each of these radio networks can be mobile or fixed in place, and can be public, shared, or private. A public radio network is owned and operated by the managing entity and is configured to allow RSNs associated with any customer to connect to it. A shared radio network is similar to a public radio network in that it is configured to allow RSNs associated with any customer to connect to it, but it is not owned by the managing entity. A private radio network is owned by a customer and is configured to allow only RSNs associated with that customer, or otherwise specified as allowed, to connect to it.

Detailed Description

Class ID

In accordance with one or more preferred embodiments of the present invention, and in the preferred first-responder implementation, the functionality to allow only certain RSNs to access a private radio network is provided utilizing Class IDs. In such a preferred implementation, each RSN of a radio network is associated with a primary Class ID. This primary Class ID defines who owns the RSN and preferably further defines additional grouping information using entity and asset type sub-fields within the primary Class ID field. This primary Class ID is sent to a gateway server with other information during a network registration process. Connection to a private radio network can be restricted based on Class ID.

Figure 18:
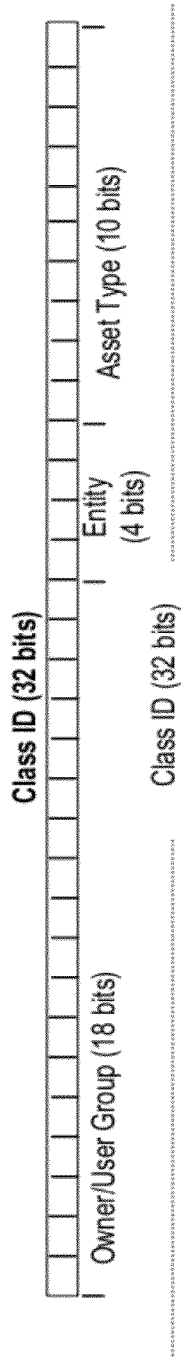
FIG. 18 illustrates that, in accordance with a preferred embodiment of the present invention, a Class ID is represented by a 32 bit (4 byte) field which is partitioned into three sub-fields: an owner sub-field, an entity sub-field, and an asset type sub-field.

A Class ID preferably is represented by a 32 bit (4 byte) field which is partitioned into three sub-fields: an owner sub-field, an entity sub-field, and an asset type sub-field. Each sub-field is defined hereinbelow and illustrated in FIG. 18.

The owner sub-field is configured to contain a value corresponding to a customer, i.e., a customer number associated with a customer. Owner sub-field values corresponding to each customer are preferably assigned by the managing entity. For example, the owner sub-field of a Class ID stored at an RSN corresponds to the customer that owns that RSN (or an asset the RSN is attached to). Connection to a private radio network can be restricted to RSNs having a specified customer number, i.e., RSNs having a certain value in the owner sub-field of their Class ID. A private radio network could be configured to allow access to a plurality of customer numbers. Notably, large customers may have two or more customer numbers, i.e., be assigned two or more owner sub-field values. Preferably, an RSN Profile Manager configuration tool (discussed in more detail hereinbelow) will only allow the owner sub-field of an RSN to be assigned to the primary Class ID of the RSN.

The owner sub-field can also be used to group nodes of different customers in some markets (i.e., to create one or more customer groups). For example, a "GA Public/Safety" customer group can be assigned, using the owner sub-field, to RSNs of multiple Public/Safety entities of different jurisdictions, thus enabling operation together at major incidents.

Utilization of Class IDs not only allows RSNs owned by different customers to be distinguished, but further allows customers to categorize, group, and label RSNs, which may be advantageous in organizing a plurality of RSNs when each RSN is attached to, or associated with, an asset.

The entity sub-field of a Class ID is definable by a customer and is used to create entity subgroups to help route RSN messages. Use of the entity sub-field allows a customer to address a particular subgroup of RSNs sharing the same entity sub-field value, without affecting all of its RSNs, and allocate billed events to different business entities. This field can be set to sixteen different values, fifteen of which can be defined by a customer, while "1111" is reserved as a broadcast to all defined entities, as described hereinbelow. As noted above, for customers with a large number of business entities, one or more additional customer numbers can be assigned, each additional customer number being understood as allowing for the definition of an additional fifteen entities.

The asset type sub-field is also definable, or selectable, by a customer and allows the customer to address a particular subgroup of nodes sharing the same asset type field value, e.g., an asset type of an asset a node is attached to. This field is used to help route messages to proper applications and can be used to address or perform an inquiry as to certain assets. Over one thousand different asset types can be defined. The asset type sub-field is further split into two sections. One section is for standard, recommended asset types, and provides 960 different values, assigned from the top down. A list of recommended asset types, developed by the managing entity, is distributed for customers to use when possible.

For example, if a "shipping container" is assigned a certain asset type value, all shipping containers of all users are addressable using this field. It will be appreciated that this capability works optimally only when customers utilize the recommended asset types. Preferably, as customers define asset types, the list of standard asset types will be revised and updated. A customer also has the ability to configure up to 64 customer-specific asset types. These are assigned from the bottom up. Preferably, these user-configured asset types comprise subgroups that relate specifically to the user's business. For example, user-configured asset types could be defined for: Early AM Delivery, $3^{rd}$ day air, Flat-screen TVs, etc.

An RSN Profile Manager Configuration tool allows a user to define common names that are then associated with entity and asset type values. The tool will translate these common names to the assigned values to be configured into the user RSNs.

It will be understood that utilization of Class IDs is an implementation of CBN technology as described hereinabove, and can be used in a radio network to preferentially route messages to RSNs associated with a customer or customer group, entity, or asset type, and/or to limit nodes that can be used to route messages. This is referred to as preferential class-based routing.

Each RSN is configured with up to six Class IDs, the primary Class ID being one of the six. When an RSN receives a message, it determines whether a Class ID of the message corresponds to one of its stored Class IDs, and proceeds accordingly. As discussed herein, if a received message includes all "1"s in any sub-field of its Class ID, the RSN makes an automatic match for that sub-field.

Further, this list of Class IDs is used to select a Class ID for transmitted messages. Up to three Class IDs of this list are preferably used in a prioritized manner when attempting to send a message, such as an inbound message to a gateway controller. If an event message cannot be delivered using a selected Class ID, a node preferably attempts to communicate the message using another Class ID that may increase the probability of transmission success. For certain event messages, nodes in the network with any Class ID are used to assist in successfully transmitting the event message to a gateway server.

Each Class ID field (owner, entity, and asset type) will reserve a value of all "1"s. This reserved value indicates that the field is accepted with any value (i.e., anything is a match). This allows enhanced functionality to address groups of similar assets. For example, all of a customer's nodes can be addressed by utilizing that customer's customer number in the owner sub-field and placing all "1"s in the entity sub-field and asset type sub-fields of a message. As another example, a government agency can address all first responders at an incident by placing a value corresponding to a standard asset type in the asset type sub-field and placing all "1"s in the owner and entity sub-fields. As still yet another example, a customer can address all nodes of one of their business entities by placing proper owner and entity values in those fields, and placing all "1"s in the asset type sub-field.

The procedures to configure Class IDs within an RSN will be in the RSN Profile Manager configuration tool.

Figure 19:
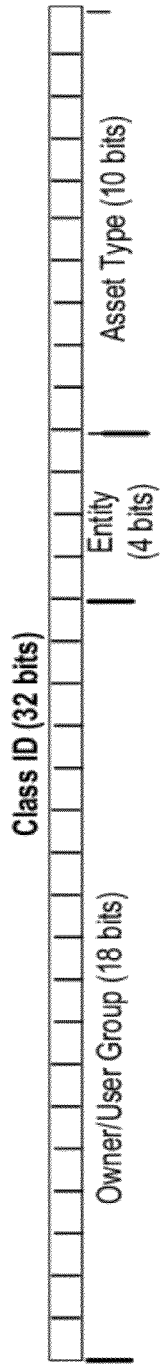
FIG. 19 illustrates a strawman example of Class ID partitioning for a shipping user, for example FedEx, in accordance with a preferred embodiment of the present invention.
Figure 20:
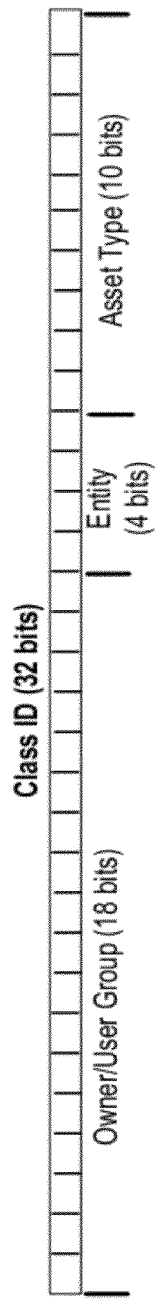
FIG. 20 illustrates a strawman example of Class ID partitioning in an emergency services sector context in accordance with a preferred embodiment of the present invention.

FIG. 19 illustrates a strawman example of Class ID partitioning for a shipping user, for example FedEx. FIG. 20 illustrates a strawman example of Class ID partitioning for a county public/safety organization user.

Detailed Description

Complementary Networks

Figure 21:
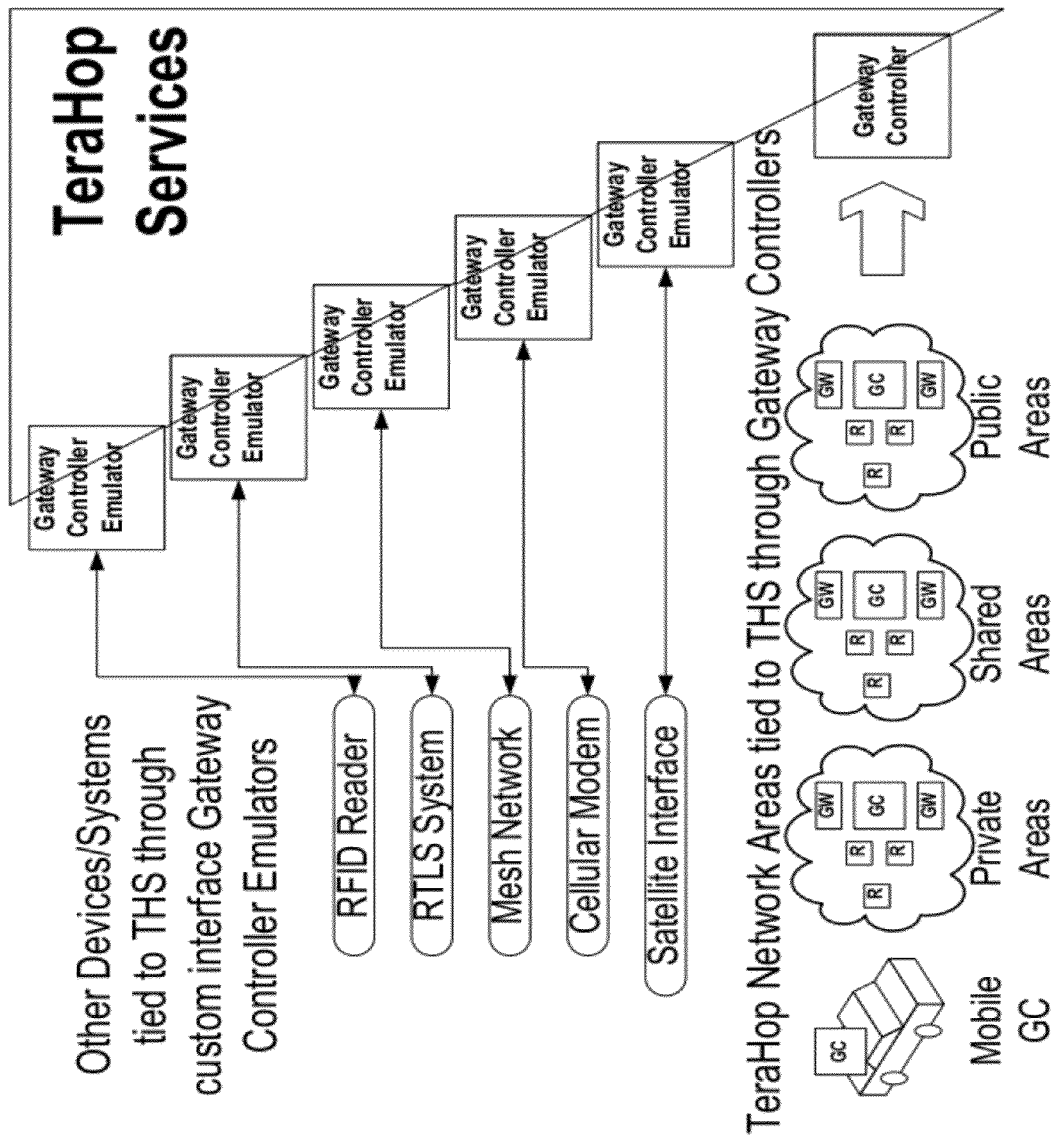
FIG. 21 illustrates that, in addition to radio networks, a system can include one or more complementary networks in accordance with a preferred embodiment of the present invention.

In accordance with one or more preferred embodiments of the present invention, and in the preferred first-responder implementation, accommodation is made for one or more complementary networks in addition to the radio networks, as illustrated in FIG. 17 and FIG. 21. It will be appreciated from the description hereinabove that a radio network comprises a plurality of RSNs which can be characterized as non-fixed end points of the radio network. Complementary networks can include similar non-fixed end points. As these complementary networks do not include a gateway controller, a gateway controller emulator (GCE) is utilized which translates messages to and from each complementary network that can be processed by the MMR system. Notably, each GCE translates, on a one-to-one basis, an identification of a node of a complementary network to a system UID for that node of the complementary network.

Thus, messages flowing through the MMR system to and from customer applications appear generally identical to communications from preferred radio networks of the present invention, except to the extent that additional functionality may be provided by a complementary network that is not provided by a radio network. Several exemplary complementary networks will now be described for example, and not by way of limitation, as this list is not intended to be exhaustive.

Detailed Description

Complementary Networks—Real Time Location Systems

Real Time Location Systems (RTLS), are typically on-site, fixed infrastructure systems that use small, asset-mounted tags that periodically broadcast a signal to fixed access points located throughout a building or complex. The infrastructure, i.e., fixed access points, in turn, determine a location of the asset with varying degrees of accuracy, and provide useful graphical location information to on-site users. To integrate an RTLS complementary network with the MMR system, an interface is provided which translates the information collected by the RTLS network before it is forwarded to a GCE. The GCE then relays the information determined by the RTLS system to the MMR system.

Detailed Description

Complementary Networks—Mesh Networks

Mesh networks are traditionally defined by a network topology, but in this context refer to a localized system that collects data from assets that are equipped with individual mesh nodes. Many proprietary systems falling under this umbrella that are aimed at many different applications have been deployed. Multiple GCEs are required to interface with the various types of mesh sensor networks that are currently being deployed. The GCEs will connect to a common interface point and report the presence and mapped condition of sensors associated with each node. Each customer's application will be required to map the collected data into something that is meaningful for them.

Detailed Description

Complementary Networks—Cellular Networks

The general category of cellular networks is very broad. In this context, it is used to refer to the transfer of data associated with monitoring/tracking assets over a cellular network. There are no standards associated with the usage or interpretation of the data that is transferred over cellular system data channels. To integrate a cellular network with the MMR system, a number of different GCEs will be required. Each GCE contains a unique code associated with interpreting data sent over a cellular network from a device or from some centralized aggregation server.

Detailed Description

Complementary Networks—Satellite

Similar to cellular networks, there are a wide variety of satellite systems available, such as, for example, SkyBitz. To integrate a satellite system with the MMR system, a number of different GCEs will be required. Each GCE contains a unique code associated with interpreting data sent over a satellite system from a device or from some centralized aggregation server.

Detailed Description

Complementary Networks—RFID

There are many different methods and interfaces associated with passive and active RFID systems that are principally used in on-site, item-level, tracking systems. To integrate an RFID system with the MMR system, a customer-driven, unique GCE interface is provided. A GCE interface point varies from interfacing to a reader or portal system, a reader aggregation server, or even an application server.

Detailed Description

Customer Application Elements

Figure 22:
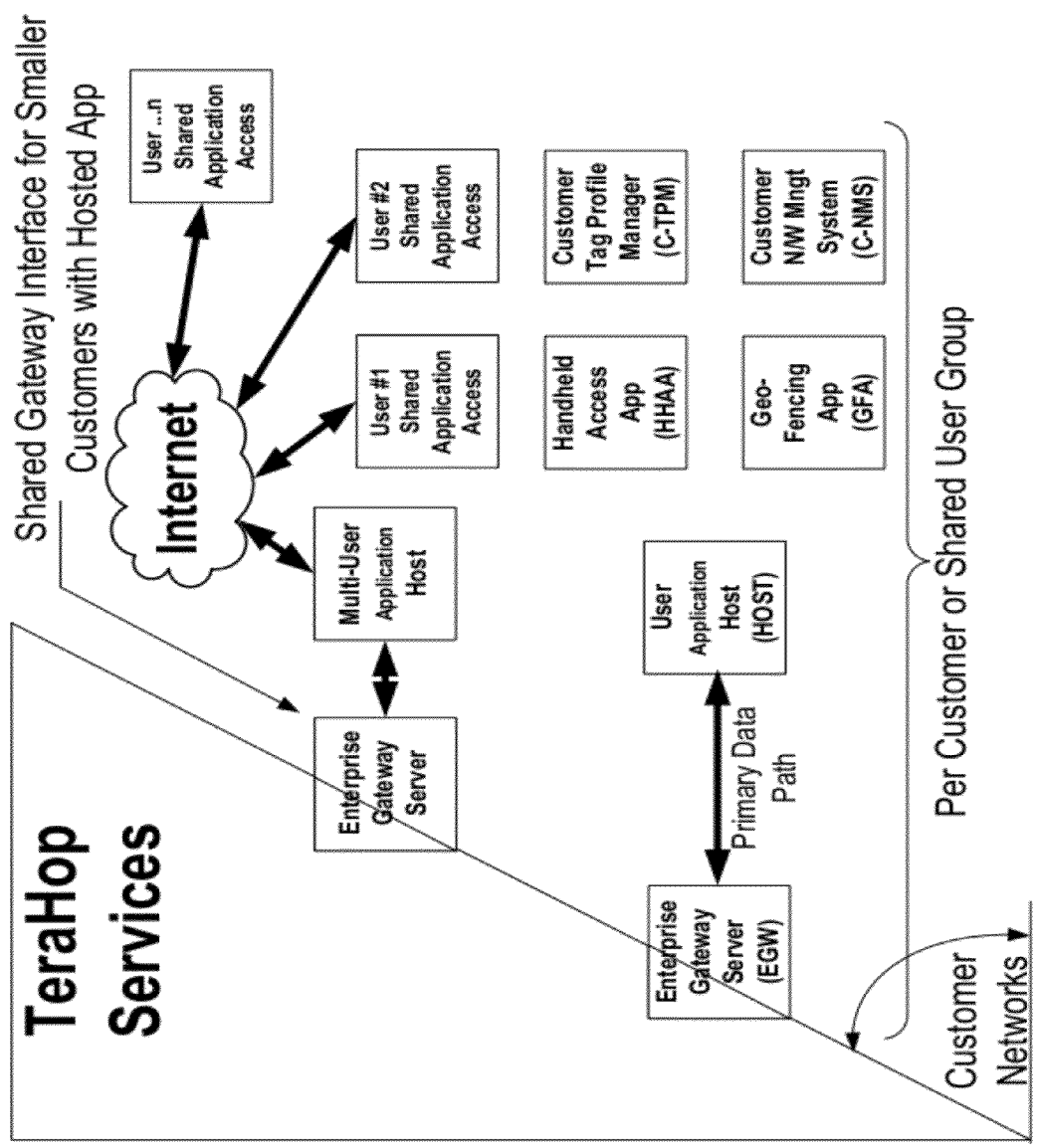
FIG. 22 illustrates major functional elements which support customer interaction with a system in accordance with a preferred embodiment of the present invention.

Each EGW can either be dedicated to a single customer, or shared by multiple customers. In a shared configuration, a shared application provides access to multiple customers. In an alternative shared configuration, a shared EGW provides access to applications of multiple customers. Conversely, a single customer can utilize multiple EGWs, each tied to a single application, or to the same application implemented in different regions. In accordance with one or more preferred embodiments of the present invention, and in the preferred first-responder implementation, major functional elements which support customer interaction with the system are illustrated in FIG. 22. Each of these elements interfaces with the MMR system via an Enterprise Gateway Server (EGW). Like gateway controllers, each EGW communicates with the MMR system through an API. Each EGW provides for the mapping of an RSN or other tag associated with a certain UID to a customer-specified IP address. Further, each EGW also provides for the creation and enforcement of business rules relating to which personnel can access which subsystems within the system.

Each EGW can either be dedicated to a single customer, or shared by multiple customers. In a shared configuration, a shared application provides access to multiple customers. In an alternative shared configuration, a shared EGW provides access to applications of multiple customers. Conversely, a single customer can utilize multiple EGWs, each tied to a single application, or to the same application implemented in different regions.

The functional elements illustrated in FIG. 22 will now be described.

Customer Application Host (HOST)—Customer application hosts can vary widely from customer to customer and implementation to implementation. Generally, such customer application hosts comprise a collection of different hardware and software systems supplied by, and used by, customers.

Customer application hosts typically translate data collected from RSNs (that is then communicated through a gateway controller and an EGW to the customer application host), such as, for example, presence and condition data, into useful business information to meet specific customer needs. Notably, there may often be a significant amount of custom code required for an interface between a customer application host and an EGW.

Handheld Access Application (HHAA)—This optional handheld access application supports basic interrogation and access functionality between tags and a handheld PDA or PDA-like device. This application will allow customers to utilize a PDA or PDA-like device to access the contents of an RSN, and possibly other tags as well, in the field. Such handheld access applications will be described in more detail hereinbelow.

Geofencing Application (GFA) This optional application allows a customer to create one or more geo-fences using a zip code, defined boundaries, or a defined radius around one or more locations, and then trigger a message when a tag (presumably attached to an asset) either enters or leaves the defined area. (To check for this event, a notification server (described hereinbelow) of the MMR system will have a presence notification flag set and will request a name location server (also described hereinbelow) of the MMR system to forward a "check location" message whenever it detects a new location from GPS or gateway controller area information that it receives when a tag sends in a message.)

Customer Tag Profile Manager (C-TPM)—This component allows customers to set, query, and download operational parameters within their RSNs to meet their application needs. Where it is both possible and practical, it will also support tags of complementary networks. It may, however, be more appropriate to use other tools supplied by the complementary network tag provided.

Customer Network Management System (C-NMS)—This optional subsystem is used to monitor and control certain network components and attributes. It is based on Simple Network Management Protocol (SNMP). Access to network components is limited to only those components that are owned or controlled by the particular customer.

Detailed Description

Message Management and Routing (MMR) System

In accordance with one or more preferred embodiments of the present invention, and in the preferred first-responder implementation, a message management and routing (MMR) system is illustrated in FIG. 17. The MMR system includes four functional blocks, namely: a registration accounting and billing systems block; a network management and customer service block; an authentication block; and a message routing block. Each of these blocks represents a logical subsystem (which may itself be comprised of multiple logical subsystems), and each subsystem may reside on separate platforms or may be integrated. In some implementations, multiple instances of one or more of the subsystems are utilized.

Figure 23:
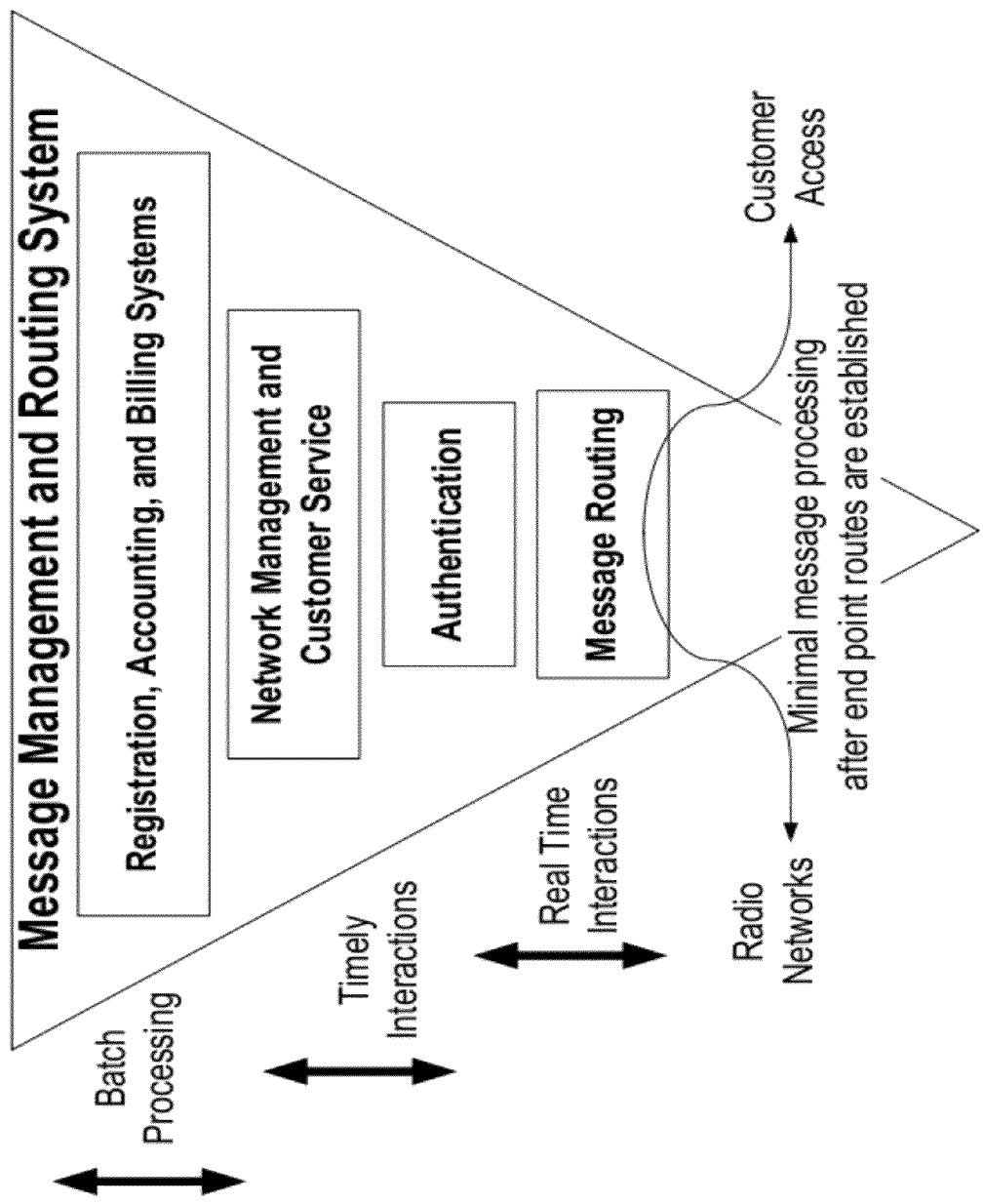
FIG. 23 illustrates latency requirements of each corresponding logical subsystem, which generally corresponds to the vertical ordering of the blocks shown in FIG. 17, and FIG. 23 additionally illustrates the flow of data between a wireless island—in this example a radio network—and a customer application host, all in accordance with a preferred embodiment of the present invention.

Notably, the vertical ordering of the blocks in FIG. 17 generally indicates the latency requirements of each corresponding logical subsystem, as can be seen in FIG. 23.

The upper most block corresponds to one or more subsystems that accumulate event-driven data and operator-entered data and primarily process it in batch modes.

The block below the upper most block corresponds to one or more subsystems that require "timely" latency and response time that generally involve responses to human inquiries following a classic client-server metaphor. Reasonable response times are required when queries are initiated by humans. In general, queries and responses are queued with round trip delays in the order of three to six seconds.

The lower most block corresponds to one or more subsystems that require real time message processing with minimum latency. These elements are heavily involved in most application message transactions. Their performance will characterize the entire system.

The authentication block, or functional layer, shown in the middle of the diagram provides authentication and access control for all elements within the network and all edge devices. In some instances, it will be involved in all requested transactions. In other cases, it will be involved on a once-per-session basis only. Notably, this is in addition to the authentication provided by EGWs as described hereinabove. Thus, the authentication functionality of the MMR system manages access only on a macro level for each customer under the assumption that the EGWs will contain business rules and control individual application and user access.

The architecture of the MMR system is designed such that messages containing data traveling between an RSN and user application are handled in real time with minimal practical latency, but an event data record (as described hereinbelow) that audits this transaction is queued or stored and forwarded for delivery when resources are not stressed.

Figure 24:
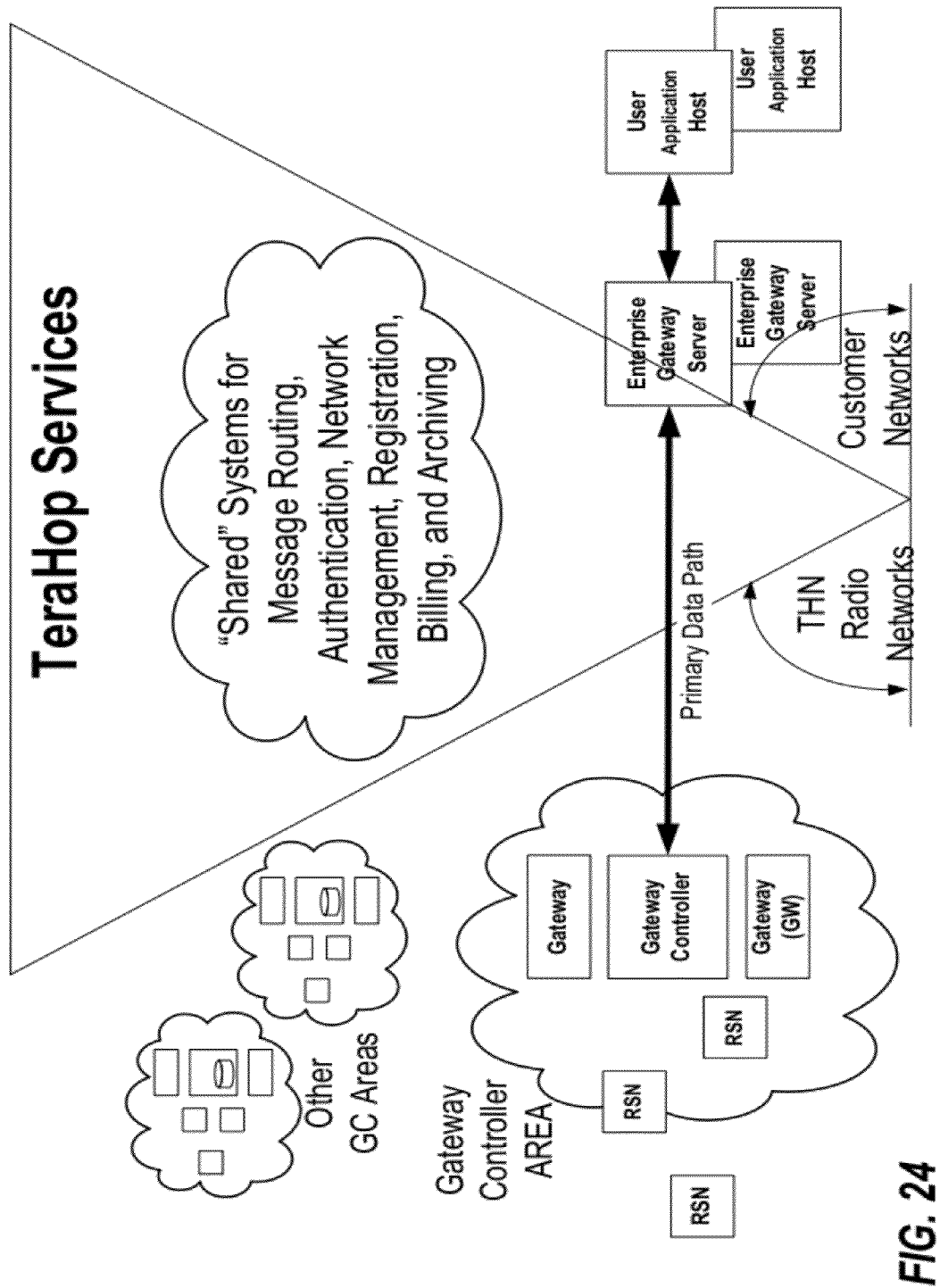
FIG. 24 illustrates that, in order to enable communication between a radio network and a customer application, the MMR system routes addresses to both a gateway controller of the radio network and an EGW associated with the customer application, at which point communications between the radio network and the user application will follow the primary data path shown, all in accordance with a preferred embodiment of the present invention.

FIG. 23 additionally illustrates the flow of data between a wireless island, in this example a radio network, and a customer application host. These flows are illustrated in the bottom of the figure with the dual ended arrow that links the radio networks and customer access. Note that the flow is illustrated as passing through a bottom portion of the message routing block, or functional layer, of the MMR system. This depiction represents the idea that the MMR system is minimally invasive to data flow. In this regard, the MMR system operates similarly to Session Initiation Protocol (SIP) in a VoIP network by receiving a request to route information, validating the request, and then returning a routing address. After this process is complete, the MMR system is no longer involved in the actual data transaction. For example, in order to enable communication between a radio network and a customer application, the MMR system routes addresses to both a gateway controller of the radio network and an EGW associated with the customer application, at which point communications between the radio network and the user application will follow the primary data path illustrated in FIG. 24. This approach minimizes latency and is highly scalable.

Figure 25:
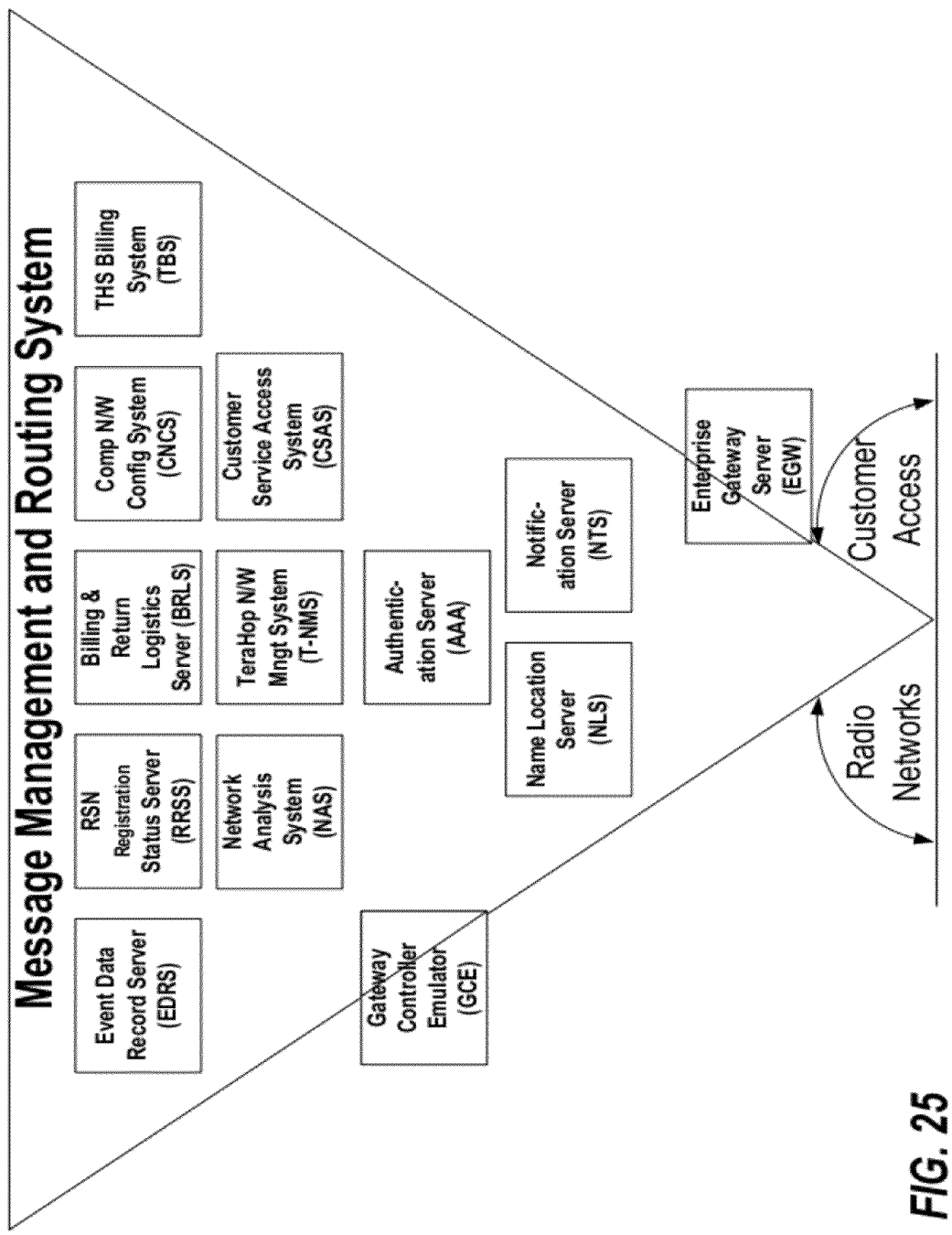
FIG. 25 is a detailed reference model illustrating logical subsystems of an exemplary MMR system implementation in accordance with a preferred embodiment of the present invention.

FIG. 25 is a more detailed reference model illustrating logical subsystems of an exemplary implementation including the MMR system. GCE and EGW edge devices are shown for completeness. At each functional level, each subsystem, i.e., each labeled block, represents a logical element that may or may not be implemented as a standalone hardware system. Further, larger or more complex implementations will require multiple instances of one or more subsystems. Notably, at least some implementations will not require one or more of these subsystems, such as for example private systems which might not require a billing subsystem. In such implementations, all subsystems are preferably still at least programmatically "stubbed out" so that they can later be added in easily. The vertical placement of the subsystems within FIG. 25 differentiates the latency and response time requirements for each subsystem, as previously described.

Before describing each functional subsystem in more detail, functionality of preferred implementations including MMR systems will be described.

Preferably, an MMR system performs many of the same functions as "anchor" servers and systems that are used in other wireless and wireline networks, but combines and, in some cases, separates, functions that are commonly implemented in a variety of other networks. First-generation cellular infrastructure analogies may be used in this description. These functions are required because these networks share a large number of common, basic characteristics that have been successfully deployed for years.

Further, preferably, inbound and outbound radio channels are managed differently and require different control and usage strategies. Inbound channels are typically loaded with independent and unsynchronized message requests, while outbound channels are under the control of a server that can queue and prioritize message delivery. (This function, among many others, will be provided by GCs and GCEs.)

These functions can be accommodated by using a simple messaging scheme between the various components. Messaging preferably involves point-to-point messages with static source and destination IP addresses assigned to both a sender and receiver. Both connection-oriented TCP/IP and connectionless UDP protocol methods are preferably used, based upon a required function.

Notably, and as described hereinbelow, hardware (and software) can be collapsed onto a single hardware platform that contains all of the required functions so that the system can be used for dedicated on-site (at incident) deployments.

Authentication, Authorization, and Accounting System (AAA)—This subsystem controls and monitors all internal and external requests to access any of the components within the MMR system. Both transaction-oriented and session-oriented checks and verification are made based upon the customer. The accounting portion of the system is limited to providing peg counters to the billing system (TBS).

Billing and Return Logistics Server (BRLS)—This subsystem is used to retain the status of active/inactive RSNs for billing purposes and also contains RSN return information for RSNs sent to a returns depot for re-distribution to shippers or other entities. It additionally may cover similar operational and logistic issues for complementary network tags.

Complementary Network Configuration System (CNCS)—This subsystem interfaces with various complementary networks of the system and is used to configure tags and other complementary network components that are integrated into the MMR system.

Customer Service Access System (CSAS)—This subsystem is the focal point for registering and monitoring RSNs by the managing entity to assist customers. It also provides real time visibility to the system to help identify and correct anomalous conditions. It further links to, and is integrated with, the CNCS to provide visibility and control of tags associated with those systems.

Event Data Record Server (EDRS)—This subsystem comprises one or more servers that receive and store XML records generated by various network components that can be used to historically analyze message flows and events. The event data records (EDRs) stored on these servers will be available to customers as well as managing entity personnel, and will be automatically backed up and archived for future use and investigation.

Network Analysis System (NAS)—This subsystem monitors network probes (strategically deployed RSNs running a special application), as well as retries, denial of service, and other network conditions, looking for anomalous operations or usage.

Name Location Server (NLS)—This subsystem provides routing information for RSNs and hosts when queried. It also provides other functionality directly related to message routing based upon flags set by other components, as noted hereinabove and described in more detail hereinbelow.

Notification Server (NTS)—This subsystem works in conjunction with the NLS. It contains information regarding entities that should be notified, and stores information for such notification, when the NLS becomes aware of the presence of an RSN or other tag.

RSN Registration and Status Server (RRSS)—This subsystem contains a listing of all registered RSNs in the system and an indication of their status (i.e., active, inactive, etc). It works in conjunction with the CNCS, which performs a similar function for Tags associated with those networks.

Billing System (TBS)—This subsystem queries various other databases to determine billing amounts for particular customers for network usage, setup or configuration fees, host application fees, and device leasing or rental fees.

Network Management Server (T-NMS)—The network management server has total control of all managing entity components and attributes.

Several exemplary scenarios illustrating MMR system functionality will now be provided. The scenarios assume that all devices and subsystems mentioned are registered and properly configured. A third scenario is also included that describes how an individual RSN is added to a network.

Detailed Description

MMR System—Exemplary Inbound Message Flow
(RSN to Customer Application)

As described hereinabove, in order to join a radio network, a free RSN responds to a beacon broadcast by a captured RSN or gateway. This response represents a request to register with that radio network, and is forwarded on to the gateway server, or gateway controller, associated with that radio network.

The gateway controller updates its local server database with the fact that the RSN has appeared in its area. It also stores path information for reaching the RSN. This information is stored in a temporary location, awaiting confirmation that the gateway controller is authorized to provide service to the RSN.

Based on the message type, the gateway controller may also communicate an outbound acknowledgement to the RSN through the appropriate gateway. (In most cases, other network entities, and not the gateway controller, will generate outbound acknowledgements.)

The gateway controller next checks a local routing database it maintains to see if it has "recently" routed a message of the same message type and class, and associated with this RSN's UID, to another network entity. If so, the gateway controller uses the information used for the prior recent routing as described below. The gateway controller also stores the received path in its local database.

If the gateway controller has not recently routed a message associated with this RSN, it forwards the routing request by sending an inquiry to an NLS that is recognized as its default anchor NLS. The routing request includes a static IP address of the gateway controller, a two-character country code of the gateway controller, and GPS coordinates of the gateway controller, along with the RSN's UID, current class, and the message type associated with this data transfer.

The receiving NLS examines the received UID to determine if it stores routing information for the particular RSN corresponding to that UID. If it is not designated as the "home" NLS for that particular RSN, the receiving NLS will check an RSN/NLS visitor address table it maintains to determine if it has recently received an IP address for a home NLS of the particular RSN. If it has, it forwards this information to the gateway controller.

If the RSN is not registered to the receiving NLS, and the RSN/NLS visitor address table does not contain appropriate routing information, the NLS looks up static IP addresses of all NLSs in an NLS registry table, and attempts to locate the home NLS of the particular RSN, i.e., the NLS with an RSN registration record for the RSN corresponding to the received UID, by sending an RSN home query message to all NLSs. Each query message contains the RSN's UID.

If an NLS contains the registration record for the particular RSN, i.e., is the particular RSN's home NLS, that NLS responds to the originating, anchor NLS, with an affirmative response, containing its IP address, affirming it is the home NLS for the particular RSN.

Upon receipt of the affirmative response from the home NLS, the originating, anchor NLS that is connected to the initiating gateway controller will forward the affirmatively responding NLS's IP address to the initiating gateway controller. Notably, this backbone query process approach is advantageous if all NLSs have wireline, broadband connectivity while NLS-to-gateway controller links comprises lower bandwidth, higher latency, wireless links.

If, on the other hand, the anchor NLS does not receive an affirmative response from any NLS, it will send a Denial of Service (DoS) message back to the initiating gateway controller which, in turn, will send the DoS message to the particular RSN. The gateway controller includes functionality to ensure that repeated messages from the same RSN, e.g., a DoS attack, do not burden the system. Repeated requests and failures will be reported by the gateway controller to the NAS, which may, in turn, notify the managing entity, e.g., via a T-NMS operator, for investigation.

If, though, a home NLS for the particular RSN is located, the originating NLS records the address of the home NLS for the particular RSN so that if another request is received from this RSN, it will know its home NLS and will be able to forward that address back to the gateway controller without having to send queries to all other NLSs to locate the home NLS. RSN/NLS visitor address records are kept for a specified interval and then purged on a First In First Out (FIFO) basis to limit overall file size.

When the originating gateway controller receives the home NLS' IP address back from the originating NLS, it initiates a routing request to the home NLS' IP address.

Upon receiving the routing request, the home NLS, which contains the particular RSN's routing profile, adds the initiating gateway controller's static IP address to a historical routing table associated with the particular RSN that is accessed using a Last In First Out (LIFO) queue. A set number of gateway controller addresses, dependent upon a default parameter of the NLS, will be stored in the LIFO queue. Any duplicate gateway controller addresses will be eliminated, with each additional new duplicate address stored at the top of the queue. This historical routing table is used to attempt to reach the RSN in response to an RSN message delivery request from another network or application element.

The home NLS examines a current location file associated with the particular RSN to determine if the particular RSN last appeared through a different gateway controller. If so, the NLS send a de-register message to the previous gateway controller to remove the particular RSN from a current RSN presence table of the previous gateway controller, e.g., from a database of the gateway server of the gateway controller, which database was previously described hereinabove as a database of known nodes.

The NLS additionally checks various RSN modes (described hereinbelow). If any special triggers are set, the NLS takes appropriate action (also described hereinbelow). Assuming that all RSN mode checks are positive, the NLS proceeds with the following process.

The NLS sends a token request to an AAA server for a token that can be used for an RSN-to-EGW transaction. The token request includes an indication of a target EGW specified in a routing table associated with the particular RSN. The AAA server creates such a token based upon a stored encryption key associated with the target EGW, and sends the token to the NLS, which then forwards the token to the target EGW.

The target EGW responds to the NLS that it has accepted the token and verified that the particular RSN, based on its UID, is valid. The EGW indicates that it is available to participate in the RSN transaction.

Upon receiving a positive response from the EGW, the NLS stores the token for later use in sending transactions between the RSN and the EGW. After a pre-set time interval has expired, the token will be discarded and a new token request process will be initiated.

The NLS also queries an NTS it is associated with to see if there are any inbound or outbound notification flags set. The NTS accommodates multiple notification flags for both inbound and outbound queues that are processed on a FIFO basis and can be set by various network and application entities. An inbound notification is defined as alerting some entity to the fact that an RSN or tag has now appeared in a network. An outbound notification allows a stored command or action to be automatically sent to such an RSN or tag. The initiator of any inbound or outbound notification request is able to later cancel any request that they initiated.

If an inbound notification flag is set, the NTS either sends a predefined message to an EGW, or other entity, or takes other action such as initiating an email or user recorded voice message.

Additionally, if elected by a customer, the NTS initiates geofencing capabilities. In this case, the NTS examines GPS coordinates contained in the original message from the gateway controller. If the coordinates are different from the last set of coordinates received, and the geofencing option is active, the NTS will send a predefined message to the EGW which, in turn, will send a notification to a customer purchased GFA. The GFA will examine the received GPS coordinates and determine what, if any, appropriate actions should be taken. Notably, the NTS is only involved in forwarding location changes and does not participate in any application level logic related to the RSN's location or to geofencing.

If an outbound notification flag is set, the NTS forwards the standard message request to the current gateway controller the RSN is associated with for forwarding to the particular RSN. The RSN then acts upon the standard request in a normal fashion. The queued message could be, for example, a C-NMS request to forward certain stored parameters.

After the inbound or outbound notification request is received by the target entity, that entity sends an affirmative or negative acknowledgment in response. The NTS clears the Notification Flag if an affirmative acknowledgment is received.

Returning to the main process, the NLS forwards, to the gateway controller, the AAA-generated token along with routing information, including primary and back-up IP addresses, e.g., IP addresses for EGWs, stored at the NLS in a routing table associated with the particular RSN. Different routes may exist for different class and/or message types as well as for different potential applications and servers. For example, based upon a gateway controller's country code or a device's class or a communication's message type, a different EGW may be specified. Each EGW, in turn, may re-direct a communication to a specific customer-specified application or address.

At this point, the gateway controller sends a connection acknowledgement message to the RSN to stop the RSN from initiating any message retries.

Once the originating gateway controller receives the routing information, this information is stored in its temporary routing table associated with the particular RSN.

The gateway controller uses this routing information to determine an appropriate EGW to use for communication of the particular RSN's "presence", and then forwards a message containing this presence information to the determined EGW. Notably, the actual transfer of information does not "go through" any MMR system. Instead, this message, as well as the AAA generated token, is communicated directly from the gateway controller to the EGW.

If communication of this message fails, and following appropriate retries, the gateway controller attempts to communicate the message utilizing the back-up IP address from the routing information.

If attempts utilizing the back-up IP address fail as well, the gateway controller will forward a failed EGW link message to the NAS, which will store this information for post-incident statistical analysis. Personnel of the managing entity are also able to access these records through a query of the NAS.

If, on the other hand, communication of the message to an EGW is successful, the receiving EGW examines the message, and, based upon a message type and class of the message, and the country code of the transmitting gateway controller, routes the message to an appropriate application. In addition to providing this routing functionality, the EGW translates the RSN's UID to a customer-specified device addressing scheme.

After the gateway controller has forwarded the message to the EGW, it creates an EDR and sends the EDR to the EDR Server. The gateway controller may also send an EDR to the EGW if the customer has requested this feature, and the stored routing information is set up accordingly.

The appropriate application which receives the message may comprise a HOST or other target application. If the application is configured to provide an acknowledgment, then such an application level acknowledgment is generated and sent to the EGW. Notably, in the context of a registration request as described in this exemplary scenario, the target application may make a determination as to whether to allow registration of the RSN, and provide either a positive or negative acknowledgment.

Upon receipt of an application level acknowledgement, the EGW translates a customer device address to the corresponding RSN UID, generates and sets an appropriate message type, and forwards such an acknowledgment message to the gateway controller.

Upon receipt of this acknowledgment, the gateway controller delivers the acknowledgment to the particular RSN, i.e., communicates the acknowledgment from the gateway server of the gateway controller to the RSN through one or more nodes as described hereinabove. Further, the gateway controller creates an EDR and sends this EDR to the EDRS.

Upon receipt of this acknowledgment, the particular RSN may, depending on its internal profile, (and particularly when not in the context of registration) generate a return confirmation acknowledgment message to send back to the EGW, via the gateway controller, which, in turn, would forward it to the appropriate application. If the particular RSN does generate a return confirmation acknowledgement message, the gateway controller will send a corresponding EDR to the EDRS upon forwarding the return confirmation acknowledgment message on.

Later, if the particular RSN transmits another message, the gateway controller is able to determine an inbound route based upon the routing information stored in its routing table, and use the same token if it has not expired.

Detailed Description

MMR System—Exemplary Outbound Message Flow
(Customer Application to RSN)

As a forward, it is notable that authorization and authentication occurs at two levels. At a customer application level, an EGW contains policies that authorize and authenticates users and applications accessing the MMR system. Once so authorized, the MMR system will not attempt to authenticate any individual users within a customer's organization or restrict certain types of messages that are generated by specific customer applications. From the MMR system perspective, any valid API command that emanates from an EGW will be processed.

At the MMR system, all authorization and authentication activities are preferably controlled by the AAA server that validates customers or a managing entity employee and their access to all network components.

An outbound message to an RSN can be initiated by an EGW, or from a HOST, C-NMS, C-RPM, HHAA, or GFA application traversing through the EGW, assuming that the message has the proper authorization to do so. Functional subsystems within an MMR system, such as the T-NMS, can also initiate a message to an RSN. For this discussion, it will be assumed that a customer's application HOST has initiated the outbound message.

A gateway controller can also initiate an outbound message to an RSN that is located within its Area domain. This function, for example, could be part of a local "ping" or "Are you still there" dialogue that is beyond the scope of this scenario. (As an aside, if an RSN responds to this type of message, the inbound processing sequence as described above may or may not be followed.)

When a HOST wishes to communicate a message to an RSN, it sends a request to an EGW. The EGW checks its policies to validate the request. Assuming that the request is an authorized and valid request, the EGW translates a customer device address associated with the RSN to a UID based on a stored registration table. The EGW also utilizes this table to determine a home NLS associated with the RSN corresponding to the UID, i.e., the particular RSN.

The EGW sends an RSN route request message to the NLS determined to be the home NLS for the particular RSN.

If the NLS the route request message is sent to is the home NLS for the particular RSN, then the NLS will check an internal mode table for the RSN to determine if it can proceed with message routing. If not, the appropriate response messages will be generated and routing activities may cease.

If, on the other hand, the NLS the route request message is sent to is not the home NLS for the particular RSN, that NLS sends a message to the RRSS to verify that the UID is valid and requests an address of a current home NLS of the particular RSN. Assuming the UID is valid, the RRSS responds with such address. The NLS that initiated the RRSS query forwards this address to the EGW which, in turn, updates its internal routing table and reinitiates the process. Notably, this technique will allow for the orderly re-distribution of RSNs to new NLSs as the system grows.

Once the proper home NLS is located, and upon receipt by this home NLS of a route request message, the home NLS sends a token request, including an identification of the EGW as a target EGW, to the AAA Server. Such a token will be used for an EGW to RSN transaction. Assuming proper credentials, the AAA Server creates such a token based upon the stored encryption key for the target EGW. The AAA server sends the token to the NLS, which in turn forwards the token to the EGW.

The NLS then examines a stored routing table to determine an appropriate gateway controller to contact to attempt to deliver the message to the particular RSN. This table is a Last In First Out (LIFO) table having a defined number of entries, each entry corresponding to a gateway controller through which communication with the particular RSN recently occurred. Using this table, the NLS determines a first gateway controller to contact, and sends a query message to this first gateway controller. The queried gateway controller determines if the RSN is present in the radio network it oversees, as described hereinabove, and returns either an affirmative response or a negative acknowledgment.

If the gateway controller cannot communicate with the RSN, it sends a negative acknowledgment (NAK) message back to the NLS. Based upon the returned message type, the NLS may set the Outbound Notification Flag in its associated Notification Server or it may report the RSN's unknown presence to the EGW for resolution by the EGW.

If the first determined gateway controller returns a NAK, the NLS attempts to determine, using the LIFO table, a second, "next oldest" gateway controller to query. Additionally, if a "default" gateway controller was manually determined and entered during registration of the RSN, a query is sent to this default gateway controller as well.

Upon receiving a query, if a gateway controller determines that the particular RSN is present, the gateway controller sends an affirmative response back to the NLS, and additionally creates and sends an EDR to the EDRS, indicating success or failure in locating the RSN.

The NLS, in turn, responds by sending the token received from the AAA server to the gateway controller.

The NLS also sends a message indicating it has found the particular RSN to the initiating EGW, along with the address of the gateway controller that indicated the particular RSN was present in its radio network. The EGW then sends an outbound message received from the HOST directly to the gateway controller that indicated the particular RSN was present.

Upon receipt, the gateway controller attempts to deliver the message to the particular RSN, i.e., attempts to communicate the message from the gateway server of the gateway controller to the RSN through one or more nodes as described hereinabove. The gateway controller also creates and sends an EDR to the EDRS, indicating success or failure in delivering the message to the particular RSN.

Any response to the message, from the RSN, will be treated as an inbound message as described hereinabove. This approach accommodates asymmetrical routing, as a response can be directed to an address that is different from the address of the HOST.

Detailed Description

MMR System—Registration, Activation, and Initiation Process

The following scenario assumes that: a customer has supplied to the managing entity the default and back-up IP addresses for EGW routing and their passwords for use by the AAA server; the managing entity has established a customer profile in the RSN Registration Status Server (RRSS), which process includes the assigning of a default NLS and NTS server, and involves identifying the customer to all other network entities so that they can process messages from the new customer; the managing entity notifies the customer when RSNs are shipped, with the notification including a list of UIDs for all shipped RSNs; the managing entity enters the RSN UIDs into the RSN Registration Server (RRSS) and changes the status for each device to Registered, Enabled, and Not Configured; the managing entity establishes home NLSs for the RSNs when customer data is first entered into the system; the RRSS propagates the new registration information to the NLS and NTS and sends a message to the Billing and Return Logistics Server (BRLS) and Billing System (TBS) indicating that the particular RSN is now ready for configuration; the RRSS sends the RSN UID to the appropriate EGW, and the EGW will then forward the RSN UID to the C-TPM to alert the system that a configuration profile needs to be created for this device; the customer, through the C-TPM, creates a profile for the RSN and assigns a customer device ID number (of their liking and for their internal use) that corresponds to the RSN's UID (note that another method will exist that will allow the assignment of a profile to a device in the field when they are deployed through the use of the Handheld Access Application (HHAA); this method is not described in this scenario.); the RSN UID-to-Customer ID number mapping is forwarded to the EGW when the RSN profile has been properly created; the EGW sends a Token Request to the AAA Server to allow it to access internal MMR systems with registration information, and the AAA Server examines the request and sends a validation message to the RRSS to match the RSN UID with the customer; the RRSS responds to the AAA Server that there is a customer ID and RSN UID match, and all RSN Modes are OK to proceed, and the AAA Server responds to the EGW with a Token and sends the same Token to RRSS, BRLS, TBS, NLS, NTS, and TBS; and the EGW forwards registration data to the components listed above, each responding with an acknowledgement (note that the customer-assigned, device identification information is stored for reference only and is not used inside the MMR system.).

When the RSN is first deployed and enters into a coverage area, it will forward a default configuration request message to the gateway controller.

The local-area gateway controller will forward the configuration request message to the NLS following the previously described inbound message process.

The NLS will check to see if the notification flag has been set by querying the NTS, which, in turn, will check to see if a Device Configuration Profile has been created for the device. It will then respond to the NLS appropriately.

The NLS will notify the various systems of the configuration request that will each update their device status tables accordingly. Assuming that a profile has been created, the NLS will forward this information (status) and appropriate EGW information to the gateway controller, which, in turn, will forward the configuration request to the EGW.

The EGW will then forward the request to the appropriate C-TPM. The C-TPM will send the profile to the EGW for the target RSN. The EGW will send the profile to the gateway controller following the outbound message delivery protocol outlined above. The gateway controller will send the profile to the RSN. The RSN will acknowledge profile reception to the gateway controller.

The Profile reception acknowledgement will be propagated back to all necessary subsystems including C-TPM (details of propagation have been omitted for brevity at this time).

The EGW will propagate RSN availability to all customer applications (details omitted at this time). The EGW will notify CSAS of RSN availability. The CSAS will notify all other MMR system and initiate usage billing in the TBS.

In addition to that disclosed herein, further disclosure regarding MMR systems is set forth in Appendix H, incorporated herein by reference.

Detailed Description

Customer Control of Device Operation in a Shared Network Environment

In accordance with one or more preferred embodiments of the present invention, an MMR system will allow for the simultaneous use of a network by many independent customers. In at least some preferred implementations, fees will be charged to customers or their agents for the use of such a network using a number of billing options. To gain access to the network, each device (e.g. an RSN) must first be registered with the MMR system, as described hereinabove. This process is performed on an individual or group basis, and is partially controlled by the managing entity and partially controlled by each customer or their agent. During the registration process, a number of system variables and device operational modes and behaviors are specified to meet customer needs.

Billing arrangements for the shared network access and usage service preferably fall into three broad categories, including flat rate monthly billing per device, usage based billing, and on-demand alert message billing. Other billing arrangements may be offered based upon market demand. Preferably, an authorized user is able to suspend or curtail billing of each or all RSNs anytime without the involvement of any person or entity overseeing the network. This arrangement will allow customers to either manually or automatically reduce their periodic billing charges during periods in which they do not anticipate any usage of selected ones of their RSNs. It is believed that this feature is quite attractive to customers whose need for and use of a shared network will vary during different times of the year or during "non-incident" periods.

In at least some preferred implementations, authorized/authenticated users are provided with access to the MMR system's billing and registration server. Such a user is able to, on an individual or group-wide basis, suspend or reduce the periodic billing arrangement for particular RSNs. The level of reduction, perhaps to zero, or the change in billing or operational mode will have been previously jointly established by the managing entity and the customer. The user will be able to enable or disable the reduced billing feature at any time, and will be able to specify both a start time and date and an end time and date for the reduced period to be in effect. Independent of the end time setting, the system preferably will revert to normal billing automatically based upon certain triggering events. This revertive triggering capability eliminates the need for the user to "remember" to reinitiate normal billing that has been suspended by their manual intervention. Preferably, revertive billing is triggered based on:

1. The detection of the presence of a device at a new location (indicating that it has been moved from its previously stored or last known location).

2. The activation of a device by placing it in-service by the changing value of an internal or external sensor (example, the enabling of an RSN through an on-site PDA based application).

3. The automatic triggering of an alarm associated with a sensor (example, shock or motion detection of an asset that is expected to be dormant).

4. The changing of an operational mode of one or multiple RSNs by a host application or user (example, the mass mode change of all units from the Inactive mode to the Active mode).

In each of the above cases, when the triggering event or condition occurs, the associated RSN will trap the time and date of the occurrence and when connected to the shared network will transmit a message accordingly. Upon receipt, the MMR system will revert to standard billing either at the time of the receipt of the message or, perhaps, based on a time at which the triggering event took place. In either case, the action will be recorded within the billing system and, at the user's option, results in an email or other automated notification message being sent to a user specified application or person. In addition to that disclosed herein, further disclosure regarding customer control of device operations is set forth in Appendix F, incorporated herein by reference.

Detailed Description

Mobile Gateways and Merging

Figure 26:
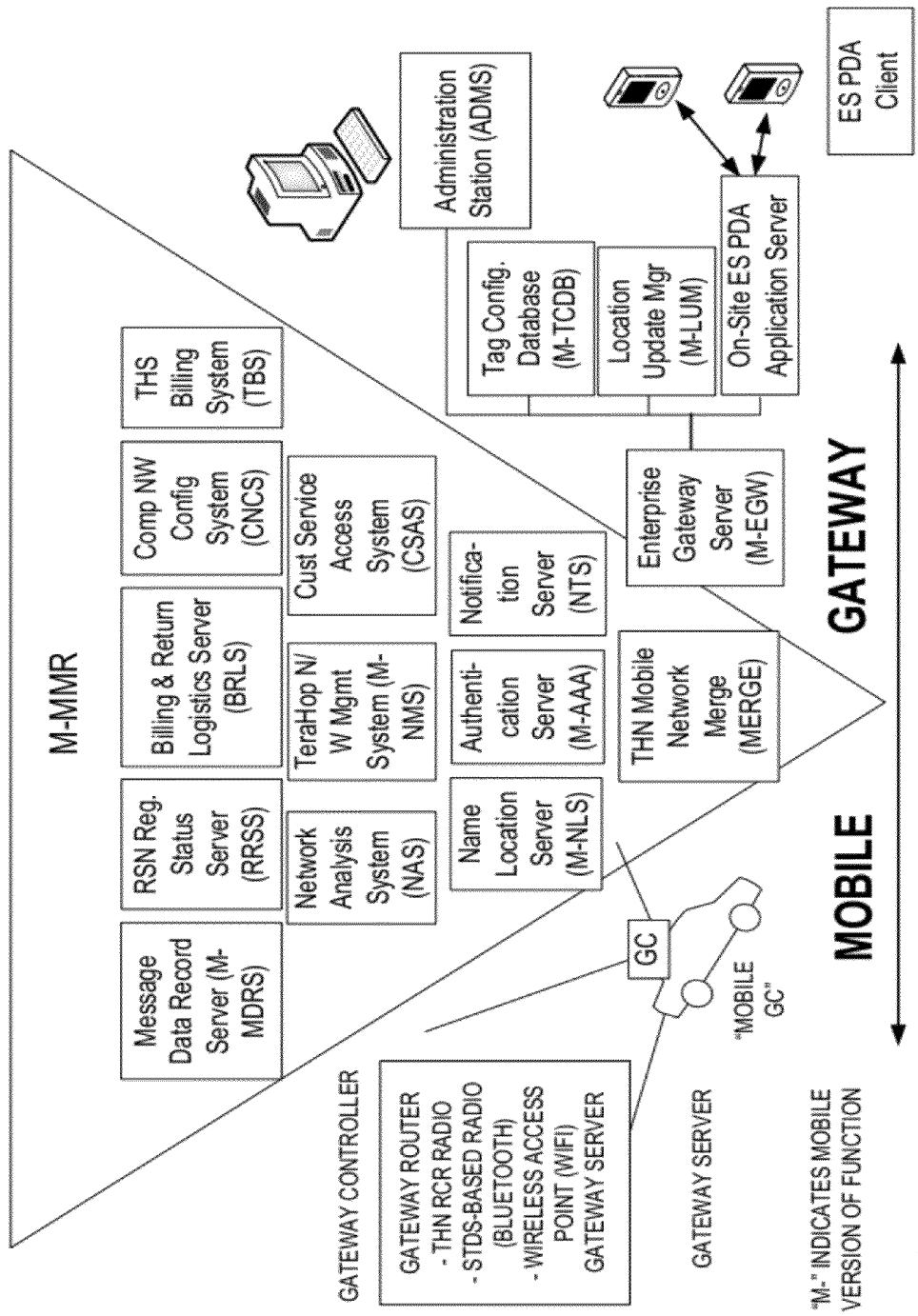
FIG. 26 is a detailed reference model illustrating logical subsystems of an exemplary mobile MMR system implementation in accordance with a preferred embodiment of the present invention.

Although MMR systems have thus far been described in the context of a "global" MMR system acting as an intermediary between a plurality of islands and user applications, in an alternative, preferred embodiments of the present invention, and in the preferred first-responder implementation, an MMR system is implemented in association with a single gateway controller as a "mobile gateway" (Although described as a mobile gateway, functionality described in the context of a mobile gateway could well be implemented fixed in place.) Such a mobile gateway preferably includes a collapsed MMR system as described hereinabove, and thus includes some selected MMR system functionality, although alternatively a mobile gateway may include all MMR system functionality. A mobile gateway further includes one or more customer applications, and a mobile EGW for interfacing with the one or more customer applications. In at least some preferred embodiments a hand held application server is further included for communication with nearby hand held devices, e.g., PDAs. FIG. 26 illustrates the components of an exemplary mobile gateway, including the mobile gateway controller, mobile MMR system, and an on-site PDA application server.

Thus far, radio networks have been described as distinct, in that each radio network is associated with a single gateway controller. However, gateway controllers do not have to be fixed, instead, a gateway controller can be mobile, such as, for example, a gateway controller mounted to a vehicle, e.g., as part of a mobile gateway. Mobile gateways which move from one place to another at times become located in close proximity to one another. In a preferred embodiment, when two mobile gateways become located such that coverage areas of their respective gateway controllers overlap, a determination is made as to whether to "merge" the two mobile gateways. Such merging requires both that the radio networks associated with the gateway controllers merge such that an RSN is able to connect to either gateway controller and still have messages routed to an appropriate customer application, and additionally that customer applications of each mobile gateway be able to communicate with one another.

Preferably, a mobile gateway includes a gateway controller which comprises an RCR, a standards based radio, more preferably Bluetooth, a WLAN standards based radio, more preferably WiFi, and a gateway server. The RCR and standards based radio are used for communication between RSNs, while the WLAN standards based radio is used for communication between gateways, gateway servers, mobile MMR systems, application servers, and application mobile computers.

A high-level methodology for merging two mobile gateways is now described hereinbelow in the context of mobile gateways utilizing Bluetooth and WiFi.

First, mobile gateways are constantly monitoring a WiFi network for other mobile gateways.

When two mobile gateways initially detect each other, they pass information about themselves to each other, including information on if they are allowed to merge together. Assuming they are allowed to merge, the mobile gateways interconnect their gateway controllers and MMR systems (e.g., mobile MMR systems) such that an RSN could communicate through either gateway controller and have their information routed to the appropriate functions within the mobile MMR system and the customer applications. Notably, once two mobile gateways connect via WiFi, they continue to communicate with each other so they can sense if they lose wireless connectivity.

If a mobile gateway loses WiFi connectivity with another mobile gateway, it return its connections to the pre-merge situation within its mobile gateway and alerts applications, through its EGW, that connectivity was lost (this is referred to as un-merging). The mobile gateways remember this prior connection so that if the same two mobile gateways re-connect at a later time, they can quickly return their connections to the prior merge configuration.

When multiple mobile gateways are merged together at the network level, the mobile gateways send the network merge information to their local applications.

The local applications can decide if they want to merge at the application level and in many cases, which application is the controlling, or "master" application for possible RSN behavior changes or other tag data exchanges.

Although there will typically be one master application per RSN, the RSN information can be routed to multiple applications running simultaneously, thereby allowing the best management of RSNs in the larger coverage area.

From an application perspective, one of the mobile gateways will become the master gateway/application and the decision on which mobile gateway becomes the master is controlled by the customer application.

Notably, a mobile gateway can be in a different area (i.e., not within WiFi coverage), yet still be connected to other mobile gateways and applications through a Wireless Wide Area Network (WWAN) such as cellular or Satellite.

Figure 27:
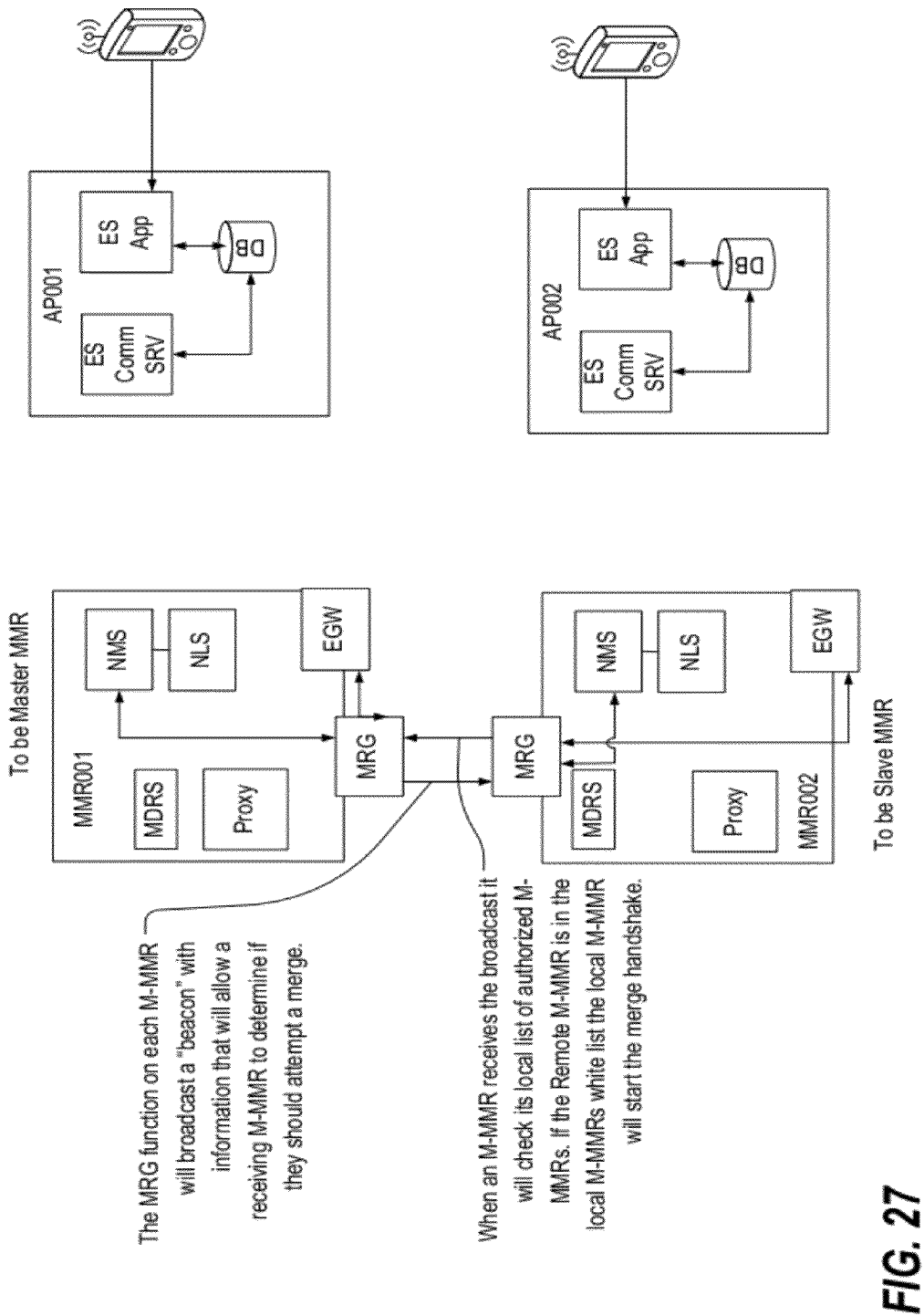
FIGS. 27-31 illustrate a preferred merging methodology in accordance with a preferred embodiment of the present invention.

In a more detailed, preferred merging methodology, a mobile MMR system of a mobile gateway broadcasts a beacon with information allowing a receiving mobile MMR system of another mobile gateway to determine if it should attempt to merge. The receiving mobile MMR system receives the broadcast and checks a stored list of authorized mobile MMR systems to determine if the broadcasting mobile MMR system is in a "white list" of mobile MMR systems it is allowed to merge with. If the remote mobile MMR system is in the white list, the local mobile MMR system starts a merging "handshake", as can be seen in FIG. 27.

Figure 28:
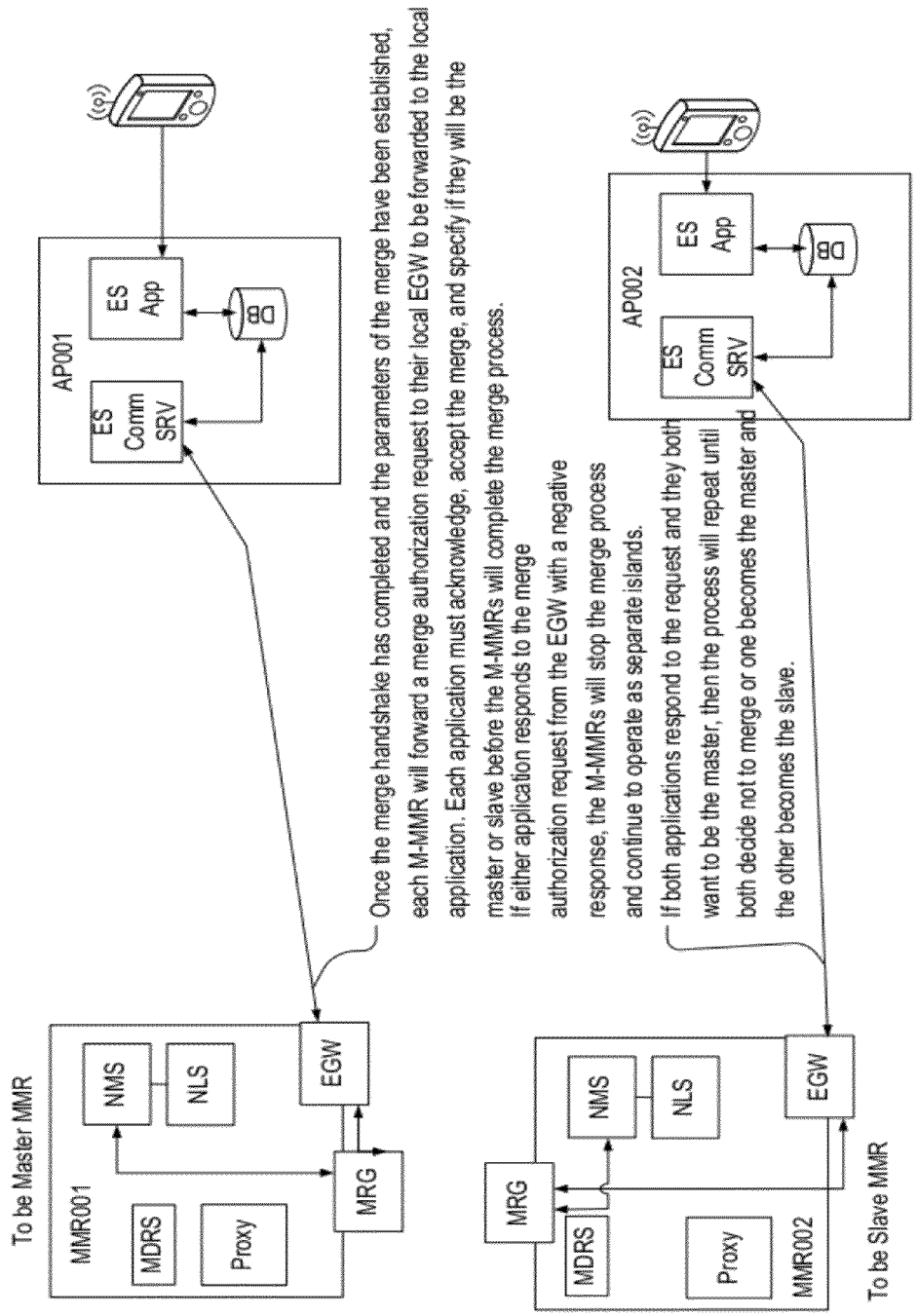
Figure 30:
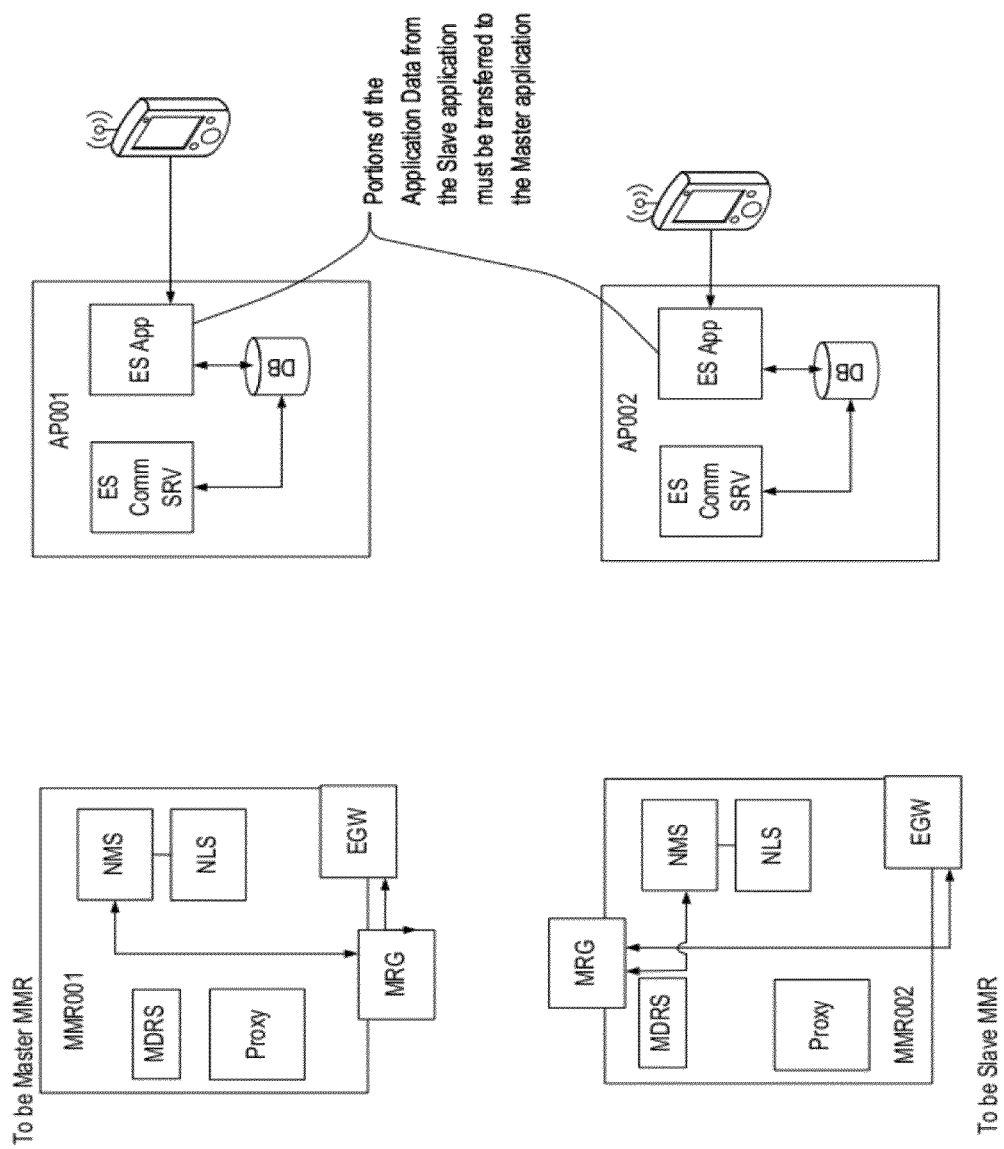

Upon completion of this merging handshake, each mobile MMR system forwards a merge authorization request to a local EGW to be forwarded to a local application, as can be seen in FIG. 28. Each local application must acknowledge, accept the merge, and specify whether it will be a master or slave before the merging process is completed. If either application responds negatively, the merge process will terminate. If both applications respond to the request specifying that they should be the master, then the process will repeat. The process repeats until one of the applications decides not to merge, or one application elects to become a master mobile MMR system and the other elects to become a slave mobile MMR system. At this time, portions of application data from the slave application are transferred to the master application, as illustrated in FIG. 30.

Figure 29:
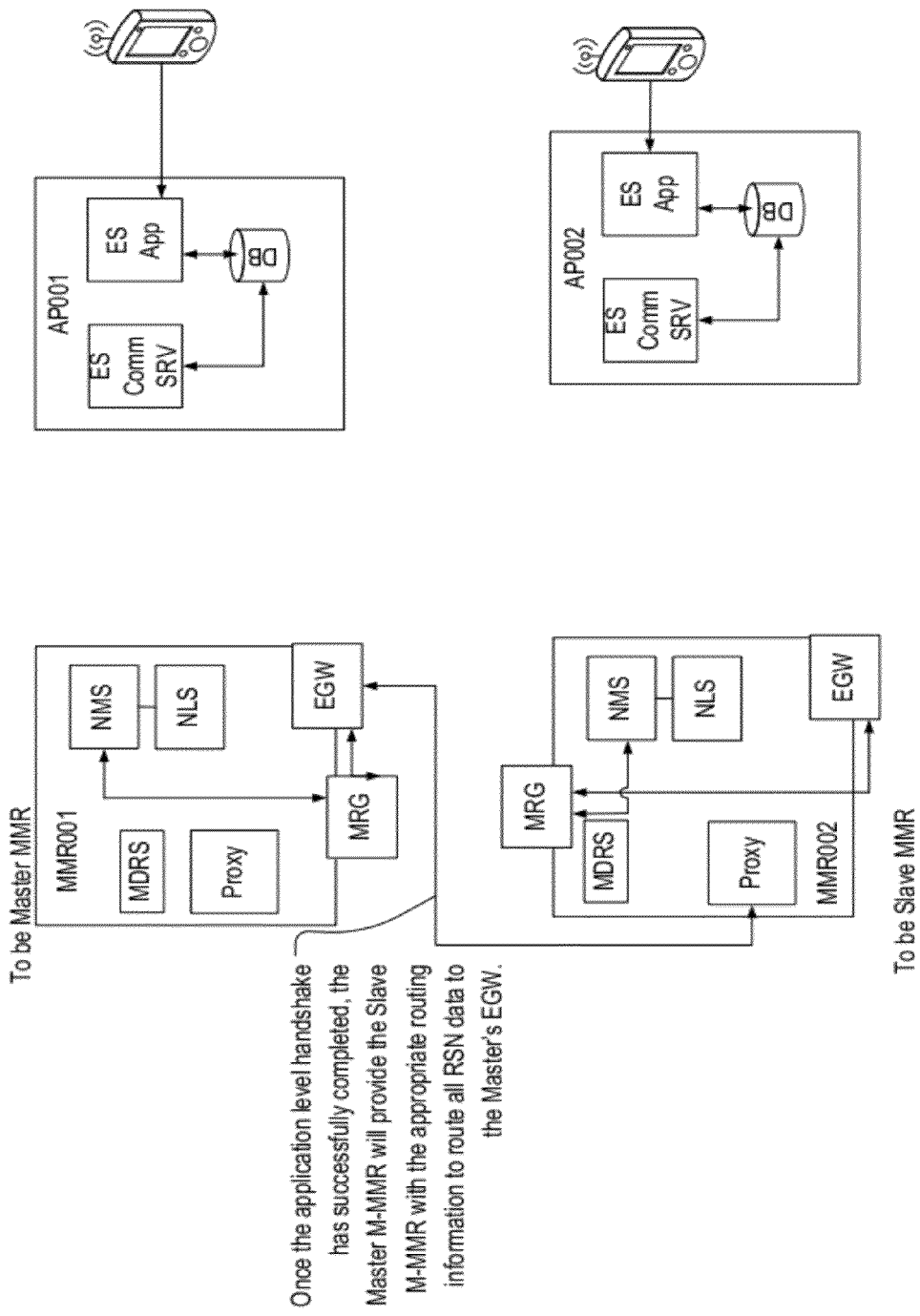
Figure 31:
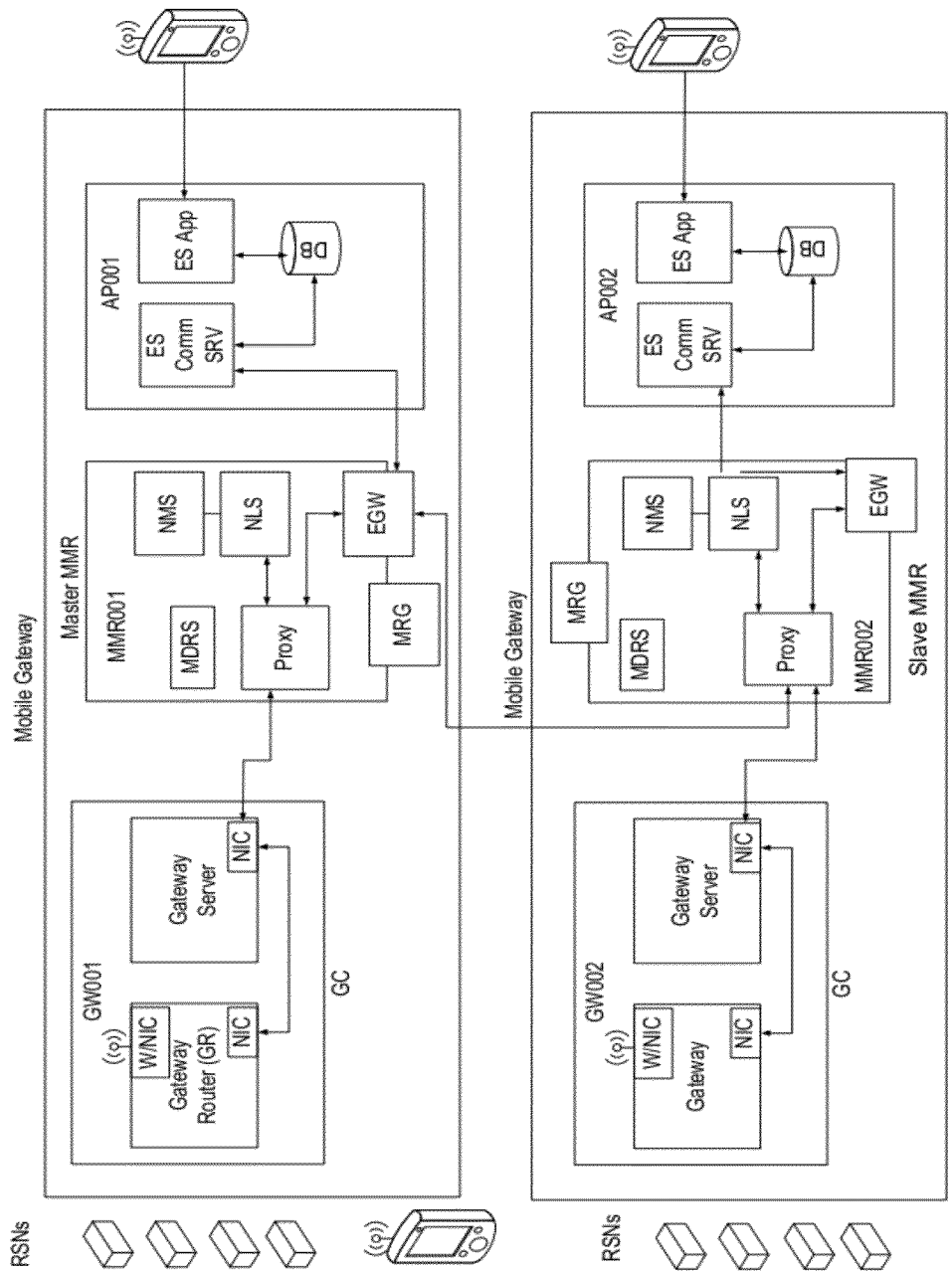

Once this application level handshake has completed, the master mobile MMR system will provide the slave mobile MMR system with information necessary for the slave mobile MMR system to route RSN data to the EGW associated with the master mobile MMR system, as illustrated in FIG. 29. Notably, however, the gateway server of the gateway controller of the slave mobile MMR system's mobile gateway still routes registration requests to its local NLS, and the local NLS provides routing and security information to the local GS and remote EGW, i.e., the EGW associated with the master mobile MMR system, as illustrated in FIG. 31. All other events are then routed from the local gateway server through a proxy to the remote EGW.

Detailed Description

Merging Alternatives

It will be appreciated that one or more possible implementations of merging have thus been described. However, additional other merging possibilities are contemplated as well in accordance with one or more preferred embodiments of the present invention in the preferred first-responder context. The merging of gateway controllers can be accomplished by having one or more gateway controllers function simply as gateways. However, in systems including one or more islands, e.g., radio networks, an MMR system, and customer applications, the merging of each of these elements can be accomplished independently and in combination with merging of each other element. This merging can include, or not, merging of customer applications such that a master application and slave applications are elected, merging of radio networks such that a gateway controller functions merely as a gateway (notably, this is not required for radio networks to merge, as described hereinabove), and/or merging of MMR systems, such that a master MMR system (which may comprise a mobile MMR system) and a slave MMR system (which may comprise a mobile MMR system) are elected.

In addition to that disclosed herein, further disclosure regarding merging and un-merging of radio networks is set forth in Appendix C, incorporated herein by reference.

Detailed Description

First Responder Implementation

As noted hereinabove, in a first responder implementation a system comprises RSNs, which are worn by first responders, such as firefighters, radio network hardware including gateways, gateway servers, gateway controllers, and mobile gateways, customer applications for tracking the RSNs and other radio network hardware, and user devices, such as PDAs and laptop computers. In addition to that disclosed herein, further disclosure explicitly regarding first responder implementations is set forth in Appendices B and K, incorporated herein by reference.

Detailed Description

First Responder Implementation—RSNs

The RSNs preferably generally correspond in size to a cigarette pack, weigh about four ounces, and are powered by an internal power source, e.g., one or more batteries. When used by personnel, RSNs are preferably worn (by clip, pouch, or pocket). In addition to being utilized with personnel, RSNs can be associated with, and attached to, either permanently or temporarily, equipment or assets of interest, such as a police cruiser. Preferably, backup RSNs are kept in a vehicle for use at an incident if required.

A 1-to-1 correspondence of RSN to asset is made with a customer software application communicating with the RSN via radio network infrastructure. An preferably includes fully enclosed antennas for communication with radio network infrastructure. Further, each RSN preferably includes an internal clock that is automatically updated/synchronized when the RSN encounters radio network infrastructure.

Identification and descriptive data about the asset an RSN is attached to is stored within the RSN and may also be stored in a remote database. For example, personnel, e.g., firefighters, are permanently assigned a particular RSN having a particular UID, which RSN contains information stored in a memory therein regarding that personnel, such as, for example, profile data including a name, badge number, assignment, agency qualifications, etc. A customer application can subsequently read this data when a given RSN is in communication with network infrastructure.

It will be appreciated from the above description that each RSN is capable of detecting radio network infrastructure and deciding whether to communicate with that infrastructure as part of that network.

Further, each RSN is accurately termed a remote sensor node in that each RSN is preferably capable of detecting motion, vibration, and shock, and sensing whether motion, vibration, or shock exceeds certain pre-set conditions, or whether a magnetic reed switch changes state. More preferably, each RSN is capable of sensing Shock (mechanical), Vibration, Motion, No-motion (absence of motion), Magnetic switch state-change, Temperature, Gas concentrations, Radiation, Wind speed & direction, Biometrics (e.g., respiration & heart-rate), Geographic position (e.g., GPS), Humidity and moisture, Atmospheric pressure, Battery condition (of RSNs), and the passing of a sensor threshold.

Further, RSNs may communicate with external/separate sensors, either by electro-mechanical connection directly to the RSN (e.g., a "sled") or wirelessly. External sensors may be mounted anywhere, so long as they can communicate with an RSN. Data from these external sensors are treated the same as data from an RSN's internal sensors.

RSN sensors can be configured to indicate stress of an asset they are attached to (e.g., an unconscious person). For example, for a firefighter a lack of motion may indicate such stress and a sensed no-motion condition may be indicative thereof. On the other hand, for a law enforcement officer, a mechanical shock (slap) of an RSN that is sensed could be indicative of stress. Such sensor and/or sensor profiles can be configured to become active only when an assets has been assigned a dangerous task, e.g., venturing inside a burning building. A customer application is used to record an assignment of an asset, which causes a command to be sent to the associated RSN to engage an appropriate configuration profile for that asset. In the case of a firefighter entering a burning building, this would cause the no-motion sensing capability to tune on, to await a potential no-motion condition.

Each RSN is capable of storing/recording (buffering) data related to what it detects and communicating those data to customer applications, via radio network infrastructure, as described hereinabove. Moreover, each RSN preferably appends date/time stamps to all recorded events that it detects and appends a date/time stamp to all communications.

Each RSN is preferably capable of changing its behavior per sensed conditions (using its suite of sensors) and/or per detected events. The changes are in what events it reports and in the manner with which it interacts with other RSNs and with network infrastructure, including: a check-in frequency, sensor thresholds & conditions, message hopping behavior, a network class identifier, which may comprise a Class ID, and whether to engage certain sensors.

These changes may be triggered by commands that originate from a customer application or from the network infrastructure, or they may be autonomous. The changes may be triggered by a combination of: date/time, a type-signature signal from network infrastructure, a location of the infrastructure, a location of the RSN, a status of the RSN, a functional mode that the RSN may be in at the time, sensor inputs, and/or a battery level.

Such changes may be implemented using operational parameter sets or behavioral profiles. Preferably, each RSN maintains a profile comprising one or more operational parameter sets that include such information as sensor thresholds for triggering an event. A particular operational parameter set is preferably implemented as a function of location, assignment, or common/class designation.

As described hereinabove, a radio network can be configured to cause RSNs attached thereto to send quasi-periodical check-in messages to indicate to the radio network that the RSN is still present. The radio network preferably knows when to expect such messages. If a certain number of these messages are not received within some defined period, then the infrastructure preferably sends a message to a customer application that the asset associated with the RSN that failed to check-in is unaccounted for.

Detailed Description

First Responder Implementation—Breadcrumbs and Motes

Radio networks rely on data links between RSNs and a gateway server in order to assure up-to-date presence monitoring and timely distress alerting. Hopping of messages among responders' RSNs can minimize lost contact by relaying messages from crews deep in an interior to those who may be near an entry, then to a gateway server of a gateway controller. However, in some situations, e.g., large multi-story buildings, it is possible that there will be coverage gaps and RSNs will not be connected to a gateway server, e.g., a gateway controller mounted on a fire engine.

To obviate this issue, RSN "breadcrumbs" can be used which serve to extend a coverage area of a radio network. It will be appreciated that RSNs themselves serve to accomplish this, and thus an RSN itself can be characterized as an RSN breadcrumb. Preferably, however, such a breadcrumb additionally is usable as a path marker of the route by which a person entered a building. In this capacity, the breadcrumb would have audible (e.g., a siren) and visual (e.g., a strobe)

features to assist first responders in the event that an area is dark and/or smoke-filled. At some point after penetrating a building, the person simply drops such devices along the way, or hangs them from doorknobs, light fixtures utilizing a strap that is preferably included. It will be understood that the RSN of the breadcrumb relays other RSNs' messages as needed, automatically. Since RSNs are always on, this feature would be always on, obviating the need for a responder to have to remember to turn it on. The visual beacon—powered by a supplemental, high-capacity battery—is preferably activated by a switch on the device, or alternatively by a command sent via RF by the IC. Similarly, the audible feature is preferably activated by a command sent by the IC. The audible feature may be a simple evacuation siren.

In a preferred implementation, breadcrumbs comprise RSNs mated to a rugged and high temperature rated housing, with a marker beacon, a high-volume audible alert, and a high-capacity battery. By command via a customer application, the beacon and alert may be used for orientation and guiding, both entering a building and for retreat, and to broadcast an evacuation warning. After an incident, the beacon and alert may be used to locate and retrieve the device itself.

A breadcrumb which includes audible and visual features is preferably referred to as a breadcrumb, while a breadcrumb that does not include these audible and visual features is preferably referred to as a mote.

A mote (and in at least some implementations breadcrumbs as well) preferably includes a carrying case that has a shoulder strap. The carrying case is preferably a COTS item, such as a case for pocket digital cameras. Such cases are typically available from big-box retailers for $10, have an adjustable strap, and have Velcro closures. A mote preferably is an orderable item that comes packaged with a suitable carrying case. A mote may be pre-configured to serve as a mote. Motes are configurable with customer data.

Breadcrumbs preferably comprise an RSN, differing only from RSNs as specifically noted. The RSN is preferably configurable and its software/firmware update-able in a manner consistent that described hereinabove. The RSN is preferably enclosed and oriented to maximize RF range. The preferably RSN is be depot-replaceable via a hatch having a seal to maintain housing integrity. The hatch is held closed with tamper-resistant fasteners (e.g., Torx screws).

Except as noted elsewhere herein, breadcrumbs (including an installed supplemental battery) preferably meet the environmental and mechanical specifications of an RSN. Those specifications include (but are not limited to): Operating temperature range, Chemical (fluid & vapor) resistance, Dust & dirt resistance, Drop survivability, Shock survivability, Thermal shock survivability, Water, moisture, salt water, steam intrusion/damage. A breadcrumb preferably survives shoulder-strap release from a height of 3' onto a concrete floor w/o damage to integrity or functionality. A breadcrumb preferably meets appropriate fire-safety-related requirements (e.g., HazLoc & Factory Mutual, for spark suppression when a battery is replaced).

A breadcrumb preferably fits within a dimensional envelope of 6"×6"×6" and has no protrusions that may be damaged or snag. Breadcrumbs preferably include recessed switches and lights, or alternatively, switches and lights with protective shoulder/ribs. Breadcrumb corners are preferably rounded or chamfered. In at least some implementations, a breadcrumb incorporates shock-absorbing features (e.g., bumpers on the exterior). A breadcrumb may be weighted and/or shaped for biasing towards a particular orientation upon being dropped.

A breadcrumb preferably weighs less than six pounds, including its supplemental battery.

A housing of the breadcrumb preferably is formed so as to shed water. For example, DuPont Zytel may be used. Preferably, any fasteners used to hold the housing together are tamper-resistant, such as, for example, Torx screws. The housing is preferably fluorescent green having labels and markings to identify it. The housing preferably includes an indicator of the RSN of the breadcrumb's UID, and, more preferably, this indicator comprises a barcode.

A breadcrumb preferably has a reflective stripe around its circumference to aid visual discovery. This stripe may be an applied tape, consistent with environmental, mechanical, and RF requirements. However, such a tape is configured to avoid noticeable fraying due to ordinary use. In lieu of a stripe, the housing materials may have reflective materials embedded therein.

A breadcrumb preferably includes a location strobe/beacon that can be activated/deactivated by a command from a customer application, routed by the RSN. The location strobe preferably also has a mechanical on-off switch, which preferably is: Waterproof; Located on an outside surface consistent with ease of finding and use; Large enough to be found and activated in darkness and with a gloved hand; protected from accidental damage and from pooling water (i.e., if in a recess, then that recess probably cannot be on the top of the housing); and Robust enough to withstand abusive manipulation without failure. The strobe/beacon preferably has a strobe rate consistent with breadcrumb size and battery-life constraints. The strobe may be pulsed for enhanced noticeability, in which case the rate is preferably ~1 blink/sec. Strobe/beacon shall have 360° visibility (in horizontal plane). There may be more than 1 strobe bulb per breadcrumb. Notably, a breadcrumb switch is preferably capable of deactivating a location strobe even if it was activated by remote command (e.g., by a customer application).

A breadcrumb preferably includes an evacuation strobe/beacon that can be activated/deactivated by a command from a customer application. The strobe/beacon preferably has a strobe rate is consistent with size and battery life constraints. The strobe may be pulsed for enhanced noticeability at a rate approximately double the rate of the location strobe. The strobe/beacon preferably has 360° visibility in a horizontal plane. There may be more than 1 strobe bulb per breadcrumb. An evacuation strobe may be in a single housing or single-bulb configuration with the location strobe. Preferably, when an evacuation strobe is activated, the location strobe is deactivated. Preferably, when the evacuation strobe is automatically deactivated, if the location strobe was previously on, then the location strobe is automatically re-activated.

A breadcrumb further preferably includes a siren/alarm projector that can be activated/deactivated by command from a customer application, routed by the RSN. The SPL of the siren/alarm preferably is a minimum of 95 dB at 1 meter, when the breadcrumb is in its preferred orientation on a concrete floor.

A breadcrumb preferably includes a supplemental battery for powering the strobes and siren. This battery preferably is: field-replaceable, preferably via a hatch, which seals to maintain integrity even when field-opened and closed, be of a type and configuration that is consistent with the environmental, mechanical, safety, and performance requirements of the Breadcrumb, be rechargeable while in the Breadcrumb, provided the connection and the act of re-charging are consistent with the environmental, mechanical, safety, and performance requirements of the Breadcrumb, Breadcrumb/battery shall included features to meet safety requirements (e.g., spark suppression) as specified elsewhere herein.

A breadcrumb preferably includes a battery-test feature that enables a user to manually check whether a supplemental battery has adequate charge. Preferably, this feature utilizes a momentary push-button switch and 3 LEDs to indicate battery charge: full (2 green), 50% (1 green), 10% (red). Regardless how implemented, all elements of this feature are preferably waterproof and either protected or inherently resistant to impact damage. RSNs preferably monitor battery level of the supplemental battery and report 2 levels: low-battery and critical low-battery. These levels shall be reported to a PDA application for display as a popup alert, similar to those displayed for RSNs (assuming a breadcrumb is connected to a radio network, and a PDA is in an active incident).

A breadcrumb is preferably configured to make use of a supplemental battery of a breadcrumb by preferentially routing messages to breadcrumbs over other RSNs.

Detailed Description

First Responder Implementation—Infrastructure

In addition to RSNs, the system includes radio network infrastructure to effect formation of radio networks utilizing the RSNs. Gateways, gateway controllers, and mobile gateways, as described hereinabove, can be utilized at various fixed sites, such as hospitals, fire houses, or precinct stations, and mounted on mobile vehicles, such as fire trucks or police cruisers, to facilitate formation of radio networks utilizing the RSNs. Preferably, mobile gateways are mounted on mobile vehicles to facilitate the formation of radio networks with nearby RSNs, and to allow radio networks, gateway controllers, and/or mobile MMR systems which come into close proximity with one another to merge together as described hereinabove.

Further, in at least some implementations, a power conditioner is utilized. A power conditioner is a small piece of electronic equipment that is used to minimize noise and voltage surges coming from a vehicle's electrical system that could damage a vehicle-mounted mobile gateway or disrupt its operation. Depending on the quality of the power generated by the vehicle's electrical system, a power conditioner may not be required.

For non-mobile gateways and gateway controllers, a power supply is preferably used. A power supply is a small piece of electronic equipment that converts line power (e.g., 110 VAC) to the power used by gateways and gateway controllers (12 VDC).

Detailed Description

First Responder Implementation—Customer Applications and Devices

The system preferably further includes one or more customer applications configured to respond to sensor data (as detailed hereinbelow) received from the RSNs and/or configured to issue commands to the RSNs. Such customer applications are preferably run on one or more customer devices, such as PDAs or laptop computers.

Depending on management preference, all or some of the data collected by RSNs of a radio network can be displayed and commands (to RSNs) given via a customer application. For example, when a distress message is received from a first RSN, thus suggesting the distress of an asset the first RSN is attached to, hop-path data, i.e., path information, of the distress message is preferably analyzed to determine a second RSN that was the first RSN to hop the distress message, thereby localizing the position of the asset in distress.

RSN data can also be stored at other locations, such as at district or mobile command centers. Stored data can be used later for analysis and process improvement.

For example, when a gateway controller equipped vehicle returns to its station, all data in the gateway controller's EDR memory is automatically uploaded via Wi-Fi link to a fixed gateway controller at the station. The fixed gateway controller then relays the data via broadband data link to an EDR Archive Server located at the Dispatch Center. Once the Archive Server acknowledges receipt of all EDRs from that gateway controller, the Archive Server will then send a message to the fixed gateway controller to flush/purge its EDR file. The fixed gateway controller then sends a flush/purge message to the vehicle gateway controller. Since it is likely that on-scene GC interconnectivity will vary during an incident (i.e., the Command GC will not be able to coordinate all EDRs of a given incident, at every moment), it is likely that multiple copies of the same EDR will be generated and uploaded to the Archive Server. The Archive Server, therefore, periodically reviews all EDRs and purges duplicates. The data of each incident and/or multiple incidents is analyzed later for ways to improve performance. The incident-management application software segregates set-up-and-configuration from operations. This separation permits only authorized/qualified people to set system parameters, such as ping (or PAR) and no-movement alarm intervals. It also prevents others, even ICs, from accidentally changing critical parameters and disabling the system when at an incident (when seconds lost trying to re-establish functionality can mean life or death). All communications are secured by Class ID and encryption. Access to command and control functions is limited to those who have login credentials for customer devices, e.g., various PDAs and laptops, running software such as, for example, AIMSonScene.

As described above, each RSN interacts with radio network infrastructure such that the following information is available to users via a customer application: a presence of the RSN (and the asset to which it is attached) at a specific location defined by the network infrastructure at that location, when the RSN arrived at that location, when an RSN was last heard from at that location, that an RSN failed to check in, descriptive information about the asset the RSN is associated with, and sensor data or status sensed by the RSN.

In a first-responder user application, the identity of an arriving asset is automatically populated into a user asset-management application, enabling the user to see a corresponding ID and act on it (make an assignment) immediately. This ID data corresponds to a UID stored within the RSN and reported when the RSN connects to the network, although it may comprise a customer identifier translated via an EGW. Such customer applications can also be used to display changes in asset state or condition (e.g., distress), as reported by associated RSNs.

In a first responder application, the user asset-management application can also serve to deny/allow an asset to be included in the record-keeping and asset-management activities facilitated by the user asset-management application (i.e., participate in an incident). The user application may also be used to force a given RSN to disconnect from the local network.

The system also preferably includes a user application that, in a first-responder application, may be used to display to a large audience the number and assignments of assets and keep those numbers and assignments updated as they change, as a user manipulates the asset-management application on a separate user device.

To enable a user to view a graphical representation of where assets are when called out to an incident, the system preferably also includes a feed to commonly-available Geographic Information System (GIS) and some Automatic Vehicle Locating (AVL) applications. The GIS/AVL application resides on a customer device at a dispatch center (or elsewhere, such as in command vehicles or at mobile command centers) and is linked to gateway controllers using the same mobile data link that gateway controllers use for incident data. Via this link, the gateway controllers share their own ID (which may comprise, or corresponds to, an Area ID) and GPS data, as well as the IDs of resource RSNs that are in communication with each gateway controller. Using this data, the GIS/AVL application displays an accurate map of vehicle locations and, by clicking vehicle icons on the map, reveals what other resources are associated with that vehicle. This functionality is available while vehicles are in motion and stationary, provided their gateway controllers are on, and their gateway controllers have a reliable view of GPS satellites.

In a preferred embodiment, an AIMSonScene customer application is utilized. AIMSonScene is NIMS-compliant incident management software available from FieldSoft, Inc. of Chandler, Ariz. AIMS can be characterized as premier incident management software, having a full suite of incident management, reporting, and documentation tools, all manipulated in point-and-click fashion. The license is for the Peer-to-Peer (single user) version. In preferred implementations, AIMSonScene is loaded on one or more customer devices, such as a laptop or a Command Vehicle's pull-out work station computer.

In addition to computers and laptops, PDAs and PDA-like devices are preferably utilized as customer devices. A PDA is preferably equipped with a First Responder Incident Command System (ICS) application which provides basic asset awareness and distress alert capabilities to a user. Such PDAs preferably include a barcode scanner, and RSNs preferably include a barcode, representing a UID of the RSN, to be read by the barcode scanner.

In addition to that disclosed herein, further disclosure explicitly regarding automated identification of radio channels for interoperability connections is set forth in Appendix D, incorporated herein by reference.

Detailed Description

First Responder Implementation—Automated Identification for Interoperability

As described hereinabove, RSNs are capable of containing useful identification information associated with a user that is carrying the RSN. This information can include, but is not limited to, the person's name, position, agency or organization affiliation(s), qualifications, assignments, and radio channels used for voice communications. (In this description the term Radio Channel refers to the radio frequency or radio frequency pairs used for voice communications, the modulation technique, and all methods used to partition a radio channel such as (but not limited to) tone coded squelch, pre-amble unit identification signaling, and talk groups or other selective calling techniques.) All of the information listed (plus other information) is of interest to on-site Command Officers and their staff, such as, for example, Incident Commanders, Communications Officers and on-site radio and logistic coordinators. Some of this information is also of interest to centralized dispatch personnel and other off-site personnel tasked with managing and/or coordinating the incident in conjunction with the on-site incident command personnel. During incidents in which more than one group, subgroup, agency, or organization is involved, it is not uncommon for some or all of these groups to use voice radios operating on different frequencies or partitions so that intergroup communications is difficult or impossible. The ability to communicate across these disparate groups is referred to as "interoperability".

One or more preferred implementations provide a means to automatically identify what radio channels customers who are presently at an incident use, present this information to selected personnel, and facilitate, either manually or automatically, the interconnection of these radio channels into logical groups to provide interoperable voice communications. The actual interconnection of the voice and control signals between the various interoperable radio channels can be made through a variety of different techniques, and products available from a variety of different suppliers. Some of these techniques involve on-site systems while other techniques involve setting up interoperability networks remotely. These techniques are generically referred to as "cross-patches".

The operation of these preferred implementations involves the collection of radio channel data from individual RSNs as they appear at an incident along with other pertinent RSN stored information. This collection process occurs as a logical extension of RSN presence detection in radio networks as described hereinabove. The collected information is then summarized and made available to the appropriate field or dispatch personnel ("Operator)", who then identifies various groups of individuals or groups for interoperability affiliation. In a preferred implementation, the information is presented in a matrix form that allows the Operator to sort the data by any field of the collected data and then divide the users into logical groups. In another implementation, a specific Interoperability "Channel" is identified in a customer data field of each RSN and, when accumulated, displayed to the Operator. The Operator is either located on-site or is located at some central (dispatch) location. The accumulated information is either made available to the Operator through a customer application or through some other system that receives data through the system via some form of backbone communications. The degree of integration of the accumulated data with the underlying system that actually forms the interoperable voice and control signal (cross-patches) can vary and will be based on the capabilities of the cross-patch system. In its simplest form, a technician may view the accumulated information and manually wire the required radio channels together using patch cords. In other implementations, the person tasked with establishing the cross-patches may use some computer assisted systems to setup the patches.

With the automated accumulation of the interoperability data, preferred implementations provide for a cross-patch system that sets up interoperability channels automatically and then informs appropriate personnel of their availability. The interoperability channel connections remain intact, i.e., setup, until such time that the appropriate personnel disconnected, i.e., knocked down, either the entire interoperability schema or a specific channel that no longer was in use.

As the system senses the absence or presence of RSNs, and thus assets associated therewith, it updates the accumulated data, and when all users of a particular radio channel or group are no longer present or have been released by the Command Officer of other appropriate personnel, the Operator is notified and then decides whether to remove the cross-patch path between the radio channel whose users are no longer involved and the other radio channels that are still engaged in the interoperability network.

In an advanced implementation, RSNs are displayed on a Geographic Information System (GIS) as small icons. Using any one of a variety of techniques, a person observing the display ("Controller") determines assets represented by each display icon and can drill down to determine their affiliation or function. The Controller then groups similar users together to show one composite icon, or alternatively keeps the icons separate. The controller can select multiple icons using commonly used multi-select techniques such as control-clicking, right mouse key clicking, or encircling the icons, and then pressing a cross-patch function that automatically groups the display icons together.

This information is then used to form the data matrix described hereinabove, or, in a more advanced implementation, is used to actually set up the cross patched radio channels. As previously described, as the last of a common group of RSNs leaves an incident or are released by the Command Officer, the display brings the event to the attention of the Controller who decide whether to disconnect the cross-patch for the particular channel.

Conventionally, the determination of what channels to cross-patch (establish interoperable communications) is a manual process, or is a process that follows pre-determined standard operating procedures that do not rely on real time presence information. A person, either at a site or at remote dispatch center(s) must manually determine what radio channels should be interconnected. This process is error prone due and difficult to maintain due to ever-changing conditions and personnel associated with the incident. Preferred implementations automate the accumulation of the information and, based upon the extent of the integration with the actual cross-patching hardware and software, can automate the entire process. As assets leave an incident or are released, this departure information is automatically made available to the Operator and Controller who decide whether to remove the no-longer-used radio channels from the interoperability network.

Preferred implementations automate the manual process of attempting to identify which radio channels should be involved in an interoperability network. The inherently dynamic nature of accumulating RSN radio channel data as RSNs appear significantly speeds up the process of setting up common radio channels and can accommodate users from any organization without having to rely on inflexible, previously established interoperability listings.

Detailed Description

First Responder Implementation—Input/Output Enhancements

Computer Aided Dispatch Systems and Automated Call-Out Systems (CAD/CALL systems) are used by dispatch personnel to assign and request individuals and units (combinations of individuals) to respond to an event or incident. Although most commonly used by public safety agencies involved in fire/rescue and law enforcement activities, these systems are also used by non-public sector organizations as well. Other usage examples include the dispatching of field service personnel, news reporters, customer service personnel and other people and equipment that may be required on an "on call" basis. These systems, using a variety of manual, pre-planned, or automated techniques, determine who or what should be called ("dispatched") to respond to an event or incident. The actual contacting of the individual may be by voice radio, data dispatch, land line or cellular voice, paging, email or some other alerting technique including public broadcasting or area-wide sirens. The individuals that are called may be called individually or in groups. Each called person may respond directly to the "dispatch" by some means or may simply travel to a meeting point or incident as directed. In many instances, the calling party or system (referred to as "the Dispatcher" hereinbelow) may not receive positive or negative confirmation that the person actually received the dispatch request or has actually arrived at the prescribed location. The Dispatcher may have to rely on some other means to obtain positive or negative confirmation of each individual's presence (or lack thereof).

Similarly, on-site Command Officers or others tasked with coordinating the personnel or equipment that has been dispatched may not be aware of who/what was dispatched. Typically, the on-site Command Officers (or others) have to use some other means to determine who/what is at the incident. In many instances, the dispatched individuals "check-in" with the on-site Command Officers either in-person, by radio or phone, or with some other technique such as sign-in boards. In turn, Dispatchers commonly do not know who or what has arrived at an incident, much less when they actually arrived at the incident in response to their dispatch. Dispatchers and on-site Command Officers are commonly in a quandary as whether to request additional personnel/assets to respond or to simply wait for the original personnel/assets to respond.

In a preferred implementation utilizing radio networks, a CAD/CALL system is enhanced to download to an on-site Command Officer or a designated coordinator the names, units, or equipment that has been dispatched to provide the Command Officer with a-priori knowledge of who and what to expect to arrive at the scene. This information is downloaded to the Command Officer through the use of a backbone link from the CAD/CALL system to an ESS system that is either en route or already on site. Alternatively, the information is downloaded to an application that provides similar functionality to the ESS system that is used to monitor the presence and condition of assets in non-public safety applications. With the advanced knowledge of who/what has been dispatched, the Command Officer will be better equipped to manage the resources and activities that are or will be involved in the incident.

As resources arrive at the incident and radio network architecture associated with each resource is detected, this presence information is stored and/or transmitted back to the CAD/CALL system to confirm that the dispatched resources actually did arrive at the incident. Their arrival time, as automatically detected, is preferably also forwarded. Using this information, the CAD/CALL dispatch then determines if additional or alternative resources should be dispatched. The on-site stored information or the information transmitted back to the CAD/CALL system is also be used for post-incident analysis to determine when dispatched resources actually arrived. Preferably, the dispatched personnel responded to the dispatch with an estimated time of arrival, and this time is compared to the actual time and presence status of the personnel to determine if a commitment has been made, if an estimated interval until arrival has not been exceeded, or if the estimated interval until arrival has been exceeded, to help the Dispatcher make timely decisions.

Most CAD/CALL systems maintain a "call out" list of available resources. These lists may be static, pre-planned lists that, for example, assume that a resource is located at some pre-determined location (for example: a fire truck stationed at a fire station). For individuals, these systems may contain a call-out priority number listing. For example, between 10:00 PM and 7:00 AM, use the person's home phone number, and between 7:00 AM and 6:00 PM, use the person's work number. These listings may be manually updated either by the individual or dispatch personnel when they receive new information regarding the actual location of the asset. The CAD/CALL systems themselves may update the information if the asset has already been dispatched to another location. In all of these cases, there is no or very limited real time information regarding the actual whereabouts of the asset. To address this situation, gateway controllers are placed at locations where assets are commonly present. This information is then sent to the CAD/CALL system to provide a last known location update that is used in-place of the static, predetermined location information normally used by the dispatch algorithms. As an example, consider an ambulance, equipped with an RSN, parked at a hospital emergency room instead of at a fire station. If the hospital is equipped with a gateway controller, then the ambulance's presence is forwarded to the CAD/CALL system to provide more timely location information to enhance the system's dispatch logical choices.

In addition to that disclosed herein, further disclosure explicitly regarding input/output enhancements is set forth in Appendix G, incorporated herein by reference.

Detailed Description

First Responder Implementation—Using Hop-Path Information

One or more preferred systems in which nodes hop messages have been described hereinabove. Preferably, a record of the path a given message travels is stored, e.g., at a management element of a respective network. Such a record includes an identification of each node along the path, including an identification of the first node that handled the message after communication by the originating node. There is a strong likelihood that this first node is nearer to the originating node than are the other nodes along the path, although, due to the vagaries of radio propagation, this may not always be the case. However, as this first node often will be the nearest node to the originating node, and at other times will likely still be located generally proximate the originating node even if not the nearest to the originating node, it is advantageous in many applications to identify this first node.

In a preferred implementation, hop-path information is used in a first responder context to identify a first responder who is in a position to assist another first responder. More specifically, RSNs are uniquely assigned to first responders, and each first responder wears his or her assigned RSN. Each RSN is configured to originate a distress-alert message when it detects that the person to whom it is assigned might be incapacitated. When an RSN originates such a distress-alert message, the path along which the message traveled is recorded and stored. Preferably, the distress-alert message includes an identification of the originating RSN (and/or the person in distress), a type of the distress-alert, and hop-path information for the message (e.g., an identification of each RSN, and possibly each gateway as well, along the path). A user application, such as for example a first-responder software application available to an incident commander via a PDA, can read a record which stores this hop-path information, and thus identify one or more RSNs along the path. Preferably, the application identifies the first RSN that handled the node after the originating RSN. As each RSN is uniquely assigned to a first responder, the first responder associated with that first RSN can be identified, i.e., a likely closest responder. Preferably, the application is able to access information regarding the association of each RSN, and performs such identification of the likely closest responder. Once the likely first responder is identified, that person can be contacted, such as by the incident commander via voice radio or automatically by the application.

In addition to that disclosed herein, further disclosure regarding localization using hop-path information is set forth in Appendix H, incorporated herein by reference.

Detailed Description

First Responder Implementation—Using GPS Information

In one or more preferred embodiments, network elements, such as, for example, routers, gateways, and/or RSNs, have GPS capability, and GPS information is utilized, preferably in conjunction with hop-path information. Furthermore, records storing hop-path information also store an identification of a first gateway that collects a given message from an RSN network. A user application is configured to display a GPS-derived map of the geographical position of such first gateway. In the above example of an incident commander, this would be advantageous in providing a coarse geographical indicator of where a distressed first responder might be located, and, which other first responders might be located proximate the distressed first responder.

Detailed Description

First Responder Implementation—Personal Alert Safety System (PASS)

In a preferred implementation, first responders utilize Personal Alert Safety Systems (PASS), or RSNs implementing PASS functionality, that cause a distress-alert to be sent to an incident commander (e.g., via his PDA) at the same time that a local alert, i.e., an audible and visual indication that can be seen and/or heard by other persons in close proximity, is activated.

As noted hereinabove, RSNs are configurable devices. Similarly, PASSs utilized in preferred implementations are preferably configurable devices as well. Either configurable device preferably includes configuration profiles that can be selected based upon the activity a wearer is engaged in, or the task assignment a wearer has been given. These configuration profiles can further be selected based on both whether a distress-alert is engaged or disengaged, and whether a distress-alert is currently being actively originated from that device. Further, these devices are preferably configurable to select an amount of time which elapses between a distress event and notification of an incident commander. It is believed that such configuration will both help to obviate false alerts to incident commanders, and that it is more likely that an incident commander will be notified only after enough time has elapsed for nearby assistance to be rendered. Notably, however, this period must be short enough so that he will be notified soon enough that assistance he calls in will still be effective.

Detailed Description

First Responder Implementation—Pre-Assignment

In at least some preferred implementations, pre-assignment enables the association of specific individual assets to specific units prior to the commencement of an incident. Preferably, this pre-association data is automatically available for use by an IMS application when an incident is started, thus helping minimize an IC's burden of manually assigning people to units on-scene. Preferably, a "unit" is a group of people having a common designation (e.g., Engine 12) that is managed and assigned as that group. It usually includes a permanently associated vehicle for transport and executing assigned tasks. Who or what is part of a unit is established prior to and survives a given action or incident. A "team" is a group of people having a common designation (e.g., Rapid Intervention Team) that is managed and assigned as that team. However, a team usually does not include a permanently associated vehicle for transport and executing assigned tasks. Who or what is part of a team is usually established for a given action or incident and may not survive it.

One or more preferred implementations accommodate the managing of resources that may be from different entities, different entity types (e.g., fire, police, public works, etc.) and different asset types (units, teams, vehicles, people, etc.).

Conventionally, assignments are sometimes made using hook and loop fastener tags, as illustrated in FIG. 32. One or more preferred implementations may be designed or configured to mimic such assignments using hook and loop fastener tags.

Figure 33:
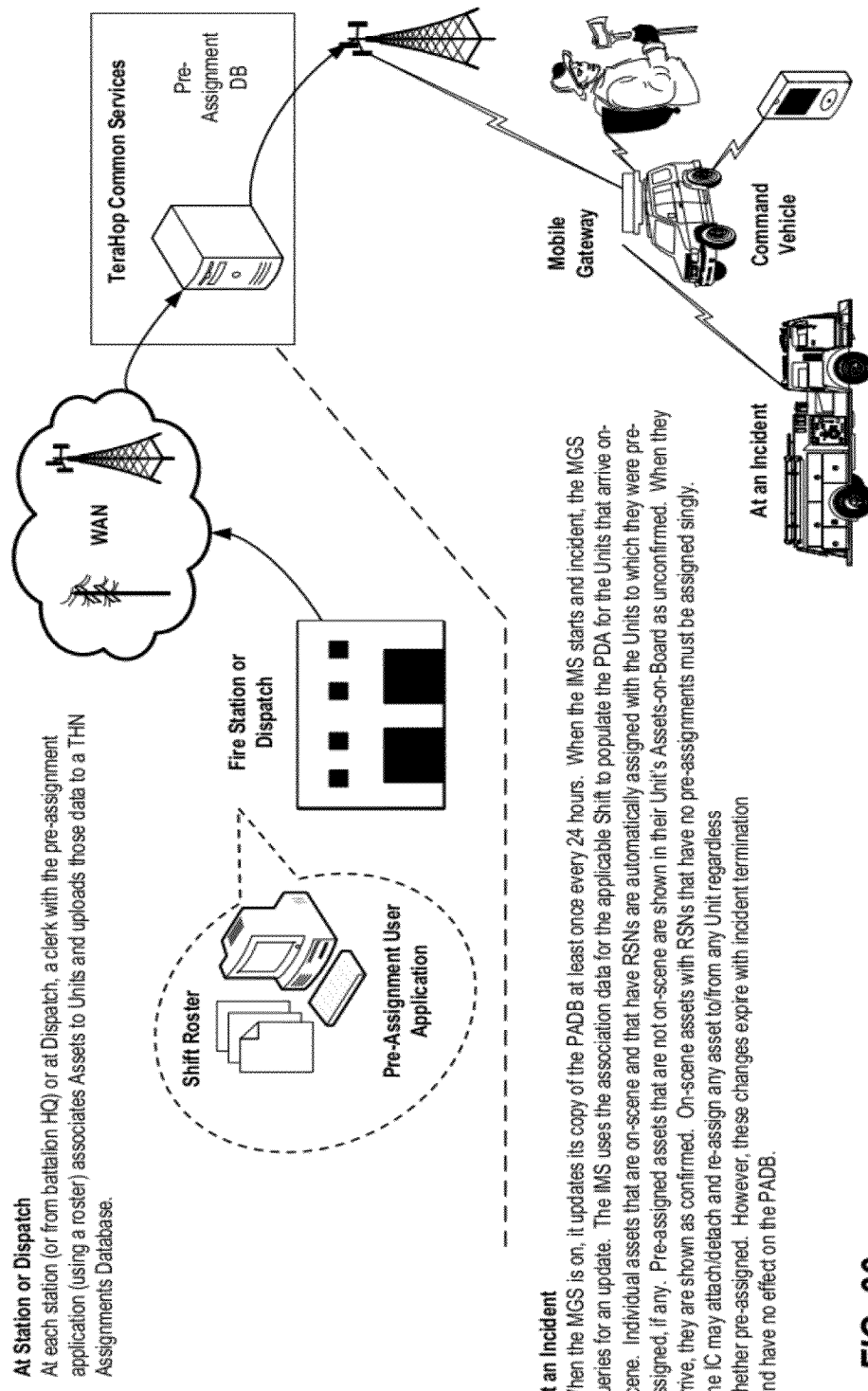
FIGS. 33-35 illustrate exemplary systems configured to utilize a pre-assignment methodology in accordance with a preferred embodiment of the present invention.

In a preferred implementation, a user, utilizing a pre-assignment application, can use a fire-agency-supplied roster of standing available assets/resources to create/store appropriate data about the standing available resources in a database (a master resource database, e.g., a PADB) for use with/by the pre-assignment application, across the entirety of a given agency. Preferably, this database also records to which station and shift each resource belongs. A designated user for each station, battalion, and/or the agency uses the pre-assignment application to associate individual assets to units per the schedule of assets and units assigned by station/agency authority for each shift. FIG. 33 illustrates an exemplary system which may utilize such process. FIGS. 36-63 illustrate exemplary screenshots for a pre-assignment application, and/ or a mobile application for use on a PDA or laptop.

To make pre-assignments for a given shift, a user selects a make/change function. This selection automatically triggers a query by the pre-assignment application to the database from MGSs retrieve pre-assignment data (e.g., a PADB), to retrieve the current set of assignments for the station and shift of interest. The pre-assignment application downloads this data, and the user works from/on this data in an isolated environment until satisfied. If no data is available from the PADB, then the user starts from scratch.

Figure 34:
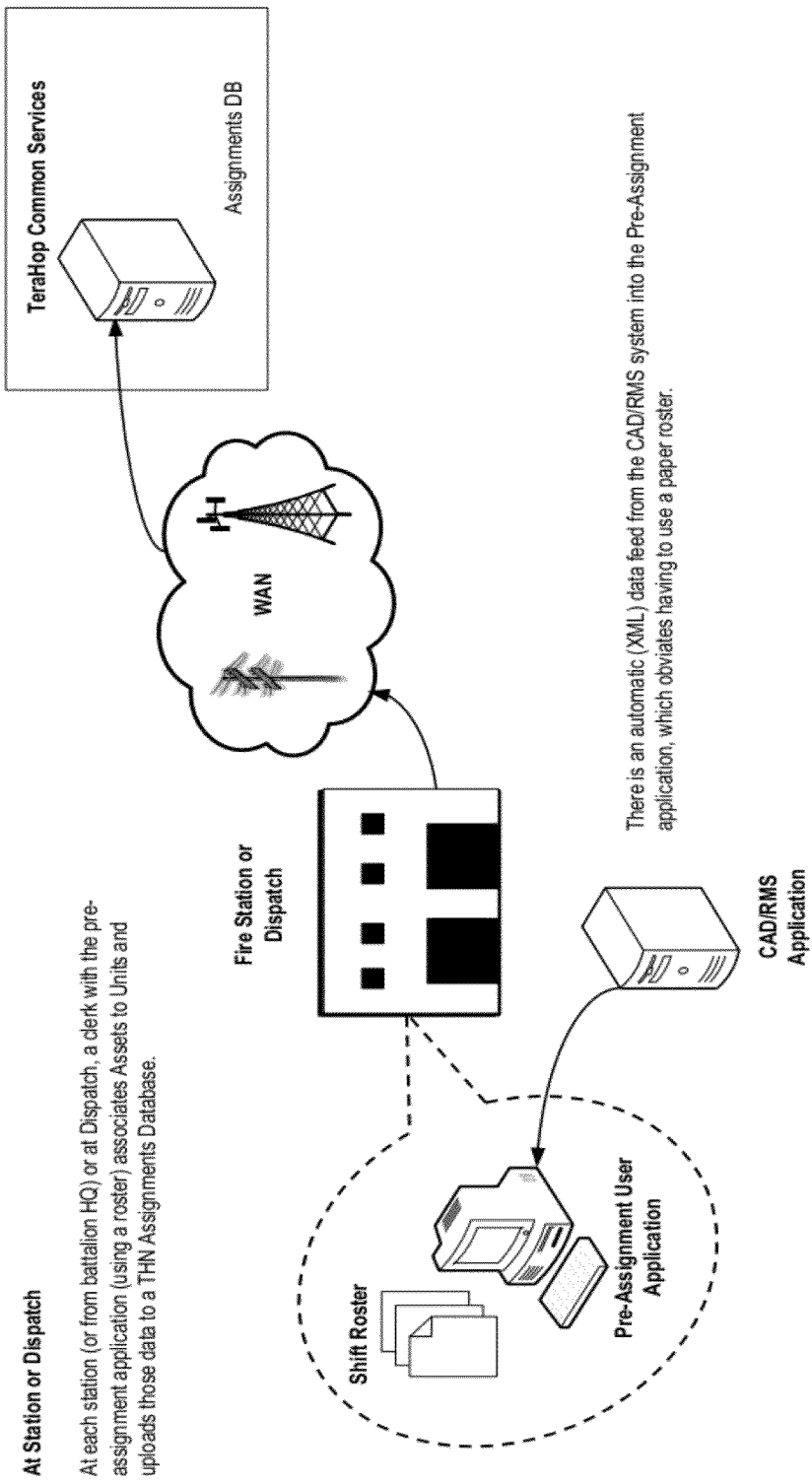

In at least some preferred implementations, an automatic data feed, such as, for example, an XML data feed, is utilized from a CAD/RMS system into a pre-assignment application, as illustrated in FIG. 34. Once the user is satisfied, using the pre-assignment application, these associations are conveyed to and stored in the PADB (which preferably resides on a server owned by a service-providing entity), overwriting the previous data. Preferably, this conveyance is made by either landline, cellular, or other wired or wireless data link. Each MGS maintains a copy of the PADB. Preferably, at scheduled times, and once at the start of each incident, this copy is updated (assuming connectivity can be established with the PADB). The best-available data from that copy is used by the IMS at active incidents.

In at least some preferred implementations, at the start of an incident, the MGS queries the PADB for pre-assignment data for only those units whose RSNs register with that MGS, and the copy of the PADB that is maintained by each MGS is updated via a cellular or other wireless data link between the MGS and the PADB.

At an event scene, as individual assets actually arrive (e.g., their RSNs register with the local MGS), in the IMS user application, they are automatically associated with the unit to which they were pre-assigned, as read from the PADB data.

The pre-assignment data retrieved from the PADB by each MGS is used by the IMS user application (as presented on a PDA or laptop) to automatically associate/organize the units, and those assets that were pre-associated with those units. In this way, the Incident Commander is relieved of the task of making those associations himself on-scene (and of needing to have any knowledge of them), thus enabling him to assign units to tasks and have the individual assets automatically track the units' assignments, yet the accountability of the individual assets is preserved.

At an event scene, the presentation of pre-assigned individual assets are distinguished on a resource manager's (IC's) user interface (PDA or laptop) as being confirmed or unconfirmed, as determined by the registration (actual arrival) of each asset's wireless reporting device (RSN) with the local wireless network established by the MGS. That is, an asset is a confirmed asset once it has arrived (as evidenced, for example, by registration of an RSN associated with a resource with an MGS).

In preferred implementations, one or more mobile gateways, such as, for example, an MGS on a Battalion Command Vehicle (BCV), will be present at an incident. Preferably, the MGS stores a local copy of the PADB, and, when the MGS is on, it updates its copy of the PADB at least once every 24 hours.

When an incident begins, the MGS queries for an update. The IMS uses the association data for the applicable shift to populate a user application on a PDA (or laptop) for the units that arrive on-scene. Individual assets that are on-scene and that have RSNs are automatically assigned with the units to which they were pre-assigned, if any. Pre-assigned assets that are not on-scene are shown in their unit's Assets-on-Board as unconfirmed. When they arrive, they are shown as confirmed. On-scene assets with RSNs that have no pre-assignments, must be assigned singly. An IC may attach/detach and re-assign any asset to/from any unit regardless of whether that asset was pre-assigned. Preferably, however, any such changes expire with incident termination and have no effect on the PADB.

Figure 35:
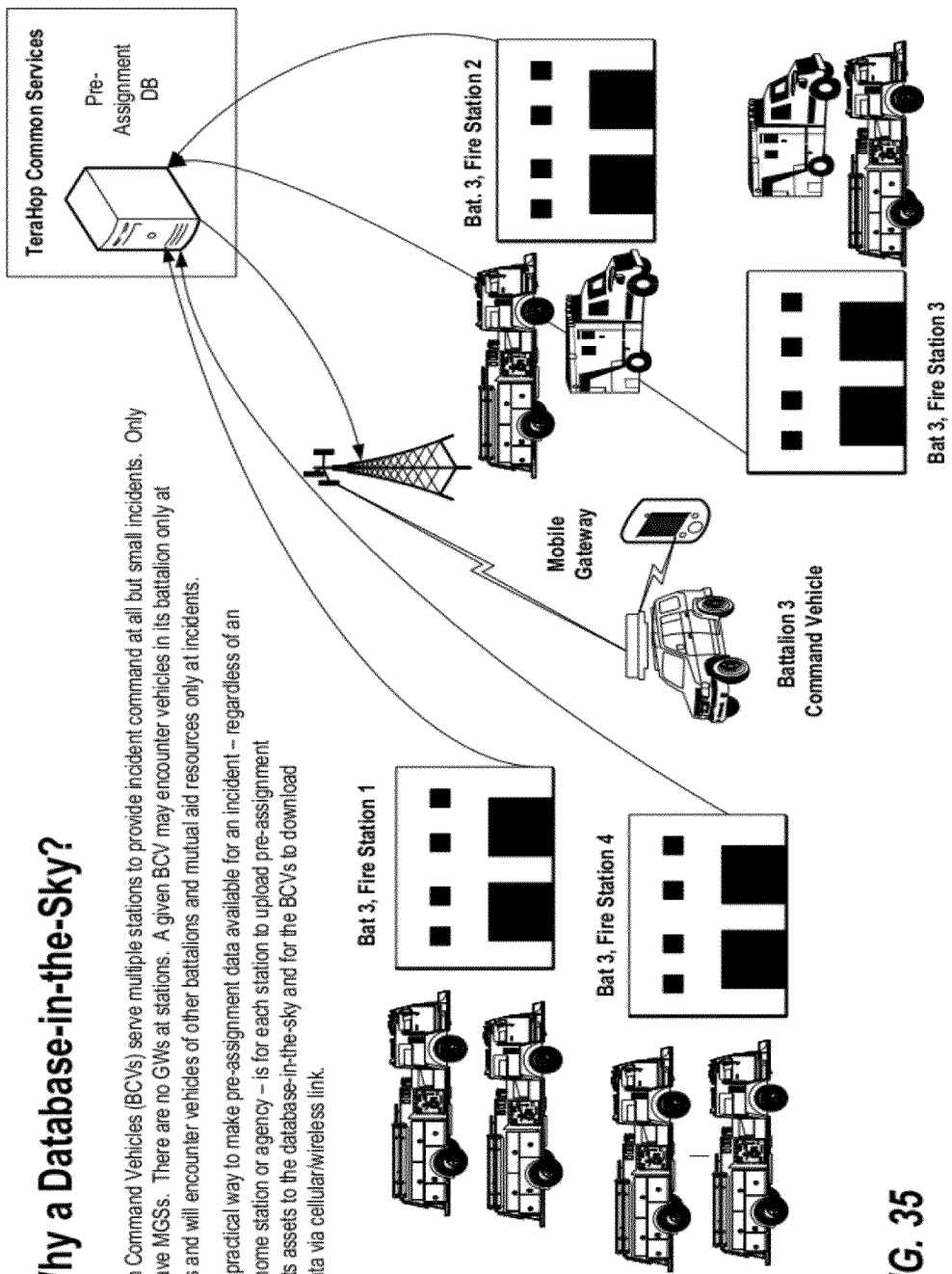

It will be appreciated that BCVs often serve multiple stations to provide incident command at all but small incidents. In at least some preferred implementations, such as, for example, the implementation illustrated in FIG. 35, only BCVs will have MGSs, and there will be no GWs at stations. A given BCV may encounter vehicles in its battalion only at incidents and will encounter vehicles of other battalions and mutual aid resources only at incidents.

In preferred implementations, to make pre-assignment data available for an incident—regardless of an asset's home station or agency—each station uploads pre-assignment data of its assets to a database-in-the-sky (e.g., a PADB), and MGSs download this data via cellular/wireless link In at least some preferred implementations, a system requires a cellular modem and service.

In one or more preferred implementations, drag-and-drop making of assignments are enabled, multi-station & multi-shift assignments are accommodated, auto shift synchronization is included, auto query & updates from database are included, auto DST synchronization is included, temporary shift assignments are accommodated, merging is accommodated, mutual aid is accommodated, assignments may be printed, assets may be added, transferred, or deleted, units may have either RSNs, MGSs, or a mix, assets may be auto-matched to units on scene, confirmed vs. unconfirmed assets may be distinguished, and/or plumbing for third party applications is included.

In one or more preferred implementations, a PADB is stored on one or more servers that may be located at a central point or that may be distributed among multiple physical servers at one or more locations, owned/operated by multiple separate entities.

In one or more preferred implementations, the dispatching of units may be communicated to the IMS such that the data presented to the Incident Commander indicates which units were dispatched.

In one or more preferred implementations, the actual arrival of units on-scene may be communicated back to the dispatching authority, along with data regarding the confirmed and unconfirmed pre-assigned assets.

In one or more preferred implementations, barcode-reading, RFID, and other wireless technologies may be employed to identify and enter asset and unit data into the pre-assignment user application to make associations between assets and units.

Systems, methods, and apparatus in accordance with one or more preferred implementations may be utilized by a service, agency, or asset with any combination and mix of other services, agencies, and asset types, including law enforcement, utility crews, medical teams, construction equipment, technical support teams, etc.

In one or more preferred implementations, association data that are entered into a pre-assignment user application, rather than being entered manually by a person using the pre-assignment user application, are entered automatically through a software linkage (e.g., API—Application Program Interface) between a system that is used specifically for assigning people/assets to groups and the pre-assignment user application.

In one or more preferred implementations, fixed gateways (as opposed to or in addition to MGSs) may be positioned around a given site and activated on those occasions when pre-assignment data are needed for managing incidents at that site (e.g., a nuclear power plant).

In one or more preferred implementations, a magnetic switch in an RSN is configured to allow a user to run an RSN associated with that user over a wall-mounted sensor at a station that corresponds to the user's assignment, which causes an association to be made. Additionally, or alternatively, the station may include a gateway, and an administrator may load assignments to appropriate vehicle gateways.

Detailed Description

First Responder Implementation—En-Route Pre-Assignment

In a preferred implementation, pre-assignment is supported en route to an incident. If a vehicle includes a gateway, and a mobile device such as a PDA or laptop with IMS software loaded thereon, a user on-board can utilize the mobile device to associate the assets on board to that unit. Via their RSNs, the presence of resources (including people and equipment) on board could be automatically presented on the mobile device, and the resources could be assigned to the unit. Preferably, when that unit arrives on scene, the IC would be immediately notified of the unit's arrival, and would automatically be provided a list of resources on board. Additional data regarding the unit or its resources could be queried with a single click.

In a preferred implementation, assignments, including en route pre-assignments, are possible via a barcode scanner. Preferably, a mobile device such as a PDA includes a barcode scanner, each resource is associated with an RSN which has a barcode thereon, and association of that RSN can be accomplished via scanning of the RSN's barcode. Alternatively, or additionally, RFID technology may be utilized.

In addition to that disclosed herein, further disclosure regarding pre-assignment of resources is set forth in Appendix N, incorporated herein by reference.

Detailed Description

First Responder Implementation—Exemplary Scenario

An exemplary scenario illustrating the use of a preferred system in the first responder implementation now is described. Notably, the following exemplary scenario will be understood as describing the merging of gateway controllers and customer applications, and could additionally include the merging of two or more MMR systems, but does not necessarily have to. Further, it will be understood from the description hereinabove that gateway controllers can be part of a mobile gateway, each mobile gateway additionally including a mobile MMR system as disclosed hereinabove. The following exemplary scenario will also be understood as describing gateway controllers, but in an alternative embodiment some or all described gateway controllers could be a part of a mobile gateway.

At 00:37 on a Saturday morning in late January, an automatic alarm is received by the Benson PSAP regarding a fire at a small storage warehouse located in one of Benson's industrial parks. Just seconds later, a single call is received by the Benson E-911 PSAP from a citizen returning from a late-shift job about a possible fire near that same location.

The E-911 Operator, via online records and a GIS system that maps the caller's and the automatic alarm's locations, can confirm that the incident is in an industrial park, that this industrial park has flammable liquids stored there, and that the park borders an interstate highway.

The E-911 Operator immediately connects provides this information to the Dispatch Center and connects the incoming call to the Dispatch Center. This information is additionally provided, via data link, to Benson's CAD system. The Dispatch Center, following SOP for the apparent magnitude of the fire, voice-dispatches police, fire fighting units (two pumpers and a ladder), and an on-duty Fire Commander, using a simu-select function on the Dispatcher's radio console. Given the time of day and day of week, the Dispatcher assumes that few if any civilians will be in danger, and that any first-aid treatment that may be needed can be handled by the fire fighting units; so, no EMS unit is dispatched.

The night-duty Sheriff's Dispatcher and the local Highway Patrol officer on duty hear the call-out, but they take no action. The first to arrive at the scene is a Benson Police cruiser that happened to be nearby on regular rounds. The one police officer of that cruiser reports his arrival to Dispatch and to his supervisor (via radio), confirms that there is a fire in the small warehouse, and establishes initial incident command. He also requests the presence of the Police Shift Supervisor. The Shift Supervisor responds on the Dispatch channel that she is responding, turns on her vehicle-mounted gateway controller (using her PDA), and immediately proceeds to the scene.

That gateway controller self-initializes and immediately logs the presence of the Shift Supervisor (via the RSN she is wearing). The activation of the gateway controller, the presence of the Shift Supervisor, and the GPS coordinates of her vehicle are relayed back to the Dispatch Center via cellular modem.

En route, the Police Shift Supervisor requests two additional Police patrol units, which she plans to use for traffic and perimeter control. When she arrives at the scene, an RSN attached to the police cruiser of the first police officer connects to her gateway controller, which automatically detects and logs the presence of the first police officer. Within a few minutes, the two additional Police units arrive. Their presence is also automatically detected and logged as RSNs associated with each connect to the gateway controller associated with the Police Shift Supervisor. All of the presence updates are automatically recorded as EDRs, are visible on the Shift Supervisor's PDA, and are relayed to the Dispatch Center. The Police Shift Supervisor is briefed, then assumes incident command. She then sends one of the police officers to secure the interstate highway. The remaining two are assigned to establish a perimeter.

A few minutes later, the two pumpers, each including a gateway controller, the ladder, and the Fire Commander's vehicle arrive together. The Fire Commander is accompanied by a Communications Officer (i.e., Command Technician). All three gateway controllers are turned on (en route, the Fire Commander turned on a gateway controller mounted to his vehicle using an AIMSonScene-equipped laptop).

Each of these gateway controllers, as well as the Police Shift Supervisor's gateway controller, automatically detect and recognize each other. The customer device associated with each, i.e., the Police Shift Supervisor's PDA, the Fire Commander's laptop, and PDAs of personnel of each pumper, prompt their users to confirm who will be incident commander (IC) going forward. A briefing conference among the four (including the then-IC) results in the Fire Commander being selected as the IC going forward. He uses his laptop to so indicate (and preferably each other user utilizes their PDA to indicate this as well), which results in his gateway controller being deemed the Command, i.e., master, gateway controller, and, preferably, the associated mobile MMR system being deemed the master mobile MMR system. The other customer devices, i.e., PDAs and laptops associated with the gateway controllers of the other vehicles display this event, those customer devices become view-only, the associated gateway controllers become slaved to the new Command gateway controller, as described hereinabove, and data is synchronized. All the units (gateway controllers) then on-site, Police and Fire, are displayed on all user devices, and all RSNs are logged.

Viewing his laptop, the IC sees at a glance what emergency services sector (ESS) resources are present and can query profile data (including identification information originally stored in each RSN and sensor acquired data) of any of those resources. Using point-and-click commands, he can log and track assignment of units and of individual personnel, corresponding to his actual (voice) commands.

As part of the initial detection of presence, gateway controllers have automatically downloaded the centrally-stored profiles of each ESS resource and compared each profile to the profile read from each resource's RSN by the gateway controllers. This comparison allows the IC (or other authorized users) to verify credentials and make changes to Class/group assignments, as needed.

The IC refers to his laptop, checks the resources on-site, makes an initial assessment of the situation, declares and notifies Dispatch that he has a Working Fire, makes his initial plan of attack, and begins to assign units (by voice/radio and on his laptop). Per his initial plan, the IC assigns the two pumpers to the A-Division (the IC's side or A-side of the building). Those vehicles are positioned accordingly, and the firefighters pile out of their vehicles and begin to unload their gear and pull hoses, as one pumper proceeds to a water source. The ladder is assigned to search and rescue, as well as ventilation. The IC has also determined that, as a precaution, another pumper is needed on the far side of the warehouse (C-side), and that he will need additional units for relief So, he has his Communications Officer call for an additional pumper and a ladder, directing that the additional pumper report to the C-side and the additional ladder to the A-side. He also decides that he will need more illumination than the vehicles provide, so he also has the Communications Officer call for a light unit. Dispatch has meanwhile filled out the working fire, full-alarm assignment by dispatching an EMS unit for rehab and standby, and a Safety Officer.

A few minutes later, the Safety Officer (SO) arrives and turns on his (Wi-Fi-equipped) PDA. The Command gateway controller automatically detects the presence of the SO and his PDA, reporting the SO's presence on the IC's laptop. The SO's presence is logged (and displayed at the Dispatch Center as a resource on-site), and the SO's PDA downloads from the Command gateway controller information regarding the presence of personnel and equipment then on-site. Like the other PDAs, the SO's PDA is updated as resources arrive, assignments are made, and alerts occur. (The SO was automatically dispatched to the scene when the IC declared that he had a Working Fire.)

The firefighters assigned to the A-Division begin to apply water to the building. The seat of the fire appears to be some distance in the interior. So, as the perimeter flames subside, a unit from the A-Division is assigned to attack the fire in the interior, and that unit enters the burning building. Using a customer application, AIMSonScene, the IC moves a unit label on his laptop's screen to indicate that they are assigned to the Interior Division and that they are a fire-attack unit (as opposed to some other task). An Interior assignment has been configured by the Benson FD as a hot-zone assignment. Consequently, the assignment of this unit to Interior (in the user application) has automatically caused the RSNs of the firefighters associated with that unit (one of the pumpers) to engage their no-motion sensors. These sensors automatically cause an alert to appear on all customer devices if any of those RSNs, and thus those firefighters, is stationary for more than 2 minutes. Such an alert could be indication of distress, affording the IC remote notification should a PASS device fail or not be heard, or if others nearby are unable to help. Meanwhile, the Command gateway controller has automatically been keeping track of the periodic check-ins of all RSNs, and has received check-ins from all that were logged in. Had any RSN failed to check in, an alert would have appeared on the IC's laptop (and on all other customer devices). Twenty minutes after the IC arrived, the warehouse manager arrives. He informs the IC that there had been two night-watchmen in the warehouse, and that he has not heard from them (on their private, on-site radio system). Since no one else is supposed to be in the building, the warehouse manager does not know whether the radio system has failed, the watchmen are disabled, or they are simply out of range. The IC immediately tells his Communications Officer to call for an additional EMS unit. Then, using his tactical fire radio channel, re-tasks the Interior Division unit to search for the night-watchmen. Using his laptop, he changes the unit's assignment to Rescue. A few minutes later, the third pumper arrives, on the C-side of the warehouse, out of sight. The gateway controller mounted on this third pumper is turned on. The third pumper's gateway controller merges with the Command gateway controller, the RSNs of the firefighters on that pumper are logged in, and the IC notes the unit's arrival on his laptop. Using his laptop, he calls up the asset data (stored in the RSNs) of the firefighters onboard and notes that two of the firefighters on the third pumper have hazmat qualifications. The IC assigns this unit to hosing down the far-side interior of the building, to help cool the structure and minimize the risk of the fire's spreading to the flammable liquids he suspects are stored on the adjacent property.

The fire has been burning for almost an hour, and the crews of the first two pumpers have been in action for about 30 minutes and need relief, when the second ladder arrives, with the light unit right behind. The IC has heard the ladder, but, due to the noise and darkness, he initially knows that the light unit has arrived only by its "Present" status having been reported on his laptop. (RSNs mounted to the second ladder and light unit have been automatically detected by a gateway controller, that gateway controller has reported it to the Command gateway controller, which reported it to the IC's laptop.) The IC calls the light unit operator over and gives him instructions where to set up and what lighting he needs.

The IC has already designated an area for Rehab, and he now has two relief crews (the two ladders now on scene).

He makes a radio call to the original pumper unit that is still working outside (the A-Division) that relief is coming up. He also calls the unit inside the building, but both members fail to respond. Using his laptop, he manually sends a ping to the RSNs of that unit. The RSNs respond, but another radio call fails to get a response. A few seconds later, the IC's laptop gives an alert that both RSNs of the crew inside the building have not moved in the past 2 minutes. The IC immediately tasks the RIT (Rapid Intervention Team) to search for the unit inside. (The RIT was automatically dispatched to the scene when the IC declared that he had a Working Fire.)

The relief unit replaces the original pumper unit of the A-Division. The original pumper unit goes to the designated Rehab area. On the way, the unit's members check in with the IC, and he changes the unit's status on his laptop, so as to disable no-movement sensors of their RSNs (because they are no longer in a hot-zone assignment). The assignment of the relief unit is similarly changed to indicate its status as working the fire, in the A-Division, activating the no-movement sensors of the RSNs of that unit's members. A couple of minutes later, the warehouse manager races up to the IC to tell him that he remembers that some hazardous chemicals were recently stored on the far side of the warehouse. The IC, having earlier noted the hazmat qualifications of two of the firefighters of the C-Division, via radio tasks that unit to find and report the condition of the hazardous material. Using his laptop, the IC changes their status to indicate that they are in the building, and on a hazmat detail (e.g., in the hot zone). The IC then has the Communications Officer call Dispatch and tell them about the presence of hazardous material on-site. The Dispatcher initiates a DCC call-out scenario to alert other City workers and public officials that a hazmat incident may be occurring. The DCC system starts its automated call-out sequence, to have the appropriate resources standing by and ready to come to the incident site.

As this is going on, the additional EMS unit arrives. The RSN attached to the vehicle and the personal RSNs of the responders are automatically detected and logged in. These events are seen by the IC on his laptop. The Command gateway controller also sends a message to the Dispatch Center via a cellular connection (preferably using the mobile MMR system as an intermediary for an EGW to GCE communication as described hereinabove) that the additional EMS unit has arrived. The ID of this unit, along with all of the other vehicles that are already on-site appear on the GIS display at the Dispatch Center. The GIS display is also used to keep others apprised of the resources at the incident. Other Dispatch Center personnel relay the information to other agencies and jurisdictions, and by monitoring dispatch traffic, keep others (including PSAP Operators, Sheriff, Highway Patrol, etc.) informed.

For example, when the Communications Officer requested the additional EMS unit, Dispatch also notified Mercy Hospital's ER via landline that an additional EMS unit had been dispatched to a major fire and that some unknown hazardous material may be involved. When that EMS unit later arrived on-scene, that unit confirmed its arrival and assignment with the hospital via HEAR (Hospital Emergency Alerting Radio).

Moments after the arrival of the additional EMS unit, the IC's laptop alerts him that the RSNs of the Interior Division unit that had earlier not been moving are now moving. He makes a radio call to that unit but stills gets no response. So, he makes a radio call to the RIT, and they respond that they have both the other unit and the two night-watchmen in hand and are making their way out. The IC sends two of the EMS personnel and two firefighters who have been resting to help bring the six who are in the building out.

As they leave to enter the building, on his laptop, the IC makes the required assignment changes for those in the building and grouped with the first rescue team.

About that time, the team detailed to hazmat reports via radio that the hazardous material is secure and that their side of the building is not in danger. So, the IC re-assigns the entire unit to the A-Division (to the IC's or A-side of the building) to fight the fire from there. In doing so, he uses his laptop to record the assignment accordingly. The IC also has the Communications Officer call Dispatch to give them an update that the hazmat situation is under control and that no danger exists. Dispatch sends an alert for the hazmat response teams to stand down.

While the re-assigned crew and pumper are in transit to A-side of the warehouse, the IC receives a call from his Assistant Fire Chief. Both the Assistant Chief and the Watch Commander have been following the incident—the Assistant Chief from his laptop at the station, and the Watch Commander from his command post. The Fire Chief, however, has been notified at home and is also following the incident on his laptop. Due to the reporting from the Command gateway controller, all know that all dispatched assets have reported at the site, but the Assistant Chief has nonetheless called to inquire about status and whether county resources may be needed. The IC replies that the fire is under control, but that there may be some injuries, about which he will know more momentarily. The fire is out. Equipment is being collected and loaded. One EMS unit has left for the hospital with a night-watchman who has a sprained ankle and first-degree burns on his hands and forearms. Resources that have left have been manually logged out of the IC's laptop, as well as having automatically disappeared as their gateway controllers and RSNs move away from the gateway controller attached to the IC's vehicle. The EMS unit communicates directly with the hospital that they are en-route and provides particulars regarding the patient's injuries and their ETA. Upon arrival at the ER, a local, fixed gateway controller at the hospital detects the EMS vehicle's arrival and reports the unit's presence to the Dispatch Center, where it is displayed on the GIS system. Before releasing responding units and using the data and logs generated by the TeraHop system and AIMSonScene, the IC conducts a short, informal de-brief of the incident among the commanders on-scene, i.e., the personnel with PDAs. Among other things, during that de-brief, the IC learns that the first rescue team had stopped moving because they had come to a dead end and then were immediately blocked from retreat by falling debris.

They did not respond to radio calls because there was no radio coverage in the confined basement area in which they were trapped. They were rescued by the second rescue team, and together they found the night-watchmen in a secure room.

As the last resource leaves (a Police cruiser), the IC makes one last check that all RSNs and resources have logged out before closing the incident and uploading all appropriate data to Benson's data center (Archive Server). The warehouse manager is left to deal with fire inspectors, his insurance agent, and the owner. As each Fire vehicle returns to its station, a gateway controller permanently located at each station communicates with each vehicle-mounted gateway controller. This communication automatically uploads all stored incident data to Benson's Archive Server, checks each vehicle-mounted gateway controller for a correct software version (and downloads needed updates), resets temporary settings, and reports resource status to Central Dispatch.

Two weeks later, Benson's Fire Chief, as part of his regular practice, conducts a formal review of the incident, to look for ways to improve performance. The data and logs generated by the TeraHop system and AIMSonScene that night, which were transferred by the Command gateway controller to the Benson Archive Server, are instrumental in reconstructing the incident and how the Benson ESS units responded to it. AIMSonScene was particularly useful in generating the incident narrative and populating NIMS and other official forms.

Two months later, in preparing his budget figures for the coming year, the Benson Fire Chief prepares a proposal for funds to expand the implementation of the managing entity system to include all of the City's fixed ESS locations. He figures that having gateway controllers at every fixed ESS location will be particularly useful when logging resources back in when they return from an incident, for better management of multiple demands. He is also assisting the Police Department and the Emergency Management Director prepare similar funding requests for their respective systems.

Detailed Description

Exemplary RSNs

An exemplary RSN in accordance with one or more preferred embodiments of the present invention in the preferred first-responder context will now be described. It will be appreciated that although described as including various elements and functionality, in alternative embodiments and implementations, an RSN might reasonably be practiced in the absence of one or more of these elements, or in the absence of some or all of this functionality.

Detailed Description

Exemplary RSNs—General Overview

To begin, the RSN includes an onboard controller, i.e., a processor, that manages radios, messaging, memory, state-changes, power consumption, and IO functionality of the RSN, and controls all other RSN functionality.

The RSN further includes non-volatile memory, i.e., computer-readable storage, sufficient to store data and instructions needed for the functionality described herein. This memory is sufficiently large as to allow for at least 64 KB of user/asset data. User/asset data stored in one or more user/asset data fields is configurable using one or more configuration tools as described in more detail elsewhere herein. Further, user/asset data is capable of being rendered unreadable, e.g., erased or over-written, in response to a configuration tool or user application command.

The RSN includes a pre-loaded, i.e., factory loaded, basic load of software and firmware minimally required for basic RSN functionality and post-factory customization to applications. Preferably, the RSN is implemented utilizing Mini-PEOS. This factory-new state is preferably utilized as a reference point and supports verification test suites. The RSN is configured to be reset to this factory-new state, and its factory defaults as discussed in more detail hereinbelow, upon receipt of a wireless command from the managing entity, or in response to a command from a configuration tool. Preferably, such reset is not possible by command from a user application.

The RSN is configured to allow updating and upgrading of both its onboard software and its onboard firmware. This can be accomplished either via a wireless link or by a physical connection to a suitable configuration device. Notably, any messages queued at the RSN must be transferred to a gateway router or gateway controller, or storage device, and such transfer acknowledged, prior to processing of an update or upgrade. Preferably, however, neither updates nor upgrades disrupt or erase any stored data.

An indicator of the version of any and all RSN software, firmware, and hardware is readable via a radio network the RSN is a part of, such as, for example, in response to a gateway router or gateway controller inquiry, in response to a configuration tool inquiry, or via an appropriate user application.

The RSN includes a unique ID (UID) encoded into firmware at the manufacturer. UIDs are unique, i.e., are not duplicated, in that no two RSNs have the same UID. The numbering system used for the UID accommodates at least ten billion (i.e., $10^9$, or 10,000,000,000) unique IDs.

The RSN includes data fields for common user attributes that have a fixed configuration, but which are field-populated using a configuration tool or an appropriate user application. The common user attribute fields preferably include: an owner/company name field, which preferably includes one line of fifteen characters; a location field, which preferably includes three lines of fifteen characters each; an assigned-to field, which preferably includes an indication of an asset or function the RSN is assigned to and preferably includes two lines of fifteen characters each; and another data field, which preferably includes four lines of fifteen characters each. Notably, the common user attribute fields do not use user/asset data storage. Common user attributes are readable via a radio network the RSN is a part of, such as, for example, in response to a gateway router or gateway controller inquiry, in response to a configuration tool inquiry, or via an appropriate user application with appropriate authentication.

Detailed Description

Exemplary RSNs—Internal Radio Components

The RSN also includes a reduced complexity radio (RCR), i.e., a wake-up transceiver, together with one or more appropriate internal antennas. The RCR is normally in a dormant state in which it is ready to receive an incoming transmission, but is not ready to transmit. When in the dormant state, the RCR awaits an event input or an appropriate wake-up message. The RCR generally functions in accordance with RCR technology as described both hereinabove, and in several of the references incorporated herein.

The RSN is further configured in accordance with class-based networking as described in many of the incorporated references, as well as elsewhere herein, such that an appropriate wake-up message is preferably an in-band wake-up message associated with a class that the RSN belongs to. The RCR is configured to communicate using messages having a total message length sufficient to provide class functionality, reliability, a payload, authentication, routing functionality, error correction, and other data or instructions as needed to ensure that the RSN communicates with only in-class networks and in a manner appropriate to those networks and attendant applications, which may be user applications or otherwise.

Notably, the RSN is not limited to membership in a single class. The RSN is configured for assignment of multiple, concurrently active classes, and thus, for example, may be configured to respond to wake-up messages of two or more different classes. Preferably, the RSN is capable of maintaining up to 16 concurrently active class memberships.

The RSN includes a Bluetooth radio, i.e., a complex transceiver, configured in accordance with IEEE 802.15, together with one or more appropriate internal antennas. The Bluetooth radio is normally in an off state until turned on by a command from the onboard controller, e.g., a command triggered by an event.

Preferably, both the RCR and Bluetooth radio, using their internal antennas, have a range, for communications with the RCR or Bluetooth radio of another RSN, or of a gateway router or gateway controller, of at least three hundred feet in the most challenging RF environment contemplated for the target applications. Similarly, both the RCR and Bluetooth radio preferably enjoy an open-space, line-of-sight range of at least eight hundred feet.

The RSN is configured to receive commands from a gateway router or gateway controller that sets frequencies on which the radios, i.e., the RCR and Bluetooth radio, operate. It will be appreciated that a gateway router or gateway controller can thus be configured to command the RSN to utilize particular frequencies based on regulatory requirements of the country in which the gateway router or gateway controller is located.

Similarly, the radios, i.e., the RCR and Bluetooth radio, are configured to transmit at a maximum power that does not exceed the lowest power level of any applicable country/jurisdiction in which the RSN is intended to be used.

Each radio, i.e., the RCR and Bluetooth radios, preferably exhibit a generally omni-directional radiation pattern. Radiation patterns are preferably optimized in anticipation that the RSN is likely to be in close proximity or contact with metal objects and/or masses with high water content.

It will be appreciated from the description herein that the RSN can "hop" messages through other RSNs to reach a gateway router or gateway controller. The RSN includes hopping algorithms and rules such that up to 16 hops can be made, using appropriate Classes, in the appropriate order, e.g., fifteen RSN to RSN hops, and then one RSN to gateway router or gateway controller hop. The RSN is configured to learn and store hop-path information that helps minimize network latency and battery consumption. As described hereinbelow, the RSN is configurable via profile parameters to enable or disable hopping, such as, for example, when the battery is low.

It will further be appreciated that the RSN may be in range of more than one gateway router or gateway controller. Preferably, the RSN includes preferential registration functionality which allows one or more gateway routers or gateway controllers to be indicated as preferred, and ranked in order of preference.

Detailed Description

Exemplary RSNs—Motion/Vibration Sensor

The RSN includes a motion/vibration sensor, i.e., sensing capability, that can sense, differentiate, and report the commencement of motion or the absence of motion (no/motion). Preferably, motion is characterized as the commencement of vibration or acceleration that is associated with movement or with physical disturbance.

The sensitivity of the motion/vibration sensor is configurable and selectable using either an appropriate configuration tool or an appropriate user application. The motion/vibration sensor includes five sensitivity levels ranging from 1, which is the lowest sensitivity level, to 5, which is the highest sensitivity level. A user preferably can select one of the five sensitivity levels, and additionally can set each of the five sensitivity levels, using an appropriate configuration tool or an appropriate user application.

With respect to this motion/vibration sensor, the RSN may include, for example, three motion sensing modes: a "disabled" motion sensor mode in which the motion/vibration sensor is non-functioning, an "enabled-motion" motion sensor mode in which the RSN senses and reports the commencement of motion, and an "enabled-no/motion" motion sensing mode in which the RSN senses and reports that motion has failed to occur during some period of defined length. The length of the no/motion period is selectable using a configuration tool for an appropriate implementation. For example, the period may be selected in: one minute intervals for lengths between one minute and ten minutes; five minute intervals for lengths between ten minutes and thirty minutes; and ten minute intervals for lengths between thirty and sixty minutes.

In some implementations, the same sensitivity settings are utilized regardless of what mode the RSN is in, while in other implementations the RSN utilizes different sensitivity settings in its "enabled-motion" motion sensor mode as compared to its "enabled-no/motion" motion sensor mode.

The RSN is capable of both self-assuming a motion sensing mode, and of assuming a motion sensing mode in response to a command from a configuration tool or an appropriate user application. More specifically, the RSN is capable of self-assuming a motion-sensing mode based on any combination of programmable conditions, such as, for example, a time of day, a day of the week, whether the RSN is captured by a gateway controller, and an identifier included a beacon message, e.g., a particular identifier of a gateway controller. These conditions are configurable and programmable via both a configuration tool and an appropriate user application.

Exemplary RSNs—Shock Sensor

The RSN includes an internal shock sensor and appropriate conditioning circuitry capable of detecting and reporting moderate-magnitude shocks in at least one axis. Preferably, no measurement is required. The sensitivity of the shock sensor is configurable and selectable using either an appropriate configuration tool or an appropriate user application. The shock sensor includes five sensitivity levels ranging from 1, which is the lowest sensitivity level, to 5, which is the highest sensitivity level. A user can select one of the five sensitivity levels, and additionally can set each of the five sensitivity levels, using an appropriate configuration tool or an appropriate user application. Factory default values are provided for each sensitivity level. The factory default lowest sensitivity level is calibrated to detect an impact from falling from five feet or more onto a hard surface. With respect to the shock sensor, the RSN includes two shock sensing modes: enabled and disabled. The shock sensor can be enabled or disabled in response to a command from a configuration tool or an appropriate user application.

Exemplary RSNs—Power

The RSN includes an internal battery of sufficient capacity to operate the RSN at full capability preferably for a period of at least two years, assuming at least 10,000 message events per year, per the environmental profile and space/weight constraints described herein. Each message event is assumed to include a wake-up/find-path transmission, a path-found receipt, a data transmission, and an acknowledgment data receipt. This requirement is exclusive of powering external sensors. The battery has a manufacturer code and date printed on its exterior.

Notably, the battery is preferably not user replaceable, but is implemented to facilitate replacement at a factory or service-center, preferably without soldering.

The RSN is configured to monitor and report a battery level of the internal battery, both on-demand, i.e., upon a query from a configuration tool or an appropriate user application, and automatically per fixed threshold settings. There preferably are two thresholds that trigger such automatic reporting. A low battery alert threshold corresponds to approximately thirty days of useful battery life, assuming average usage, and a critical low battery alert corresponds to approximately ten days of useful battery life, assuming average usage. When each threshold is reached, a message is sent to a user application providing an alert that a low-battery condition exists for that RSN. The reporting preferably merely indicates either a "Low Battery Alert" or a "Critical Low Battery Alert".

Additionally, battery level reporting is capable of being used to transition, either automatically or by a user via a configuration tool or user application in response to a report, the RSN into a state where it no longer facilitates hopping for other RSNs, thus conserving its remaining battery life.

If desired, the RSN may be configured to suspend messaging in the event of a mass event, such as, for example, an earthquake, high winds, a storm, etc., until the mass event is over so as to prevent excess battery drain and network congestion caused by events that affect large numbers of RSNs in a given area simultaneously. This functionality is preferably implemented via logic, i.e., programming, at the RSN. Alternatively, the RSN is configured to receive instructions from a gateway router or gateway controller indicating either the occurrence of such a mass event or that the RSN should suspend messaging.

Exemplary RSNs—Behavioral States

The RSN is capable of being assigned to user application-level behavioral states, such as, for example, via a gateway router or gateway controller message, or user input, and these states affect how the RSN behaves, e.g., with respect to subsequent inputs. For example, if the RSN is attached to an asset that is not scheduled to move, then the RSN is sent a message that changes the RSN's behavioral state such that it reports movement. Alternatively, if the RSN is attached to an asset that is expected to move within a particular period of time, then the RSN is sent a message that changes the RSN's behavioral state such that it reports if movement does not occur within such period of time. The RSN is also capable of self-assuming such states, based on known or sensed conditions, such as, for example, a change in state of the RSN from captured to free or vice-versa.

Exemplary RSNs—Housing

Figure 36B:
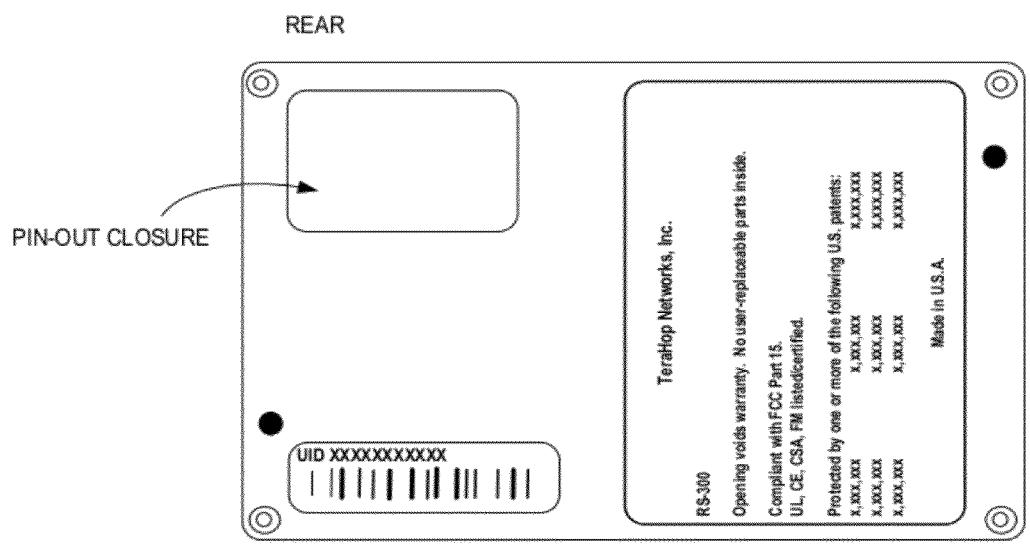

Preferably, the RSN includes its own housing. The housing is in the shape of a chamfered, elongated, and compressed box which is slightly rounded at its ends, and is illustrated in FIG. 36A and FIG. 36B. The housing is bilaterally symmetrical along all 3 axes. The housing does not exceed an envelope having dimensions of three and a half inches by two and a half inches by one and a half inches. The housing preferably comprises molded plastic. A bottom of the housing is preferably flat over at least 75% of its surface, to facilitate attachment to flat surfaces. The housing preferably includes a quality-forensics code, e.g., a date code, molded into an interior surface. The housing further preferably includes one or more external labels, one of which preferably includes the UID of the RSN and a barcode corresponding to the UID.

Exemplary RSNs—Interfaces and Sleds

Whether housed in a seal housing, or in its own housing, the RSN preferably includes one or more physical/electrical interfaces, and the respective housing is preferably configured to provide access to such interfaces, although at least some RSNs may not include interfaces or may not provide access to such interfaces.

Each interface includes some form of physical protection to prevent inadvertent metal-to-metal contact across connector pins when the interface is not engaged, i.e., in use. Each interface preferably also includes a means to minimize the probability of electrostatic discharge (ESD) damage, and to thwart reverse-polarity connections. The housing preferably includes covers and other interface-access features configured for manipulation by qualified service technicians in a service-depot environment. Such covers and features are configured to minimize the probability of inadvertent opening, deliberate tampering, and incorrect re-installation.

The interfaces are configured for connection to "sleds", which are separate components configured for attachment to the RSN which expand the functionality of the RSN. Further, preferably, the interfaces provide connectivity to at least one TTL-level serial port. Preferably, sleds are configured to mate smoothly, electrically and physically, with the bottom of the RSN, with no gaps between the mating surfaces of the respective housings. The sleds themselves may be mounted or attached to assets such as, in the first-responder context, firefighting equipment. Upon connection to a sled, or other external device, the RSN preferably does not reset any data, configuration, or state, and does not make attempt to transmit or transfer data, unless configured or commanded to do so. A sled is preferably attached in such a manner as to resist accidental detachment due to shock or vibration, and as to resist casual tampering, such as, for example, using Torx screws.

The RSN is configured to report to other network elements and to a configuration tool or appropriate user application information corresponding to a sled attached to it, e.g., a model number. The RSN is further configured to ascertain, and report, whether it has connectivity and communications with a sled. The RSN is also configured to be able to "turn off" a sled upon command from a user application. Preferably, this is accomplished via battery interrupt, unless otherwise defined for specific sled types, e.g., a sled is configured to be rendered into a dormant state.

Exemplary sleds include: a GPS sled; an external battery sled, which preferably includes circuitry configured to avoid conflicts with the internal battery; and external low-power sensor sleds. These low-power sensors are configured to be attached to, and read by, the RSN without the need for an additional battery, and preferably do not cause more than a 10% impairment in the battery life of the RSN.

Exemplary RSNs—Timing and Events

The RSN includes a clock or other chronometric apparatus. The clock is configured to be synchronized with GPS time via a gateway router or gateway controller, but the RSN may keep, i.e., measure, time by any method. Time is reported or recorded for use by applications utilizing 24-hour GMT, plus a local-time offset indicator. All records requiring a time stamp are stamped per this time.

The RSN is configured to reset, or synchronize, its time while connected to a gateway router or gateway controller. This synchronization is configured to function properly even when the RSN is connected to the gateway router or gateway controller via a plurality of other RSNs. Even when so connected, the RSN's time is synchronized to within plus or minus five seconds of the gateway router's or gateway controller's time, including the time required for network transit. When such synchronization is not possible, the RSN's time drifts at most plus or five minutes per month.

The RSN is configured to store event data of defined events and activities in its memory. Defined events include, for example: the commencement of motion per a set threshold; a shock that exceeds a set threshold; a low battery warning; a critical low battery warning; and sled sensor events.

Event data includes an event-type identifier and a date/time stamp. The RSN is capable of transmitting raw event data to gateway routers and gateway controllers. The RSN preferably includes sufficient memory capacity to store at least thirty event records. When storage capacity of the RSN is exceeded, older events are overwritten by newer events in a first-in-first-out manner. The RSN is configured to erase all event records upon the command of an appropriate user application, after proper authentication.

The RSN is capable of timing the duration of activities, and of timing intervals between events, based on the needs of an application, e.g., a user application.

The RSN is configured to allow it to count events, and to use such counting to determine what state or condition the RSN is to assume. For example, the RSN can be configured such that it must "hear" three consecutive gateway router or gateway controller beacons before responding, in order to minimize abrupt connections and disconnections if the RSN is moving rapidly through an area.

Further, the RSN is configured to respond to queries for the current status of its sensors and the settings of all configurable items from a configuration tool or appropriate user application. The RSN is configured to supply data to gateway routers and gateway controllers as required to support network diagnostics. This data includes, for example, data related to or data that can be used to determine latency; the percentage of instances that the RSNs are awakening due to in-band noise; the percentage of instances that RSNs are awakening due to wrong-class requests; the percentage of instances of initial message failures; the average number of message retries; and the average number of hops.

Exemplary Gateway Controllers (GCs)

A gateway controller in accordance with one or more preferred embodiments of the present invention in the preferred first-responder context is implemented as a logical gateway controller, comprising a gateway server connected to a gateway router, or as an integrated gateway controller, comprising a gateway server physically integrated with a gateway router, as desired. More specifically, a logical gateway controller comprises a gateway router, as well as a gateway server that is hosted on, or comprises, a separate, e.g., remote, computer, and that is connected to the gateway router via a high-capacity, high-reliability data link. An integrated gateway controller comprises a gateway, i.e., a gateway router, and a gateway server both housed in a gateway server module. This gateway server module is either contained within a housing of the gateway controller, or else is contained within a separate housing in intimate and semi-permanent attachment to the gateway controller housing. Power for the gateway server module is sourced through the gateway controller, but the module preferably includes all other hardware required to render the functionality described herein, although in at least some alternative implementations some or all hardware may be integrated with gateway server hardware.

Preferably, the gateway router, whether logical or integrated, generally provides for communications with RSNs, while the gateway server generally provides local network control and management, event data storage, and management of communications with external networks. Preferred elements and functionality of gateway controllers will now be described via description of one or more exemplary gateway controllers. Where possible, functionality and elements will be described in a manner generic to both integrated gateway controller implementations and logical gateway controller implementations. It will be appreciated that, to the extent practicable, and generally unless otherwise noted, the elements and functionality described are contemplated for use in both types of implementations. It will further be appreciated that although described as including various elements and functionality, in alternative embodiments and implementations, a gateway controller might reasonably be practiced in the absence of one or more of these elements, or in the absence of some or all of this functionality.

Exemplary GCs—General Overview

An exemplary gateway controller includes one or more onboard controllers, i.e., processors, that manage the radios, messaging, memory, state-changes, power consumption, IO functionality, and applications of the gateway controller, and that control all other gateway controller functions as described elsewhere herein. Preferably, both the gateway router and the gateway server of the gateway controller include such a processor. The processor is selected and configured such that its power and speed are sufficient to support all on-board applications at their normal performance levels.

The gateway controller further includes non-volatile memory, i.e., computer-readable storage, such as, for example, a hard drive, sufficient to store a plurality of event data records ("EDRs"), and other network management/control records, and to support network server functions, as described herein. The memory is partitionable as needed to provide the functionality described herein. This memory is preferably a part of gateway server hardware. Additionally, the gateway controller is preferably implemented using Linux, e.g., the gateway server and gateway router of the gateway controller are both implemented using Linux.

Furthermore, Each EDR preferably includes a time/date-stamp regarding the occurrence of some event related to the system and its operation, or of the of absence/failure of an expected event. EDRs record the nature of the event, what element of the system was affected, and when the event occurred (time & date). EDRs may be temporarily stored on gateways as generated until uploaded as a batch file to a central data archive server.

The gateway controller includes whatever BIOS, operating system, protocol converters, generic APIs, or other software or firmware are required to establish basic functionality, enable further programming, and support functionality described herein.

The gateway controller is configured to readily accept loading and use of APIs for user interfaces or applications. For example, it is anticipated that multiple logical connections might be required for event data records, a bi-directional API, and an interface for RSN routing and authentication. Further, different message types will sometimes require different routing and handling. Message types include, for example, event data record messages and API messages.

Multiple logical connections are also contemplated for use for a Simple Network Management Protocol (SNMP) manager for RSNs, and an SNMP agent for internal gateway controller function monitoring and control.

The gateway controller is configured such that the version of any and all software, firmware, and hardware of the gateway controller is readable via a configuration tool, the message management and routing (MMR) system (as described elsewhere herein), and appropriate user applications.

The gateway controller is configured such that its onboard software and firmware can be updated or upgraded through any available communications link supported by the gateway controller. In at least some implementations, the gateway controller can be upgraded or updated by physical connection to a suitable configuration device. Notably, no queued messages are lost due to such an update or upgrade, and no user-desirable stored data is erased or disrupted.

The timing of updates and upgrades is preferably selected or controlled by the owner of the gateway controller, so as to afford the owner the opportunity to minimize disruption of the owner's intra-network and inter-network message traffic. Notably, however, neither updating nor upgrading takes the gateway controller out of service, except in that a reboot might be required to implement some changes. In at least some implementations, updates or upgrades can effect changes to one or more profiles of the gateway controller.

The gateway controller includes a unique ID (UID) encoded into firmware at the manufacturer. UIDs are unique, i.e., are not duplicated, in that no two RSNs have the same UID. The numbering system used for the UID accommodates at least ten billion (i.e., $10^9$, or 10,000,000,000) unique IDs.

The gateway controller includes space in non-volatile memory for storing a unique Area ID, as described hereinabove. This Area ID is loaded using a configuration tool.

The gateway controller includes data fields for common user attributes that have a fixed configuration, but which are field-populated using a configuration tool or an appropriate user application. The common user attribute fields preferably include: an area name field, which preferably includes one line of fifteen characters; an owner/company name field, which preferably includes one line of fifteen characters; a location field, which preferably includes three lines of fifteen characters each; an assigned-to field, which preferably includes an indication of an asset or function the gateway controller is associated with and preferably includes two lines of fifteen characters each; and another data field, which preferably includes four lines of fifteen characters each. Common user attributes are readable over the network, e.g., in response to a configuration tool inquiry, or via an appropriate user application with appropriate authentication.

The gateway controller includes power-on self-test (POST) functionality, which includes a programmed script that runs when first turned on for purposes of checking basic, minimally-required operating behavior. Errors and/or exceptions are reported if detected. The gateway controller is also equipped with diagnostics, initiated by command via a user interface, e.g., a user application or configuration tool, capable of testing or detecting: operating system anomalies; TX & RX operation of all transceivers; LAN connectivity; and WAN connectivity. The gateway controller maintains and stores statistics and peg counters that can be read and reset remotely to aide in performance monitoring, including, but not limited to: POST anomalies; latency; a percentage of instances that RSNs are awakening due to in-band noise; a percentage of instances that RSNs are awakening due to wrong-class requests; a percentage of initial message failures; an average number of message retries; and an average number of hops.

The gateway controller is configured to be capable of rebooting its gateway server upon command, either wirelessly or via a wired line. This command is issue-able only by the affected network owner or administrator. The gateway controller preferably also includes a fail-safe means of rebooting the gateway server that can be effected in the absence of wireless or wireline connectivity, such as, for example, a power interrupt. Preferably, however, no means or method of server rebooting corrupts settings, configurations, or stored data.

The gateway controller includes an audio codec and low-level analog circuitry capable of playing prerecorded, messages stored digitally onboard. The messages are downloadable via a configuration tool. The messages are played back via an external audio speaker connected through a port on the gateway controller housing. Messages are played upon command of a user application. Preferably, messages are at most ten seconds long, and comprise low-fidelity, e.g., AM-radio, speech. Preferably, fewer than ten messages are stored at any one time.

Exemplary GCs—Gateway Controller Communications

The gateway controller includes a reduced complexity radio (RCR), i.e., a wake-up transceiver, together with one or more appropriate internal antennas. Preferably, this RCR is part of gateway router hardware of the gateway controller. The RCR is normally in a dormant state in which it is ready to receive an incoming transmission, but is not ready to transmit. When in the dormant state, the RCR awaits an event input or an appropriate wake-up message. The RCR generally functions in accordance with RCR technology as described both hereinabove, and in several of the references incorporated herein.

The gateway controller is further configured in accordance with class-based networking as described in many of the incorporated references, as well as elsewhere herein, such that an appropriate wake-up message is preferably an in-band wake-up message associated with a Class that the gateway controller belongs to. The RCR is configured to communicate using messages having a total message length sufficient to provide Class functionality, reliability, a payload, authentication, routing functionality, error correction, and other data or instructions as needed to ensure that the gateway controller communicates with only in-Class networks and in a manner appropriate to those networks and attendant applications, which may be user applications or otherwise.

The gateway controller is configurable to operate in one of three operational modes. In a private mode, the gateway controller is configured to respond to a fixed set of classes, which fixed set can be modified and updated. In a public mode, the gateway controller is configured to respond to any class. Lastly, in a shared mode, the gateway controller is configured to respond to a fixed number of classes, selected by the owner of the gateway controller. Preferably, in this shared mode, whether the gateway controller responds is based at least in part upon the identity of the user or owner of the asset sending a message, as described in a user-ID portion of the message header. Preferably, this identity is verified by a DNS query.

The gateway controller includes a Bluetooth radio, i.e., a complex transceiver, configured in accordance with IEEE 802.15, together with one or more appropriate internal antennas. Preferably, this Bluetooth radio is part of gateway router hardware of the gateway controller. The Bluetooth radio is normally in an off state until turned on by a command from the onboard controller, e.g., a command triggered by the need to communicate with an RSN.

Preferably, both the RCR and Bluetooth radio, using their internal antennas, have a range, for communications with the RCR or Bluetooth radio of another RSN, or of a gateway router or gateway controller, of at least three hundred feet in the most challenging RF environment contemplated for the target applications. Similarly, both the RCR and Bluetooth radio preferably enjoy an open-space, line-of-sight range of at least eight hundred feet, and more preferably enjoy an open-space, line-of-sight range of at least 300 meters.

The RSN is configured to receive commands from a gateway router or gateway controller that sets frequencies on which the radios, i.e., the RCR and Bluetooth radio, operate. It will be appreciated that a gateway router or gateway controller can thus be configured to command the RSN to utilize particular frequencies based on regulatory requirements of the country in which the gateway router or gateway controller is located.

The gateway controller includes at least one Wi-Fi transceiver configured in accordance with IEEE 802.11, together with one or more appropriate antennas, for backhaul communication and for communications with user-interface devices and other gateway controllers. Preferably, this Wi-Fi transceiver is part of gateway router hardware of the gateway controller. Wi-Fi is available for electronic communications with local user devices, such as, for example, a laptop or PDA running a user application.

Preferably, in an office or an urban environment, Wi-Fi range is at least 300 feet, while in open areas, Wi-Fi range is preferably at least 800 feet, line-of-sight, and more preferably at least 300 meters, line-of-sight. The number of transceivers and operating bands is preferably engineered to minimize the likelihood of in-band interference disrupting network performance.

In at least some implementations, Wi-Fi is available for electronic communications between the gateway controller and a separate gateway router.

The gateway controller is configured for 10/100 Ethernet connectivity. Ethernet connectivity is provided through a connector on the gateway controller housing. The connector preferably conforms to a commonly available, industry-standard design, suitable for Ethernet connectivity and environment requirements. The connector interface includes an automatic cable polarity detection switch, such that either straight or crossed cables may be used for interconnection. In at least some implementations, both gateway router hardware and gateway server hardware includes Ethernet connectivity.

The gateway controller is preferably capable of being quickly modified to allow for the use of GSM/3G/4G (or later version) or CDMA bi-directional data communications. This may be accomplished, for example, via insertion of a card by a technician, and the use of a configuration tool. The gateway controller contains internal, customer configurable logic that allows the gateway controller to establish connections based upon: an elapsed time since a previously established successful connection; a set periodic interval; the occurrence of some number of 'buffered' messages.

The gateway controller is preferably capable of being quickly modified to support a 9.6 KB/sec. bi-directional serial link, which can be used to interface with external satellite or Land-Mobil Radio (LMR) devices. This may be accomplished, for example, via insertion of a card by a technician, and the use of a configuration tool. This functionality is capable of being implemented with hardware flow-control.

Gateway router hardware of the gateway controller is capable of providing point-to-point, bi-directional gateway functionality within a local network island via WiFi, LMR, fixed terrestrial RF link, or satellite, if equipped with one or more appropriate cards or modules as described. Preferably, these links will appear to be 'nailed-up', i.e., non-dialup, connections, that exhibit latency consistent with other timeout and re-try time intervals established for the overall system. Gateway router hardware is configured to store in non-volatile memory the addresses of wireless link LAN and WAN connections.

The radios of the gateway controller preferably transmit at a power and frequency acceptable in all jurisdictions in which the gateway controller is intended to be operated. If the radios are not inherently compliant for all jurisdictions, the gateway controller preferably includes one or more tables or rules to govern gateway controller and RSN operating frequencies and transmit power levels for non-US jurisdictions. The selection of power levels and frequencies is preferably governed by a fixed selection made using a configuration tool, or based on current GPS coordinates.

Each internal radio preferably exhibits a generally omni-directional radiation pattern. Radiation patterns are preferably optimized in anticipation that the gateway controller is likely to be in close proximity, e.g., less than one half of an inch, with a conductive surface. Preferably, the gateway controller is mounted such that a narrow side of the gateway controller with connectors is facing downwards.

The gateway controller is configured to communicate with user-input devices, e.g., a laptop or PDA, and is preferably configured to recognize and authenticate such user-input devices. For example, this functionality might be achieved utilizing a stored list of unique identifiers of specific trusted user devices or accepted passwords and encryption keys, where any user device that does not have a matching identifier or accepted password or key shall not be permitted to communicate with the gateway controller, and the identifiers, passwords, and keys are configurable using a configuration tool, but not user applications. Such functionality may be implemented in a similar manner as commercial Wi-Fi routers. Such functionality preferably applies to both wireless and wired communications, but may differ for each.

As noted hereinabove, radio networks are configured to allow for "hopping" between RSNs and other network devices. The gateway controller includes hopping algorithms and rules such that up to 16 hops can be managed, using appropriate Classes, with appropriate priority.

The gateway controller further includes message-handling algorithms and rules configured such that messages to or from RSNs or other gateway controllers are queued, messages are handled with appropriate priority, and no critical messages are inadvertently lost.

This functionality is applicable both among RSNs and gateway controllers of a local network island, and between a local network island and other networks, e.g., to or from a WAN.

The gateway controller is configured to support the management of RSN behavior-states as required to meet the needs of a network and user applications.

The gateway controller is programmed with operating parameters and instructions that are designed to: minimize instances of the local network and its RSNs responding to mass events, e.g., earth quakes, thunder, passing rail traffic, high winds, etc., avoid network paralysis; and prevent RSNs from wasting battery life with useless messages.

The gateway controller is further configured to collect and store event data records automatically, and to upload such EDRs via a WAN connection to appropriate servers and applications. Such uploading preferably occurs upon receipt of an EDR from another device or process when WAN connectivity is available, when a user-set time has a expired, when a user-set number of EDRs have been buffered, or upon command from a user application.

If WAN connectivity is not available, then EDRs are buffered until connectivity is re-established. If buffer capacity is exceeded, then buffered EDRs are discarded in a first-in-first-out manner. EDRs preferably include an EDR type, and in such event, EDRs are discarded in a first-in-first-out manner by EDR type.

The buffer is configured such that it has sufficient capacity to store, at least 2400 EDRs. The buffer medium is non-volatile. The gateway controller otherwise is capable of storing EDRs indefinitely until uploaded. Once uploaded, buffered EDRs may be cleared.

Notably, EDRs are handled by the gateway controller so as to not interfere with other messaging, e.g., control and status messaging. EDR functionality is configured to minimize the effect of EDRs on gateway controller and network loading. If EDR types are utilized, EDRs preferably are handled with priority based upon EDR type.

Exemplary GCs—Motion/Vibration Sensor

The gateway controller includes a motion/vibration sensor, i.e., sensing capability, that can sense, differentiate, and report the commencement of motion (motion) or the absence of motion (no/motion). Preferably, motion is characterized as the commencement of vibration or acceleration that is associated with movement or with physical disturbance.

The sensitivity of the motion/vibration sensor is configurable and selectable using either an appropriate configuration tool or an appropriate user application. The motion/vibration sensor includes five sensitivity levels ranging from 1, which is the lowest sensitivity level, to 5, which is the highest sensitivity level. A user can select one of the five sensitivity levels, and additionally can set each of the five sensitivity levels, using an appropriate configuration tool or an appropriate user application.

Factory default values are provided for each sensitivity level. The factory default lowest sensitivity level is calibrated to detect the motion of a gateway controller mounted to a passenger automobile driving on a paved asphalt surface at 20 MPH, while the factory default highest sensitivity level is calibrated to detect tool-assisted tampering attempts. The remaining factory default sensitivity levels are set linearly between the factory default lowest and highest sensitivity levels. Preferably, levels are calibrated such that motion of the gateway controller during the associated activity has a high probability, e.g., ninety percent of being detected, but the probability of a false positive owing to nearby activities which are not desired to be sensed is less than ten percent. Notably, it is contemplated that factory default calibration levels might be changed in response to characterization of sensor behavior. A factory default selection is made as to which sensitivity level is initially in effect.

With respect to this motion/vibration sensor, the gateway controller includes three motion sensing modes: a "disabled" motion sensor mode in which the motion/vibration sensor is non-functioning, an "enabled-motion" motion sensor mode in which the gateway controller senses and reports the commencement of motion, and an "enabled-no/motion" motion sensing mode in which the gateway controller senses and reports that motion has failed to occur during some period of defined length. The length of the no/motion period is selectable using a configuration tool or an appropriate user application. Preferably, the period is selectable in: one minute intervals for lengths between one minute and ten minutes; five minute intervals for lengths between ten minutes and thirty minutes; and ten minute intervals for lengths between thirty and sixty minutes.

In some implementations, the same sensitivity settings are utilized regardless of what mode the gateway controller is in, while in other implementations the gateway controller utilizes different sensitivity settings in its "enabled-motion" motion sensor mode as compared to its "enabled-no/motion" motion sensor mode.

The gateway controller is capable of both self-assuming a motion sensing mode, and of assuming a motion sensing mode in response to a command from a configuration tool or an appropriate user application.

More specifically, the gateway controller is capable of self-assuming a motion-sensing mode based on any combination of programmable conditions, such as, for example, a time of day or a day of the week. These conditions are configurable and programmable via both a configuration tool and an appropriate user application.

Exemplary GCs—Temperature Sensor

The gateway controller includes an internal temperature sensor, as well as logic that can sense, differentiate, and report temperatures that exceed limits that could be dangerous to the gateway controller. The gateway controller is preferably initially programmed with a factory-default range of −20° C. to +55° C. The gateway controller is configured such that if temperatures measured by the temperature sensor are outside of this range for more than ten consecutive seconds, a message is sent to the MMR system, and appropriate user applications, that a dangerous temperature condition exists. Such a warning is resent every 10 minutes until the condition is rectified.

Exemplary GCs—Exemplary GCs: GPS and Clock

The gateway controller includes a GPS receiver. The gateway controller is configured to report its GPS coordinates, i.e., GPS data, to remote applications via an onboard or external WAN connection.

The GPS data is capable of being sent upon request from the MMR system, another gateway controller, or by command that originates from either a remote or a local user application, e.g., in response to a user pressing a send-this-location button on a keypad in the operator's cabin of a port's rubber tired gantry (RTG).

GPS data is included in all inbound EDR messages. The data corresponds to the GPS-enabled device that is physically closest to the asset that originates the EDR, within the constraints of network connections.

Preferably, the GPS receiver outputs almanac, ephemeris, and timing information potentially for use by RSN GPS sleds, for network-aided GPS operation.

The gateway controller includes a clock, which is synchronized with GPS time. Time is reported or recorded for use by applications utilizing 24-hour GMT, plus a date indication. All records requiring a time stamp is stamped per this time and date.

The gateway controller synchronizes to GPS time, assuming it has satellite visibility, each time GPS coordinates are reported to any application, and at least once every 24 hours. The gateway controller may keep or measure time by any method, but preferably the clock is accurate to within plus or minus five seconds per day.

Clock operation and reporting is settable to a local time zone via the MMR system, a configuration tool, or appropriate user applications; automatically adjusts for daylight savings time; is aware of the day of the week; automatically adjusts for leap years. The gateway controller clock is used to update RSN clocks, as described hereinabove.

Exemplary GCs—Exemplary GCs: Power

The gateway controller does not include a power switch, but instead is configured to power on when power is applied via a power connector, i.e., a single plug-in connector on the housing. The gateway controller is operable from common vehicle power, i.e., nominal 12 VDC negative ground. The gateway controller preferably includes internal power-conditioning capability such that common vehicular power may be used without resorting to external devices. However, the gateway controller is configured for mounting of a power conditioner directly below and behind the gateway controller in contact therewith. The power conditioner accepts nominal 12/24 VDT input and provides conditioned 12 VDC out for the gateway controller. The power conditioner provides a delayed-turn-off relay to permit proper shutdown of the gateway controller, and further provides transient protection.

When power is applied, the gateway controller automatically boots, performs POST, runs other self-diagnostics as required to assure proper functioning of all onboard subsystems, and performs all other required and as-configured tasks to render it ready to perform its assigned network functions.

The gateway controller is capable of being functionally shut down, i.e., transitioned to a soft off, by command from a user application, via the MMR system, or from a configuration tool. Removal of external power shall also cause the gateway controller to be powered off, but the gateway controller is configured to minimize problems should this occur.

More specifically, the gateway controller includes an internal means to protect the gateway controller from damage and to protect data from corruption in the event of an unexpected and sudden loss of external power. If engaged, this means immediately begins to render the gateway controller into an off state, but in a manner that avoids damage and corruption. This means preferably minimizes on-off cycling should external power be restored intermittently.

Notably, this means is not intended to provide sustained power nor sustained operation of the gateway controller.

The gateway controller includes fusing and other protection circuitry configured to protect the gateway controller from reverse polarity, over-voltage, spikes, etc., on all external connections.

Such fuses are preferably slow-blow fuses of appropriate capacity, mounted internally, and intended exclusively for depot replacement.

Alternatively or additionally, if the gateway controller is installed in a fixed installation, the gateway controller preferably includes an uninterruptible power supply and lightning protection on power and data lines.

The gateway controller is configured for attachment to an optional 12V AGM, 33 AH rechargeable battery. The battery is powered from 90-130 VAC, 50/60 Hz fused; has 3 outputs at nominal 12 VDC, each fused at 6.3 A; fits within the dimensions of thirteen inches by eighteen inches by seven inches; weighs no more than 60 lb.; has an operating temp. range of −20° C. to +55° C.; and has a storage temp. range of −40° C. to +85° C. Preferably, power sensing allows for automatic switching to engage when line power to the gateway controller is list.

The gateway controller is configured for use with an outdoor power supply. The outdoor power supply accepts 110/208/220 VAC, 50-60 Hz, and provides 12 VDC out for the gateway controller. The input voltage is selectable via a mechanical switch. The outdoor power supply has fused input. The outdoor power supply is disposed in an enclosure that is suitable for protecting the device from outdoor environments, that has connection features suitable for hard-wiring into a site electrical system and for hard-wiring to a cable that plugs into the gateway controller, and that has features to facilitate mounting to a flat surface, e.g., mounting tabs.

The gateway controller is also configured for use with a basic power supply for 110 VAC, 50-60 Hz. The charger configuration may be a cube-on-the-wall plug and a cord, with a matching connector for the GC, or may be a table-sitting or floor-sitting "brick" with in and out cords. Preferably, the basic power supply has a cord length of at least six feet, and fused inputs.

Exemplary GCs—Exemplary GCs: Housing

Figure 37:
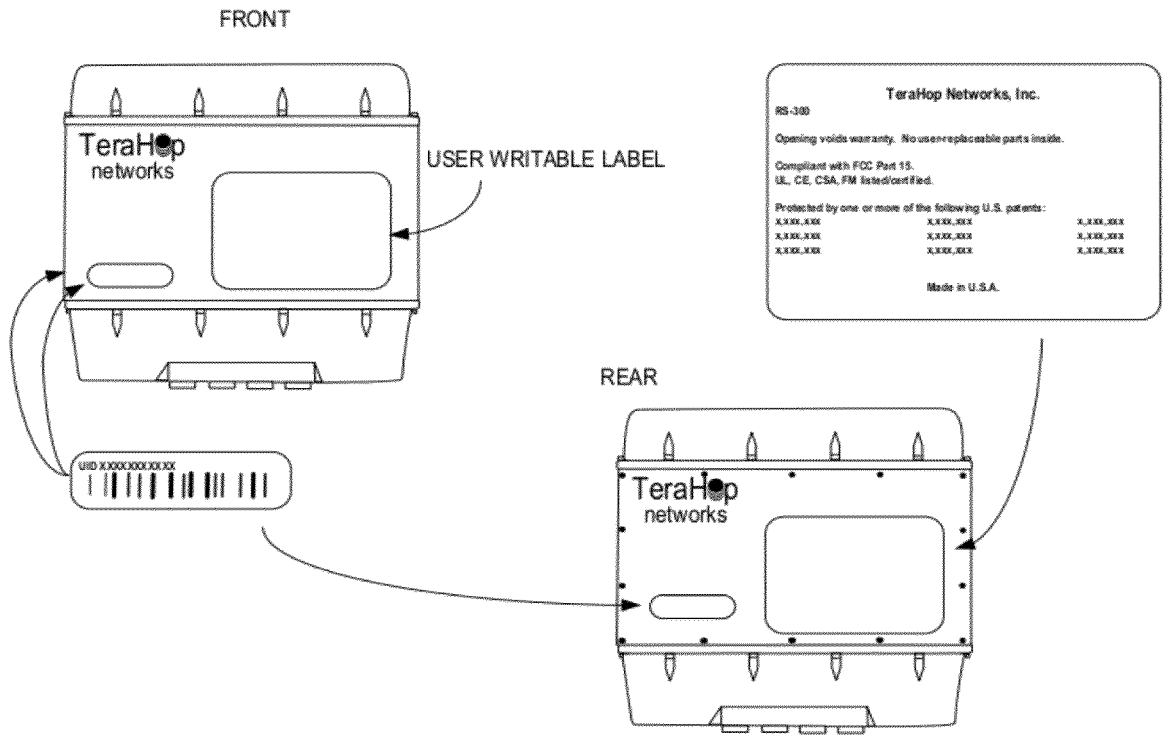
FIG. 37 illustrates an exemplary gateway controller in accordance with a preferred embodiment of the present invention.

The gateway controller preferably includes housing which is part metallic, for RF shielding and heat dissipation, and part plastic, for RF transparency. FIG. 37 illustrates an exemplary housing of the gateway controller. The housing preferably does not exceed an envelope having dimensions of ten inches by seven and a half inches by four and a half inches. The housing includes integral features for mounting to a flat surface, e.g., mounting feet or tabs. The housing is preferably contoured for strength, and preferably has rounded corners so as to reduce stress loads and shed precipitation. The housing is preferably an industrial gray or other neutral color, consistent with thermal dissipation and sun loading. The housing is preferably resistant to UV and corrosive atmospheres, including air pollution.

The housing is configured to accommodate the addition or integration of additional hardware, e.g., WAN communications devices, or the substitution of housing components to accommodate configurations including a gateway server module. The entire gateway controller, including any additional components or substitute housing components, preferably conforms to the dimensions noted hereinabove.

The housing is configured and held together in such a way that casual tampering is difficult, yet field-service technicians can open the case with tools that they commonly have. For example, Torx screws may be utilized.

The housing preferably includes one or more labels affixed to the outside thereof, one of which preferably includes the UID of the gateway controller and a barcode corresponding to the UID.

The gateway controller includes power and network connections accessible on the outside of the housing for Ethernet, power (plug-in), audio out (line level), and a serial port (RJ).

The connection ports each have a locking mechanism to inhibit accidental or casual disconnect and do not degrade housing integrity with respect to dust or water.

The gateway controller includes indicator lights visible on the outside of the housing to indicate whether power is on or off, LAN connectivity, and WAN connectivity. The lights are configured to maintain housing integrity. The lights are designed to minimize crowding on the housing, yet preferably have a diameter of at least one and a half millimeters. The RSN is preferably configured such that various combinations of lights illuminate and flash in a meaningful manner during diagnostics.

The gateway controller is configured to be reset to its factory defaults via a non-wireless means that is accessible through the housing.

The gateway controller preferably weighs less than four and a half pounds even with a full suite of WAN radios and a gateway server module.

Attributes of One or More Preferred Embodiments

The combination of CBN and WU technologies initially described above offers several advantages over other wireless networking technologies, including: dramatic increase in radio battery life (years); significant reduction in RF noise; use of standards-based radios (e.g., Bluetooth® & WiFi); Mbps data rates; and radio transmission only when sending data (eliminating timer dependency and periodic "blinks"). CBN technology also enables the concurrent operation of multiple radio types, in multiple architectures, to multiple standards, in the same area, sharing the same infrastructure, yet operating independently and without interference, thus facilitating global application. Accordingly, from the foregoing disclosure, it will be understood that implementations of the above described technologies in one or more preferred embodiments of the present invention include one or more of the following attributes and capabilities:

A system of networked devices and subsystems that, using radio communications, automatically/autonomously collects data about specific assets and the environments that they are in, and using either wireless or wireline (landline) communications, forwards those data to user applications and data-storage servers, as the assets and/or users change location.

A system of networked devices and subsystems that accommodates assemblages of a gateway device and of sensor devices (for convenience, "RSNs") that are in the RF range of the gateway device, into local (stand-alone, separate, or isolated) network islands, such that the network islands automatically/autonomously form and adjust as RSNs randomly come and go, in quantities of 10,000 RSNs per island.

A system of networked devices and subsystems that provides automatic detection of initial presence, sustained presence, and absence of each/all RSNs in an island and automatically reports these states and changes to them, to user applications, for each/all RSNs.

A system of networked devices and subsystems that provides bi-directional radio communications between RSNs and gateway devices, for exchange of data, commands, and software/firmware updates.

A system of networked devices and subsystems that includes gateway devices that provide WAN connectivity between local RSN-gateway networks and remotely located servers, and that manage the associated to-from messaging, for quantities of 10,000 RSNs per local network. The WAN communications include wireline, cellular, LMR data link, and satellite.

A system of networked devices and subsystems that renders a minimum 2 year RSN battery life, when used properly, in the most challenging application and conditions.

A system of networked devices and subsystems that provides a suite of sensors internal to RSNs that includes motion, shock, and magnetic switch.

A system of networked devices and subsystems that has RSNs that are of a size/weight that they can easily and comfortably be carried in a coat pocket or worn on a dress belt.

A system of networked devices and subsystems that provides minimum RSN-to-RSN, RSN-to-gateway, and gateway-to-local-user-device range of 300 feet.

A system of networked devices and subsystems that employs means that minimize the number of gateway devices needed to cover a given site and that significantly increase the probability that communications can be sustained between any given RSN and a gateway device, regardless of physical and electromagnetic conditions that would otherwise impair RF performance.

A system of networked devices and subsystems that includes RSN measurement and reporting of its own GPS (or equivalent)-derived location.

A system of networked devices and subsystems that includes RSN measurement and reporting of runtime (e.g., engine hours) of an associated asset.

A system of networked devices and subsystems that includes RSNs equipped with an interface for common operational and environmental sensors, to collect and report data from those sensors.

A system of networked devices and subsystems that includes means for partitioning local RSN-gateway networks and managing how messages are handled such that RSNs attached to assets of certain user-defined groups can operate independently of other groups, yet all share the same local gateway devices to communicate with their respective applications.

A system of networked devices and subsystems that includes gateway devices that provide direct/local-site communications and manage messages between user applications hosted on local computers (stationary and movable) and RSNs of a local network, without having to use WANs or other off-site means.

A system of networked devices and subsystems that has gateway devices that incorporate GPS (or equivalent) measurement and reporting, of the gateway devices themselves and of RSNs that are associated with them.

A system of networked devices and subsystems that has means to exchange data and messages between local RSN-gateway networks and user applications and network-management applications using a common-to-managing-entity set of data-interaction instructions.

A system of networked devices and subsystems that has gateway devices that are of a size/weight and are otherwise equipped to operate attached to mobile assets and provide local-network management, WAN connectivity/routing, RSN management and communications, local user-device communications, and event data storage, without requiring the use of facilities not on the mobile asset.

A system of networked devices and subsystems that accommodates gateway-defined local-network islands that, on an ad hoc basis, can be merged with other islands to form a single larger island, under the management of a single controlling gateway device, with that merged island including all RSNs that were originally associated with the merged gateway devices, and that facilitates subsequent un-merging and the re-establishment of original gateway-RSN associations. These islands may be any combination of mobile, permanently stationary, or temporarily stationary.

A system of networked devices and subsystems that includes a PDA offering equipped with a simple first-responder application.

A system of networked devices and subsystems that includes integration with the "AIMSonScene" application, at least one widely used logistics-management application, and at least one widely used asset/equipment-management application.

A system of networked devices and subsystems that includes a centralized network and network-services management system that is accessible by RSN-gateway networks and by user applications, that manages message/data routing between user applications and local networks, stores event data, authorizes usage, manages billing, issues software/firmware updates, etc.

A system of networked devices and subsystems that accommodates find-RSN and directed query of a specific RSN using user applications.

A system of networked devices and subsystems that facilitates users' uniquely associating RSNs to specific assets, such that user applications may address the asset by the asset's name (rather than by the RSN).

A system of networked devices and subsystems that accommodates mobile gateway devices' querying of specific RSNs or groups of RSNs that may be associated with a different gateway device, without having to interact with that different gateway device, nor with any other device/subsystem not contained on/in the mobile gateway's conveyance.

A system of networked devices and subsystems that includes gateway devices that can be subordinated to another gateway device, so as to provide extended range of the other gateway device.

A system of networked devices and subsystems that includes RSN and gateway devices that may be configured to autonomously assume/execute certain behaviors depending on sensor input, day-of-week, time-of-day, network command, application command, or any combination thereof.

A system of networked devices and subsystems that whose gateway devices all must be capable of being installed on their physical structures, configured, connected, and commissioned into their users'/owners' networks by associate-level technicians, using only common hand and data comm tools, managing entity-supplied tools, and the support of at most one off-site technician, typically in four hours per device.

A system of networked devices and subsystems that whose devices all may have common-user-name and other user-defined attributes assigned to them by users, with those attributes capable of being read/viewed/changed by user applications.

A system of networked devices and subsystems that includes a tool for users (customers) that enables them to configure the descriptive and behavioral attributes of RSNs owned/controlled by them, without requiring a network connection, nor the involvement of managing-entity personnel.

A system of networked devices and subsystems that may be operated with full-function/capability in any national or local jurisdiction, either by a single fixed set of parameters that accommodates all jurisdictions, or that automatically adjusts based on self-sensed location.

A system of networked devices and subsystems that accommodates same-site redundancy of gateway devices, with automatic switch-over should a primary fail, and the option of automatic or manual switch-back.

A system of networked devices and subsystems that whose devices all have the capability of having their operational software/firmware updated, either singly or as part of a mass update, either on command or automatically per schedule, and while the devices are either deployed and in use or are not in use.

A system of networked devices and subsystems that comprises hardware, software, firmware, and architecture that minimize the number of application-specific models and variants of devices.

A system of networked devices and subsystems that comprises hardware that, if used in non-controlled environments, can operate over the range of $-30°$ to $+55°$ C. and that otherwise can withstand the environmental rigors associated with firefighting, heavy-construction yards, and global freight-container transport.

A system of networked devices and subsystems that renders average latency between an RSN event and reporting of the event to a user application of no more than five seconds, excluding WAN set-up time, including any/all local network communications and hand-offs.

A system of networked devices and sub-systems that maintains 99.99% availability.

A system of networked devices and sub-systems that has RSNs within internal memory, for storing RSN attributes, asset ID data, sensor data, event data, and other data as may be useful for an RSN to establish and maintain communications with a gateway device, as may be needed to store data until those communications can be established, and as may be useful to support user applications.

A system of networked devices and sub-systems that accommodates find-gateway and directed query of a specific gateway using user applications.

Stealthy Networks

It will further be appreciated that, in addition to minimizing interference, the use of class-based networking with RSNs having wake-up transceivers inherently provides a network that is electronically stealthy, i.e., a network that is hard to detect. In preferred embodiments where each RSN only transmits when in the presence of an in-class gateway controller and the frequency of subsequent transmissions is controllable by that controller, an RSN's presence or existence is very difficult to detect by electronic means. This is especially true in preferred implementations utilizing low power radios having a reduced RF signature. The stealth of these networks can be useful in a wide variety of applications. For example, attaching a conventional transmitting node to a high-value asset can lead thieves directly to the high-value asset. A stealthy RSN, however, cannot be detected by thieves as easily, or at all, thus lowering the risk of discovery of the high value asset. Similarly, conventional periodically transmitting devices can be hazardous on board aircraft, thus making their use for monitoring air cargo problematic. In a preferred CBN implementation, however, an RSN attached to air cargo ceases transmissions once inside an aircraft because it is unable to receive transmissions from a gateway controller (due to Faraday shielding).

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A system, comprising:
   (a) a gateway comprising a location identification; and
   (b) a wireless communications device;
   (c) wherein the gateway is configured to
      (i) broadcast a beacon signal, including the location identification, upon expiration of a beacon timer of the gateway, and
      (ii) upon broadcasting the beacon signal, reset the beacon timer of the gateway based on a pre-selected maximum value;
   (d) wherein the wireless communications device is configured to, when not registered with the gateway, in response to receipt of the beacon signal, attempt to register with the gateway;
   (e) wherein the wireless communications device is adapted to, when registered with the gateway, utilize a beacon timer of the wireless communications device to control broadcasting of beacon signals via being configured to
      (i) in response to receipt of another beacon signal which includes the location identification, reset the beacon timer of the wireless communications device based upon a randomly selected value between zero and the pre-selected maximum value,
      (ii) upon expiration of the beacon timer of the wireless communications device, broadcast a device beacon signal, which device beacon signal includes the location identification, and
      (iii) upon broadcasting the device beacon signal, reset the beacon timer of the wireless communications device based on the pre-selected maximum value;
   (f) wherein the wireless communications device is still further configured to, when registered with the gateway,
      (i) forward messages received from other wireless communications devices registered with the gateway to the gateway, and append an identification of the wireless communication device to the message,
      (ii) communicate a check-in message to the gateway, upon expiration of a check-in timer of the wireless communications device, and
      (iii) upon communicating the check-in message, reset the check-in timer of the wireless communications device;
   (g) wherein the gateway is further configured to, in response to receipt of a message originated by one of the other wireless communications devices that was forwarded by the wireless communications device, communicate an acknowledgment message to the wireless communications device; and
   (h) wherein the wireless communications device is still further configured to, in response to receiving the acknowledgment message,
      (i) reset the check-in timer of the wireless communications device, and
      (ii) forward the acknowledgment message to the originating one of the other wireless communications devices.

2. The system of claim 1, wherein the wireless communications device comprises a remote sensor node (RSN).

3. The system of claim 2, wherein the RSN is worn by a firefighter.

4. The system of claim 2, wherein the RSN is attached to a police cruiser.

5. The system of claim 2, wherein the RSN is attached to equipment used by emergency services sector (ESS) personnel.

6. The system of claim 2, wherein
   (a) the RSN is worn by ESS personnel,
   (b) the gateway is mounted to an ESS vehicle, and
   (c) the RSN is configured to wirelessly communicate with the gateway.

7. The data communications network of claim 1, wherein a plurality of the wireless two-way RF data communication devices are respectively attached to assets for monitoring and tracking of such assets.

8. The data communications network of claim 1, wherein a plurality of the wireless two-way RF data communication devices are permanently affixed to a structure for monitoring and/or tracking assets that come within a proximity thereto.

9. The data communications network of claim 1, wherein a plurality of the wireless two-way RF data communication devices each comprises a wireless transceiver that includes microprocessor capabilities.

10. The system of claim 1,
    (a) wherein the gateway is one of a plurality of gateways, each gateway defining a wireless island which includes any two-way RF data communication devices registered therewith,
    (b) wherein the system further includes a customer application loaded on one or more electronic devices, and
    (c) wherein the system further includes a message management and routing (MMR) system configured to act as an intermediary for communication between one of the wireless islands and the customer application.

11. The system of claim 10, wherein one of the plurality of wireless islands comprises a radio network, and wherein the radio network comprises a plurality of two-way RF data communications devices in the form of remote sensor nodes (RSNs).

12. The system of claim 1, wherein the gateway is attached to a fire engine.

13. The system of claim 1, wherein the gateway is attached to a fire station building.

14. A system comprising:
(a) a gateway comprising an identifier; and
(b) a wireless communications device;
(c) wherein the gateway is configured to
  (i) broadcast a beacon signal, including the identifier, upon expiration of a beacon timer of the gateway, and
  (ii) upon broadcasting the beacon signal, reset the beacon timer of the gateway based on a maximum value;
(d) wherein the wireless communications device is configured to, when not registered with the gateway, in response to receipt of the beacon signal, attempt to register with the gateway;
(e) wherein the wireless communications device is adapted to, when registered with the gateway, utilize a beacon timer of the wireless communications device to control broadcasting of beacon signals via being configured to
  (i) in response to receipt of another beacon signal which includes the identifier, reset the beacon timer of the wireless communications device based upon a randomly selected value between zero and the maximum value,
  (ii) upon expiration of the beacon timer of the wireless communications device, broadcast a device beacon signal, which device beacon signal includes the identifier, and
  (iii) upon broadcasting the device beacon signal, reset the beacon timer of the wireless communications device based on the maximum value;
(f) wherein the wireless communications device is still further configured to, when registered with the gateway, forward messages received from other wireless communications devices registered with the gateway to the gateway.

15. A method comprising:
(a) broadcasting, by a gateway, a beacon signal, including an identifier associated with the gateway, upon expiration of a beacon timer of the gateway;
(b) upon broadcasting the beacon signal, resetting the beacon timer of the gateway based on a maximum value;
(c) receiving, at a wireless communications device, the broadcast beacon signal including the identifier;
(d) communicating, from the wireless communications device to the gateway, a registration request;
(e) in response to the registration request, communicating, from the gateway to the wireless communications device, an acknowledgment;
(f) broadcasting, by the gateway, another beacon signal including the identifier, upon expiration of the beacon timer of the gateway;
(g) receiving, at the wireless communications device, the another beacon signal including the identifier;
(h) in response to receiving the another beacon signal which includes the identifier, setting a beacon timer of the wireless communications device based upon a randomly selected value between zero and the maximum value,
(i) upon expiration of the beacon timer of the wireless communications device, broadcasting a device beacon signal, which device beacon signal includes the identifier, and
(j) upon broadcasting the device beacon signal, setting the beacon timer of the wireless communications device based on the maximum value.

16. The method of claim 15, wherein the wireless communications device comprises an RSN, and wherein the method further includes:
(a) attaching the RSN to an asset;
(b) attaching the gateway to a mobile vehicle;
(c) dispatching, to an incident, the mobile vehicle;
(d) dispatching, to an incident, the asset;
(e) and wherein the steps of communicating, from the wireless communications device to the gateway, a registration request and in response to the registration request, communicating, from the gateway to the wireless communications device, an acknowledgment are involved in forming, at the incident, a wireless network between the RSN and the gateway.

17. The method of claim 16, further comprising communicating, by the gateway, an indication of the presence of the RSN at the incident to a customer application.

18. The method of claim 16, further comprising communicating, by the gateway via WiFi, information associated with the RSN to a customer application.

19. The method of claim 16, further comprising the step of determining a location of the RSN utilizing hop path information.

20. The method of claim 16, further comprising the step of merging, at the incident, the wireless network with another wireless network.

* * * * *